US011962877B2

(12) United States Patent
Topliss et al.

(10) Patent No.: US 11,962,877 B2
(45) Date of Patent: Apr. 16, 2024

(54) VOICE COIL MOTOR OPTICAL IMAGE STABILIZATION

(71) Applicant: Apple Inc., Cupertino, CA (US)

(72) Inventors: Richard J. Topliss, Cambridge (GB); Douglas S. Brodie, Los Gatos, CA (US); Anthony J. Rossetti, San Jose, CA (US); Richard H. Tsai, Cupertino, CA (US); Richard L. Baer, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/816,350

(22) Filed: Jul. 29, 2022

(65) Prior Publication Data

US 2022/0368814 A1    Nov. 17, 2022

Related U.S. Application Data

(63) Continuation of application No. 16/840,138, filed on Apr. 3, 2020, now Pat. No. 11,405,532, which is a (Continued)

(51) Int. Cl.
    *H04N 23/50*      (2023.01)
    *G02B 7/08*       (2021.01)
    (Continued)

(52) U.S. Cl.
    CPC .............. *H04N 23/50* (2023.01); *G02B 7/08* (2013.01); *G02B 27/646* (2013.01); *H02K 41/0356* (2013.01)

(58) Field of Classification Search
    CPC ...... H04N 5/2251; G02B 7/08; G02B 27/646; G02B 7/09; H02K 41/0356; G03B 2205/0069
    (Continued)

(56) References Cited

U.S. PATENT DOCUMENTS

| 5,335,032 A | 8/1994 | Onuki et al. |
| 7,903,960 B2 | 3/2011 | Uenaka |

(Continued)

FOREIGN PATENT DOCUMENTS

| AU | 2015100962 | 10/2015 |
| CN | 101441385 | 5/2009 |

(Continued)

OTHER PUBLICATIONS

Innovation Patent Examination Report No. 1 from Australian Application No. 2015100962, dated Dec. 9, 2015, Apple Inc., pp. 1-5.

(Continued)

*Primary Examiner* — Usman A Khan
(74) *Attorney, Agent, or Firm* — Robert C. Kowert; Kowert, Hood, Munyon, Rankin & Goetzel, P.C.

(57) ABSTRACT

Some embodiments provide an apparatus for controlling the motion of a camera component. In some embodiments, the apparatus includes an actuator module. The actuator module includes a plurality of magnets. Each magnet of the plurality of magnets is poled with magnetic domains substantially aligned in the same direction throughout each magnet. The apparatus further includes a coil rigidly disposed around a lens. Each magnet of the plurality of magnets contributes to the forces to adjust focus of the lens based on Lorentz forces generated from the coil.

20 Claims, 26 Drawing Sheets

Related U.S. Application Data continuation of application No. 16/112,522, filed on Aug. 24, 2018, now Pat. No. 10,616,452, which is a continuation of application No. 14/745,173, filed on Jun. 19, 2015, now Pat. No. 10,063,752, which is a continuation of application No. PCT/US2013/076753, filed on Dec. 19, 2013.

(60) Provisional application No. 61/740,276, filed on Dec. 20, 2012.

(51) Int. Cl.
  *G02B 27/64* (2006.01)
  *H02K 41/035* (2006.01)

(58) Field of Classification Search
  USPC .................................................. 348/208.11
  See application file for complete search history.

(56) References Cited

U.S. PATENT DOCUMENTS

| | | | | |
|---|---|---|---|---|
| 8,810,167 | B2* | 8/2014 | Suzuki | H02P 6/10 |
| | | | | 318/801 |
| 10,063,752 | B2 | 8/2018 | Topliss et al. | |
| 10,616,452 | B2 | 4/2020 | Topliss et al. | |
| 11,405,532 | B2 | 8/2022 | Topliss et al. | |
| 2006/0033818 | A1* | 2/2006 | Wada | H04N 23/687 |
| | | | | 348/208.11 |
| 2006/0257131 | A1* | 11/2006 | Yoon | H04N 23/51 |
| | | | | 348/E5.026 |
| 2007/0183294 | A1* | 8/2007 | Takahashi | G11B 7/1374 |
| | | | | 369/44.14 |
| 2008/0021491 | A1 | 1/2008 | Freeman et al. | |
| 2008/0240704 | A1* | 10/2008 | Takahashi | H02N 2/108 |
| | | | | 396/419 |
| 2008/0240706 | A1* | 10/2008 | Akiba | G03B 17/00 |
| | | | | 396/428 |
| 2009/0080875 | A1 | 3/2009 | Ishikawa et al. | |
| 2010/0157070 | A1 | 6/2010 | Mohanty et al. | |
| 2010/0239237 | A1 | 9/2010 | Ishikawa et al. | |
| 2011/0032615 | A1* | 2/2011 | Usui | G03B 5/00 |
| | | | | 359/554 |
| 2011/0096178 | A1 | 4/2011 | Ryu et al. | |
| 2011/0176046 | A1* | 7/2011 | Hu | H04N 23/68 |
| | | | | 348/335 |
| 2011/0286099 | A1* | 11/2011 | Shiraki | G02B 7/023 |
| | | | | 359/557 |
| 2012/0147258 | A1 | 6/2012 | Park | |
| 2012/0154614 | A1* | 6/2012 | Moriya | H04N 23/54 |
| | | | | 348/208.5 |
| 2012/0200768 | A1 | 8/2012 | Ito | |
| 2012/0229901 | A1 | 9/2012 | Moriya et al. | |
| 2012/0314308 | A1 | 12/2012 | Ikushima et al. | |
| 2013/0039640 | A1 | 2/2013 | Sekimoto | |
| 2013/0201559 | A1 | 8/2013 | Minamisawa et al. | |

FOREIGN PATENT DOCUMENTS

| | | |
|---|---|---|
| CN | 201577015 | 9/2010 |
| CN | 101860165 | 10/2010 |
| CN | 102062926 | 5/2011 |
| CN | 102165368 | 8/2011 |
| CN | 102298189 | 12/2011 |
| CN | 102315747 | 1/2012 |
| CN | 202196247 | 4/2012 |
| CN | 102455481 | 5/2012 |
| CN | 102472944 | 5/2012 |
| CN | 102789314 | 11/2012 |
| CN | 101551578 | 10/2019 |
| JP | H09061878 | 3/1997 |
| JP | 2002207148 | 7/2002 |
| JP | 2009075441 | 4/2009 |
| JP | 2010128389 | 6/2010 |
| JP | 2011085666 | 4/2011 |
| JP | 2011128583 | 6/2011 |
| JP | 2011133702 | 7/2011 |
| JP | 2012008379 | 1/2012 |
| JP | 2012073478 | 4/2012 |
| JP | 2012088477 | 5/2012 |
| JP | 2012118213 | 6/2012 |
| JP | 2012118517 | 6/2012 |
| JP | 2013024983 | 2/2013 |
| JP | 2015143722 | 8/2015 |
| KR | 20100109727 | 10/2010 |
| KR | 10-2012-0066264 | 6/2012 |
| WO | 2014008012 | 1/2014 |

OTHER PUBLICATIONS

Office Action from Korean Application No. 10-2015-7019632, dated Nov. 17, 2016 (English Translation and Korean version), Apple Inc., pp. 1-11.
Notice of Allowance from Australian Application No. 2013361211, dated Jan. 27, 2017, Apple Inc., pp. 1-3.
Patent Examination Report No. 1 from Australian Application No. 2013361211, dated Apr. 20, 2016, Apple Inc., pp. 1-3.
Notification of Reason(s) for Refusal from Japanese Patent Application No. 2015-549750, dated May 29, 2017, pp. 1-8.
Office Action from Chinese Application No. 201380072792.7, dated Sep. 26, 2016, Apple Inc., pp. 1-22.
Office Action from Japanese Application No. 2018-168434, (English Translation and Japanese Version), dated Aug. 26, 2019, pp. 1-7.
Notice of Preliminary Rejection, dated Jan. 7, 2020, English translation & Koren version, Apple Inc., pp. 1-18.
Notice of Allowance from Chinese Application No. 201811142516.4, dated Jul. 2, 2021, pp. 1-5.
Office action from Chinese Application No. 201811142516.4, dated Jan. 22, 2021, (Chinese Version only), pp. 1-5.
Intellectual Property Office Notice of Preliminary Rejection from Korean Application No. 10-2021-7002785, dated Apr. 6, 2021, (English Translation and Korean Version), pp. 1-13.
Examination Report from Australian Application No. 2020202594, dated Apr. 13, 2021, pp. 1-10.
Office Action from Chinese Application No. 2018-168434, (English translation and Chinese version), dated May 11, 2020, pp. 1-5.
Notice of Preliminary Rejection from Korean Patent Application No. 10-2022-7016774, dated Jan. 12, 2023, pp. 1-13, including english translation.
Office Action dated Jun. 9, 2023 in Australian Divisional Patent Application No. 2021290351, pp. 1-3.

* cited by examiner

|      | Drive Current to Terminal / mA |     |     |     | Z Position | Angle about    | Angle about    |
|------|------|------|------|------|------------|----------------|----------------|
|      | 1    | 2    | 3    | 4    | (0-180um)  | 1-4 axis/deg   | 2-3 axis/deg   |
| 1602 | 0    | 0    | 0    | 0    | 50         | 0              | 0              |
| 1604 | 20   | -20  | -20  | 20   | 90         | 0              | 0              |
| 1606 | -25  | 25   | 25   | -25  | 0          | 0              | 0              |
| 1608 | -27  | 25   | 25   | -23  | 0          | 0              | 0.1            |
|      | -29  | 31   | 19   | -21  | 0          | 0.3            | 0.2            |
|      | 0    | -10  | 10   | 0    | 50         | 0.5            | 0              |
|      | 65   | -61  | -69  | 65   | 180        | -0.2           | 0              |

*FIG. 16*

VOICE COIL MOTOR OPTICAL IMAGE STABILIZATION

This application is a continuation of U.S. patent application Ser. No. 16/840,138, filed Apr. 3, 2020, which is a continuation of U.S. patent application Ser. No. 16/112,522, filed Aug. 24, 2018, now U.S. Pat. No. 10,616,452, which is a continuation of U.S. patent application Ser. No. 14/745,173, filed Jun. 19, 2015, now U.S. Pat. No. 10,063,752, which is continuation of International Application No. PCT/US2013/076753, filed Dec. 19, 2013, which claims benefit of priority of U.S. Provisional Application Ser. No. 61/740,276, filed Dec. 20, 2012, which are incorporated by reference herein in their entirety.

BACKGROUND

Technical Field

This disclosure relates generally to control of the motion of camera components.

Description of the Related Art

For high-end miniature cameras, it is common to incorporate 'auto-focus' (AF), whereby the object focal distance is adjusted to allow objects at different distances to be in sharp focus at the image plane, to be captured by the digital image sensor. There have been many proposals for achieving such adjustment of focal position.

The most common solution, however, is to move the whole optical lens as a single rigid body along the optical axis. Positions of the lens closer to the image sensor correspond to object focal distances further from the camera. Demands on improvements to performance of such miniature cameras are constant, as are demands for continued miniaturization, given the added features and devices added to such mobile devices.

In particular, high image quality is easier to achieve if the lens motion along the optical axis is accompanied by minimal parasitic motion in the other degrees of freedom, particularly tilt about axes orthogonal to the optical axis.

Further to this, there is a strong desire, for a given size of camera, to fit bigger lenses and image sensors to improve image quality, and hence there is a desire to reduce the size of components such as actuators.

SUMMARY OF EMBODIMENTS

Some embodiments include an apparatus for controlling the motion of a camera component. In some embodiments, the apparatus includes an actuator module. The actuator module includes a plurality of magnets. Each magnet of the plurality of magnets is poled with magnetic domains substantially aligned in the same direction throughout each magnet. The apparatus further includes a coil rigidly disposed around a lens. Each magnet of the plurality of magnets contributes to the forces to adjust focus of the lens based on Lorentz forces generated from the coil.

BRIEF DESCRIPTION OF THE DRAWINGS

FIG. 16 is a table of example currents applied to each terminal and their effect on actuator position and tilt, according to some embodiments.

Figure 1:
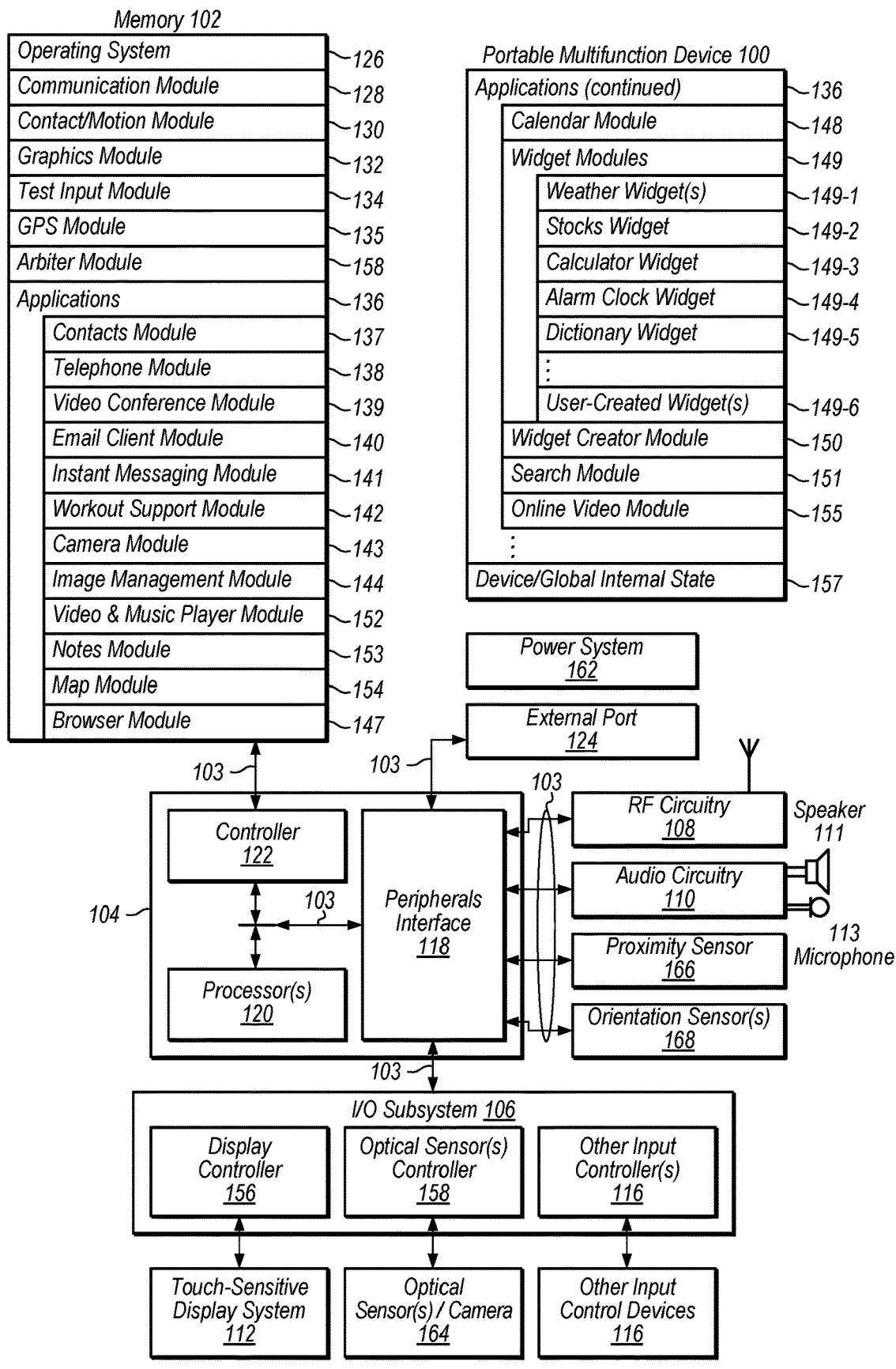
FIG. 1 illustrates a block diagram of a portable multifunction device with a camera in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments include an apparatus for controlling the motion of a camera component. In some embodiments, the apparatus includes an actuator module for controlling the position of a lens relative to an image sensor in a miniature camera along three orthogonal axes, and a focusing mechanism for moving a lens along an optical axis. In some embodiments, the mechanism is suspended on a plurality of wires, each substantially parallel to an optical axis, and at least one of the plurality of wires is composed of a shape memory allow capable of bending deformations that allow the focusing mechanism to move in linear directions orthogonal to the optical axis.

In some embodiments, the plurality of wires further comprises four wires, one in each corner of the mechanism. In some embodiments, the bending deformations include bending deformations substantially preventing parasitic motions in other directions. In some embodiments, the plurality of wires suspends the focusing mechanism on an actuator module support structure to allow the linear motions required for the handshake correction. In some embodiments, each of the plurality of wires is composed of a shape memory allow capable of bending deformations. In some embodiments, at least three of the plurality of wires are composed of shape memory alloy, and each of the wires that is composed of shape memory is configured with a passive bias spring providing a tensile force along the length of the wire.

In some embodiments, each of the wires that is composed of shape memory is configured with a passive bias spring providing a tensile force along the length of the wire, such that when heated by passing an electric current through the wire, or cooled by removing a proportion of the current, the length of each wire changes, and in this way a tilt of the focusing mechanism and the lens relative to the image sensor is controlled.

Some embodiments include a method for controlling the position of a lens. In some embodiments, the method includes passing an electric current through a suspension wire to lengthen the wire by expanding a shape memory alloy in the wire, and reducing the current through the suspension wire to shorten the wire by contracting a shape memory alloy in the wire.

In some embodiments, passing an electric current through a suspension wire to lengthen the wire by expanding a shape memory alloy in the wire further includes passing current simultaneously through a plurality of corner wires of a suspension of a focusing mechanism configured with a passive bias spring providing a tensile force along the length of the wire. In some embodiments, passing an electric current through a suspension wire to lengthen the wire by expanding a shape memory alloy in the wire further includes passing current through at least three corner wires of a suspension of a focusing mechanism configured with a passive bias spring providing a tensile force along the length of the wire.

In some embodiments, passing an electric current through a suspension wire to lengthen the wire by expanding a shape memory alloy in the wire further includes passing current through at least three corner wires of a suspension of a focusing mechanism configured with a passive bias spring providing a tensile force along the length of the wire, and withholding current from a fourth corner wire. In some embodiments the fourth corner wire is not fabricated from a shape memory alloy material, the fourth corner wire is passive, and the fourth corner wire is substantially linear and elastic in its stress and strain characteristic at operational loads.

In some embodiments, passing an electric current through a suspension wire to lengthen the wire by expanding a shape memory alloy in the wire further includes passing current through a wire comprising a shape memory allow capable of bending deformations to allow a focusing mechanism to move in linear directions orthogonal to an optical axis of the lens. Some embodiments further include generating tilt of a lens by passing current different currents through a first corner wire and a second corner wire of a suspension of a focusing mechanism configured with a passive bias spring providing a tensile force along the length of the wire. Some embodiments further include generating tilt of a lens by passing current different currents through a first corner wire and a second corner wire of a suspension of a focusing mechanism. Some embodiments further include controlling a position of a lens relative to an image sensor in a miniature camera along three orthogonal linear axes, one axis parallel to an optical axis for focus adjustment, and two other axes orthogonal to the optical axis and to each other.

Some embodiments include a focusing mechanism for moving a lens along an optical axis. In some embodiments, the mechanism is suspended on a plurality of wires, each substantially parallel to an optical axis, and at least one of the plurality of wires is composed of a shape memory allow capable of bending deformations that allow the focusing mechanism to move in linear directions orthogonal to the optical axis. In some embodiments. At least three of the corner wires fabricated from shape memory alloy (SMA), each wire configured with a passive bias spring providing a tensile force along the length of the wire, so that when heated by passing an electric current through the wire, or cooled by removing a proportion of the current, the length of each wire is controlled.

In some embodiments, at least three passive bias springs, one for each wire, configured to react between a portion of the focusing mechanism and an actuator support structure. In some embodiments, the passive bias springs route electrical current to the focusing mechanism. In some embodiments, at least one of the wires is nor fabricated from shape memory alloy material, the at least one of the wires is a passive and substantially linear and elastic in its stress and strain characteristic at operational loads.

Some embodiments may include a means for controlling a camera component, as described herein. For example, a module pass an electric current through a suspension wire to lengthen the wire by expanding a shape memory alloy in the wire, and reduce the current through the suspension wire to shorten the wire by contracting a shape memory alloy in the wire, as described herein. The camera module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform passing an electric current through a suspension wire to lengthen the wire by expanding a shape memory alloy in the wire, and reducing the current through the suspension wire to shorten the wire by contracting a shape memory alloy in the wire, as described herein. Other embodiments of the camera module may be at least partially implemented by hardware circuitry and/or firmware stored, for example, in a non-volatile memory.

Some embodiments provide an apparatus for controlling the motion of a camera component. In some embodiments, the apparatus includes an actuator module. The actuator module includes a plurality of magnets. Each magnet of the plurality of magnets is poled with magnetic domains substantially aligned in the same direction throughout each magnet. The apparatus further includes a coil rigidly disposed around a lens. Each magnet of the plurality of magnets contributes to the forces to adjust focus of the lens based on Lorentz forces generated from the coil. In some embodiments, the plurality of magnets is mounted to a support structure of a focusing mechanism comprising the actuator module, and the plurality of magnets comprises four magnets mounted to the support structure of the focusing mechanism.

In some embodiments, the coil is driven with an electric current and the coil is rigidly disposed around the Lens and mounted in the magnetic field of each magnet. In some embodiments, the poling directions of each magnet of the plurality of magnets as mounted in the actuator module is substantially orthogonal to an optical axis of the lens, and the poling directions of each magnet of the plurality of magnets is angled at or about 45 degrees to at least one of a plurality of planar sides of the actuator module, and the actuator module is substantially cuboid in envelope.

In some embodiments, a focusing mechanism is suspended on an actuator module support structure by a means that substantially limits the relative motion to linear directions orthogonal to the optical axis. In some embodiments, a fringing magnetic field of each magnet of the plurality of magnets interacts with four additional coils when driven with electric currents, the four additional coils are fixed to an actuator module support structure so that components of the fringing magnetic field parallel to the optical axis allow Lorentz forces to be generated in directions orthogonal to the optical axis, and the Lorentz forces generate controlled motion of the focusing mechanism and a lens, in directions orthogonal to an optical axis.

In some embodiments, the actuator module is an actuator module for controlling the position of a lens relative to an image sensor in a miniature camera along three orthogonal axes, one parallel to the optical axis for focus adjustment, and two orthogonal to the optical axis and to each other to compensate for user handshake.

Some embodiments include an actuator module for controlling the position of a lens relative to an image sensor in a miniature camera. In some embodiments, the actuator module includes an actuator module support structure, a focusing mechanism suspended on the actuator module support structure by a suspension means configured to limit relative motion to linear directions orthogonal to an optical axis of the miniature camera, and a plurality of magnets mounted to a support structure of the focusing mechanism.

In some embodiments, the actuator module support structure includes a magnetic yoke. The plurality of magnets is mounted to the magnetic yoke, an upper spring is mounted to the magnetic yoke, the upper spring is used to suspend a lens and a focusing coil, and the upper spring is electrically insulated from the yoke. In some embodiments, the upper spring includes a first portion and a second portion, each of the first portion and the second portion is connected to a respective terminal of the focusing coil to form a conductive path to drive current through the focusing coil, from the yoke when different voltages applied to each of the first portion and the second portion.

In some embodiments, the actuator module is rectangular in plan, when viewed in directions orthogonal to the optical axis, with sides arranged so that there is a long side and a short side, each magnet of the plurality of magnets and a corresponding fixed coil are arranged to exhibit mirror symmetry about a plane at 45 degrees to at least one side of the actuator module, and the combined arrangement of four magnets and four fixed coils does not exhibit mirror symmetry about a plane at 45 degrees to at least one side of the actuator module and through the optical axis.

In some embodiments, the conduction path to the two portions of the upper spring is through the suspension mechanism, and the suspension mechanism guides the focusing mechanism to move in linear directions orthogonal to the optical axis, relative to the actuator module fixed support structure. In some embodiments, each magnet of the plurality of magnets is arranged to interact with Lorentz forces generated from a single coil driven with an appropriate electric current that is rigidly disposed around the lens and mounted in the magnetic field of each magnet.

Some embodiments further include a lower spring, used in combination with the upper spring to suspend the lens and focusing coil on the focusing mechanism support structure, and the lower spring is mounted on the four magnets, between the magnets and the four fixed coils.

Some embodiments include an apparatus for controlling the motion of a camera component in a mobile computing device. In some embodiments, the apparatus includes an actuator module comprising a plurality of magnets mounted to a circuit board. Each magnet of the plurality of magnets is poled with magnetic domains substantially aligned in the same direction throughout each magnet. Some embodiments include a coil rigidly disposed around a lens. Each magnet of the plurality of magnets contributes to the forces to adjust focus of the lens based on Lorentz forces generated from the coil rigidly disposed around the lens. In some embodiments, the circuit board comprises a flexible printed circuit.

In some embodiments, the circuit board comprises a printed circuit board, the plurality of coils is affixed at an orientation such that the plane of the circuit board is orthogonal to an optical axis of the actuator, and at least two Hall sensors are mounted to the board centers of two of the fixed coils on opposite sides of the printed circuit board from the magnets. Some embodiments further include a driver integrated circuit mounted to an underside of the circuit board, connected to the at least two hall sensors, Hall sensors, wherein the driver integrated circuit provides drive currents for the plurality of coils and the coil rigidly disposed around the lens. In some embodiments, each magnet of the plurality of magnets is mounted to the actuator module with a poling direction substantially orthogonal to an optical axis of the actuator module. In some embodiments, each magnet of the plurality of magnets is mounted to the actuator module with a poling direction orthogonal to an optical axis of the actuator module. In some embodiments, each magnet of the plurality of magnets is mounted to the actuator module at an angle of 45 degrees to at least one planar side of the actuator module.

Some embodiments provide an actuator module for a miniature camera. In some embodiments, the actuator module includes a focusing mechanism attachment for a lens. The focusing mechanism attachment provides at least three controlled degrees of positioning relative to an image sensor for the lens. One controlled degree of positioning of the at least three controlled degrees of positioning is a linear positioning of the lens relative to the image sensor in directions along an optical axis of the lens. Two other controlled degrees of positioning of the at least three controlled degrees of positioning are tilts of the lens relative to the image sensor. The tilts of the lens relative to the image sensor are tilts about two axes orthogonal to each other, and the tilts of the lens relative to the image sensor are tilts orthogonal to the optical axis. In some embodiments, the actuator module includes at least four bi-directional actuators attached to respective different regions about the lens. Each actuator of the four bi-directional actuators generates forces on the lens that are parallel to the optical axis of the lens, and each actuator of the four bi-directional actuators is a two-terminal device driven by an electric current.

In some embodiments, the actuator module has a rectangular shape with at least four corners when viewed in plan along the optical axis. Each actuator of the four bi-directional actuators is positioned at a respective one of the four corners. For a given polarity current applied to a first actuator through a terminal of the first actuator, the first actuator produces a force on the lens in a first direction along the optical axis, and for second and third actuators at corners adjacent to the corner at which the first actuator is located, currents applied through terminals of the second and third actuators of the same polarity as the given polarity will produce forces on the lens in a second direction opposite to the first direction.

In some embodiments, the actuator module has a rectangular shape with at least four corners when viewed in plan along the optical axis, each actuator of the four bi-directional actuators is positioned at a respective one of the four corners, and adjacent coils are wound opposite one another, such that currents of opposite polarity in adjacent coils produce forces on the lens from the two actuators in the same direction along the optical axis.

In some embodiments, the actuator module has a rectangular shape with at least four corners when viewed in plan along the optical axis, each actuator of the four bi-directional actuators is positioned at a respective one of the four corners, and adjacent coils are connected opposite one another, such that currents of opposite polarity in adjacent coils produce forces on the lens from the two actuators in the same direction along the optical axis.

In some embodiments, the at least four bi-directional actuators comprise voice coils motors with coils mounted on the lens or lens support structure, and dual-poled magnets are mounted to a support structure of the actuator module focusing mechanism. In some embodiments, the at least four bi-directional actuators comprise voice coils motors with coils mounted on the lens or lens support structure, dual-poled magnets are mounted to a support structure of the actuator module focusing mechanism, and adjacent ones of the magnets are oppositely poled, such that currents of opposite polarity in adjacent coils produce forces on the lens from the two actuators in the same direction along the optical axis. In some embodiments, the actuator module comprises linear, bi-directional programmable current sources for driving the each actuator of the four bi-directional actuators.

Some embodiments present an actuator module including a focusing mechanism attachment for a lens. The focusing mechanism attachment provides at least three controlled degrees of positioning relative to an image sensor for the lens. One controlled degree of positioning of the at least three controlled degrees of positioning is a linear positioning of the lens relative to the image sensor in directions along an optical axis of the lens. At least four bi-directional actuators attached to respective different regions about the actuator module to form points of a rectangular shape with at least four corners when viewed in plan along the optical axis. Each actuator of the four bi-directional actuators is positioned at a respective one of the four corners. For a given polarity current applied to a first actuator through a terminal of the first actuator, the first actuator produces a force on the lens in a first direction along the optical axis, and for second and third actuators at corners adjacent to the corner at which the first actuator is located, currents applied through terminals of the second and third actuators of the same polarity as the given polarity will produce forces on the lens in a second direction opposite to the first direction.

In some embodiments, each actuator of the four bi-directional actuators is attached to a respective current or voltage source driver, and the respective current or voltage source driver is for sensitivity gain and offset so as to determine a position and a tilt are developed for a given combination of applied current. Some embodiments include an actuator assembly with four terminals, arranged such that one terminal from each actuator is electrically connected together, and the other terminal of each actuator is driven with an electric current or voltage applied to each terminal, such that in combination the arrangement of actuators is driven with four terminals, wherein three of the said terminals are driven with linear bidirectional programmable current sources, and the fourth terminal is driven with a voltage source that applies a current such that that a total current flowing into the actuator from the four terminals sums to zero.

In some embodiments, two other controlled degrees of positioning of the at least three controlled degrees of positioning are tilts of the lens relative to the image sensor, and the tilts of the lens relative to the image sensor are tilts about two axes orthogonal to each other. The tilts of the lens relative to the image sensor are tilts orthogonal to the optical axis.

In some embodiments, each actuator of the four bi-directional actuators generates forces on the lens that are parallel to the optical axis of the lens, and each actuator of the four bi-directional actuators is a two-terminal device driven by an electric current. In some embodiments, adjacent coils are wound opposite one another, so that currents of opposite polarity in adjacent coils produce forces on the lens from the two actuators in the same direction along the optical axis.

In some embodiments, the actuator module is of generally cuboid plan when viewed along the optical axis, each actuator of the four bi-directional actuators is positioned at a corners of the actuator module as viewed along the optical axis, and for a given polarity current applied to a first actuator through a terminal, the produces a force on the lens in a first direction along the optical axis, whereas for actuators at adjacent corners to the first actuator, applied currents through their respective terminals of the same polarity as for the first actuator will produce forces on the lens in a second direction opposite to the first.

Some embodiments present an apparatus for controlling the motion of a camera component. In some embodiments, the apparatus includes an actuator module for a miniature camera. The actuator module incorporates a focusing mechanism, and four bi-directional actuators acting on four different regions about a lens. In some embodiments each actuator of the four bi-directional actuators is positioned at a corners of the generally cuboid actuator module when viewed along the optical axis. In some embodiments, for a given polarity current applied to a first actuator through a terminal, the produces a force on the lens in a first direction along the optical axis, whereas for actuators at adjacent corners to the first actuator, applied currents through their respective terminals of the same polarity as for the first actuator will produce forces on the lens in a second direction opposite to the first.

In some embodiments, each actuator of the four bi-directional actuators is driven with an electric current or voltage applied to each terminal, such that in combination the arrangement of actuators is driven with four terminals. In some embodiments, each actuator is a two-terminal device driven by an electric current. In some embodiments, terminals from each actuator are electrically connected together. In some embodiments, three of the terminals are driven with linear bidirectional programmable current sources, whilst the fourth terminal is driven with a voltage source that can sink or source the current necessary so that the current flowing into the actuator from the four terminals sums to zero. In some embodiments, the focusing mechanism provides at least three controlled degrees of positioning a lens relative to an image sensor, one being linear positioning of a lens relative to an image sensor in directions along the lens optical axis, and two others being tilts of the lens relative to the image sensor about two axes orthogonal to each other and both orthogonal to the optical axis.

Some embodiments include systems and methods for operating an optical image stabilization (OIS) system that allow locking the camera aiming direction in place while facilitating lower residual power consumption. In some embodiments, instead of using motion signals, an estimation of what is the equilibrium camera aiming orientation (steady state) is computed from position sensor measurements and used as the new target position. As an example, the camera equilibrium position estimation could be computed by averaging several measurements of actuator past positions.

In some embodiments, averaging a large number of samples provides an estimation of the current equilibrium position. In some embodiments, this estimation is provided using a motion signal from an accelerometer sensor in order to measure phone orientation (gravitational force direction) in combination with a physical model of the actuator. Some embodiments have the effect of locking the camera aiming direction with very low power consumption, such that spring forces and gravitational force will be at equilibrium, based on the assumption is that the smartphone orientation should stay the same for an extended period of time as the user tries to maintain the camera steady while using it to capture images. In some embodiments, major orientation changes are detected and locking position is then updated. Some embodiments reduce power consumption to that required for the OIS system compensation for camera acceleration caused by hand-motion, which is small compared to gravitational forces.

Some embodiments include methods and systems for camera control. In some embodiments, a method for controlling the position of camera components includes estimating an optical image stabilization equilibrium position and locking an optical image stabilization controller target position at the optical image stabilization equilibrium position. In some embodiments, the method further includes determining whether a change in an orientation of a multi-function device has exceeded a threshold, and responsive to determining that the change in the orientation of the multi-function device has exceeded a threshold, estimating a new optical image stabilization equilibrium position, and locking an optical image stabilization controller target position at the new stabilization equilibrium position. As used herein, the terms camera module and camera control module may be construed as interchangeable.

In some embodiments, a method for controlling the position of camera components includes, for a camera lens in a multifunction device, calculating an equilibrium position of the camera lens relative to a photosensor of the multifunction device. The equilibrium position of the camera lens relative to the photosensor is a position of the camera lens relative to the photosensor at which displacement of the camera lens due to springs in a lens actuator mechanism offsets displacement of the camera lens due to gravity. In some embodiments, the method includes detecting a current position of the camera lens relative to the photosensor. In some embodiments, the method includes calculating a displacement of the lens by the actuator mechanism necessary to move the lens to the equilibrium position. In some embodiments, the method includes applying, using a motor in the actuator mechanism, force to the lens to generate the displacement.

In some embodiments, the method includes determining, using a gyroscope, whether a change to an orientation of the multifunction device has exceeded a threshold. In some embodiments, the method includes calculating a new equilibrium position of the camera lens relative to the photosensor of the multifunction device. In some embodiments, the method includes calculating a new displacement of the lens by the actuator mechanism necessary to move the lens to the new equilibrium position. In some embodiments, the method includes applying, using a motor in the actuator mechanism, force to the lens to generate the new displacement.

In some embodiments, the method includes determining, using a gyroscope, whether a change to an orientation of the multifunction device has exceeded a threshold, calculating a new displacement of the lens by the actuator mechanism necessary to move the lens to the equilibrium position, and applying, using a motor in the actuator mechanism, force to the lens to generate the new displacement.

In some embodiments, the method includes determining, using a hall sensor, whether a change to the position of the camera lens relative to the photosensor of the multifunction device has exceeded a threshold. In some embodiments, the method includes calculating a new equilibrium position of the camera lens relative to the photosensor of the multifunction device, calculating a new displacement of the lens by the actuator mechanism necessary to move the lens to the new equilibrium position, and applying, using a motor in the actuator mechanism, force to the lens to generate the new displacement.

In some embodiments, the calculating the equilibrium position of the camera lens relative to the photosensor of the multifunction device further includes calculating an average position of the camera lens relative to the photosensor of the multifunction device during a lookback period. In some embodiments, the calculating the equilibrium position of the camera lens relative to the photosensor of the multifunction device further includes deriving from a gyroscope of the multifunction device an orientation of the multifunction device and a gravity vector, and calculating a position at which a spring vector is equal in magnitude and opposite in position to the gravity vector.

In some embodiments, the calculating the equilibrium position of the camera lens relative to the photosensor of the multifunction device further includes deriving from a gyroscope of the multifunction device an orientation of the multifunction device and a gravity vector. In some embodiments, the deriving includes filtering gyroscopic data to eliminate low-frequency motion components of motion of the multifunction device. In some embodiments, the calculating the equilibrium position of the camera lens relative to the photosensor of the multifunction device further includes calculating a position at which a spring vector is equal in magnitude and opposite in position to the gravity vector.

Some embodiments may include a means for controlling a camera. For example, a camera control module may estimate an optical image stabilization equilibrium position and lock an optical image stabilization controller target position at the optical image stabilization equilibrium position. In some embodiments, module may determine whether a change in an orientation of a multifunction device has exceeded a threshold, and responsive to determining that the change in the orientation of the multifunction device has exceeded a threshold, estimate a new optical image stabilization equilibrium position, and lock an optical image stabilization controller target position at the new stabilization equilibrium position, as described herein.

In some embodiments, a camera control module may, for a camera lens in a multifunction device, calculate an equilibrium position of the camera lens relative to a photosensor of the multifunction device. The equilibrium position of the camera lens relative to the photosensor is a position of the camera lens relative to the photosensor at which displacement of the camera lens due to springs in a lens actuator mechanism offsets displacement of the camera lens due to gravity. In some embodiments, camera control module may detect a current position of the camera lens relative to the photosensor. In some embodiments, the camera control module may calculate a displacement of the lens by the actuator mechanism necessary to move the lens to the equilibrium position. In some embodiments, the camera control module may apply, using a motor in the actuator mechanism, force to the lens to generate the displacement.

The camera control module or components thereof may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform estimating an optical image stabilization equilibrium position and locking an optical image stabilization controller target position at the optical image stabilization equilibrium position. In some embodiments, the method further includes determining whether a change in an orientation of a multifunction device has exceeded a threshold, and responsive to determining that the change in the orientation of the multifunction device has exceeded a threshold, estimating a new optical image stabilization equilibrium position, and locking an optical image stabilization controller target position at the new stabilization equilibrium position, as described herein. The computer-readable storage medium may store program instructions executable by the one or more processors to cause the computing apparatus to perform for a camera lens in a multifunction device, calculating an equilibrium position of the camera lens relative to a photosensor of the multifunction device, detecting a current position of the camera lens relative to the photosensor and calculating a displacement of the lens by the actuator mechanism necessary to move the lens to the equilibrium position, as described herein. Other embodiments of the non-uniform paint loading module may be at least partially implemented by hardware circuitry and/or firmware stored, for example, in a non-volatile memory.

Some embodiments include an apparatus for controlling the motion of a camera component. The apparatus includes an actuator module with a plurality of magnets. In some embodiments, each magnet of the plurality of magnets is poled with magnetic domains substantially aligned in the same direction throughout each magnet. A coil is rigidly disposed around a lens. In some embodiments, each magnet of the plurality of magnets contributes to the forces to adjust focus of the lens based on Lorentz forces generated from the coil.

Some embodiments include an apparatus for controlling the motion of a camera component. The apparatus includes an actuator module for controlling the position of a lens relative to an image sensor in a miniature camera along three orthogonal axes, and a focusing mechanism for moving a lens along an optical axis. The mechanism is suspended on a plurality of wires, each substantially parallel to an optical axis, and at least one of the plurality of wires is composed of a shape memory allow capable of bending deformations that allow the focusing mechanism to move in linear directions orthogonal to the optical axis.

Some embodiments include an apparatus for controlling the motion of a camera component. The apparatus includes an actuator module including a plurality of magnets. Each magnet of the plurality of magnets is poled with magnetic domains substantially aligned in the same direction throughout each magnet. A coil is rigidly disposed around a lens. Each magnet of the plurality of magnets contributes to the forces to adjust focus of the lens based on Lorentz forces generated from the coil.

Multifunction Device

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 1A is a block diagram illustrating portable multifunction device 100 with camera 164 in accordance with some embodiments. Camera 164 is sometimes called an "optical sensor" for convenience, and may also be known as or called an optical sensor system. Device 100 may include memory 102 (which may include one or more computer readable storage mediums), memory controller 122, one or more processing units (CPU's) 120, peripherals interface 118, RF circuitry 108, audio circuitry 110, speaker 111, touch-sensitive display system 112, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chip set, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors or cameras 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 includes one or more orientation sensors 168. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 100. In some embodiments, the one or more orientation sensors include any combination of orientation/rotation sensors. FIG. 1A shows the one or more orientation sensors 168 coupled to peripherals interface 118. Alternately, the one or more orientation sensors 168 may be coupled to an input controller 160 in I/O subsystem 106. In some embodiments, information is displayed on the touch screen display in a portrait view or a landscape view based on an analysis of data received from the one or more orientation sensors.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, arbiter module 157 and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 1493, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 2:
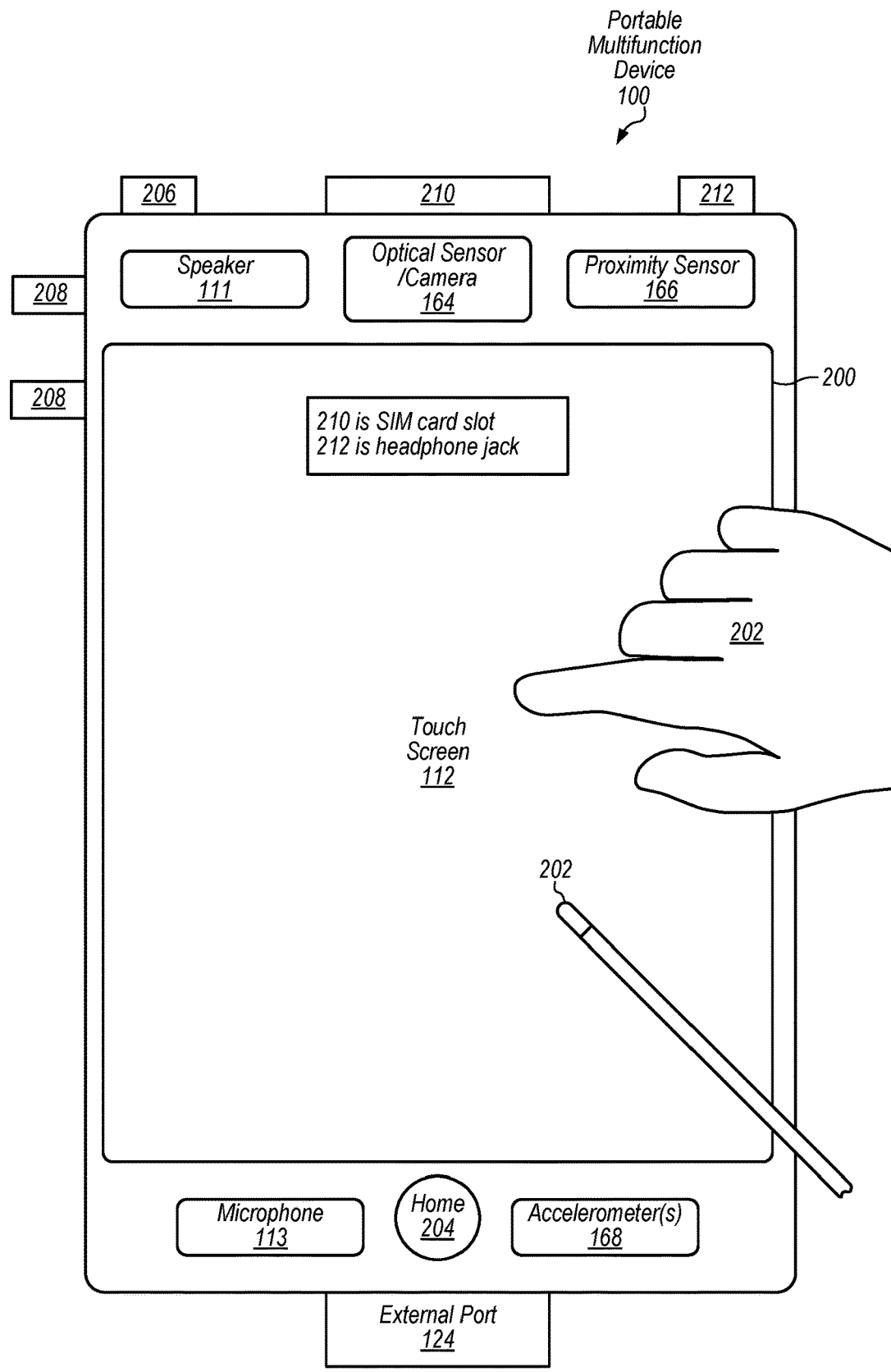
FIG. 2 depicts a portable multifunction device having a camera in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure).

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

It should be noted that, although many of the following examples will be given with reference to optical sensor/camera 164 (on the front of a device), rear-facing camera or optical sensor that is pointed opposite from the display may be used instead of optical sensor/camera 164.

Voice Coil Motor (VCM) Optical Image Stabilization (OIS) Wires

Some embodiments include an actuator module for use in miniature cameras, such as those used in mobile handheld devices or other multifunction devices. For high-end miniature cameras, it is common to incorporate 'auto-focus' (AF), whereby the object focal distance is adjusted to allow objects at different distances to be in sharp focus at the image plane, to be captured by the digital image sensor. Some embodiments allow improvements to performance of such miniature cameras, as well as continued miniaturization, to accommodate added features and devices added to such mobile devices.

Some embodiments allow the lens motion along the optical axis to be accompanied by minimal parasitic motion in the other degrees of freedom, particularly tilt about axes orthogonal to the optical axis, by accommodating a suspension mechanism that is stiff to such parasitic motions. Some embodiments control the lens position to around 1 micron, and some such suspension mechanisms account for friction.

Some embodiments allow a reduction in the size of components such as actuators. Some embodiments allow further augmented features to be added to miniature cameras, such as optical image stabilization (OIS), which moves one or more of the lens and image sensor in such a way to compensate for user handshake, and hence allows longer exposure times in lower light conditions, whilst also improving video capture.

Some embodiments include an actuator for high quality miniature cameras. In some embodiments, a voice coil motor (VCM) is used as an actuator. For such actuators, a current carrying conductor in a magnetic field experiences a force proportional to the cross product of the current in the conductor and the magnetic field. This force is known as the Lorentz force. In some embodiments, the Lorentz force is greatest if the direction of the magnetic field is orthogonal to the direction of the current flow, and the resulting force on the conductor is orthogonal to both. The Lorentz force is proportional to the magnetic field density and the current through the conductor.

Therefore some embodiments use an actuator designed to have a substantially constant magnetic field cutting the coil for all positions of the actuator, such that the force produced is proportional to the current through the conductor. Some embodiments make further use of voice coil motor technology and include an actuator architecture suitable for improving power consumption, performance, reducing size, and adding extra functionality, including optical image stabilization.

Figure 3A:
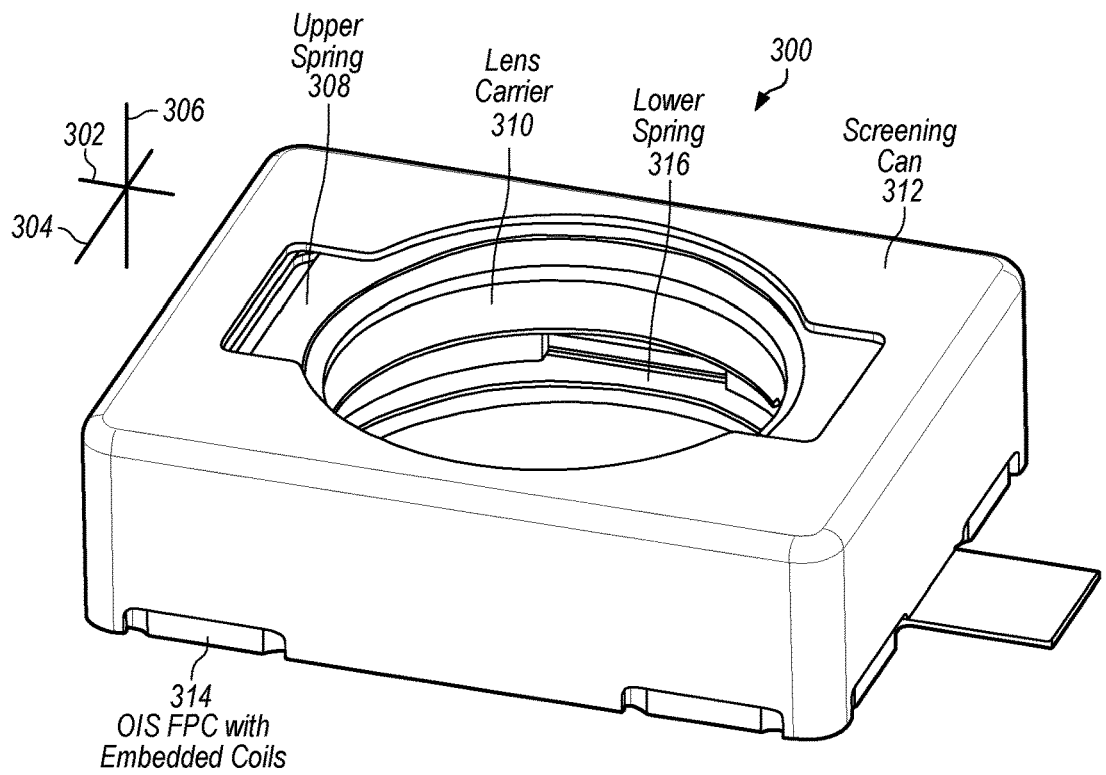
FIG. 3A illustrates a complete actuator module, according to some embodiments.

FIG. 3A depicts a complete actuator module, according to some embodiments. In some embodiments, actuator 300 has a footprint of 9.9 mm (X-302) by 7.8 mm (Y-304), which are the linear dimensions orthogonal to the optical axis of the camera Lens. The height is 3.3 mm (Z-306), which is parallel to the Lens optical axis. Some embodiments are designed to accommodate a diminished dimension Z 306, as the camera height limits the thickness of the cellphone or other multifunction device, which can be a competitive differentiator between multifunction device designs.

Embodiments enable favorable control over the dimension Y-304 of actuators, which can be commercially valuable, as some embodiments are used in cameras that typically located above the display screen in modern smartphones or other multifunction devices. An upper spring 308, a lens carrier 310, a screening can 312, an optical image stabilization flexible printed circuit (OIS FPC) 314 with embedded coils, and a lower spring 316.

Figure 3B:
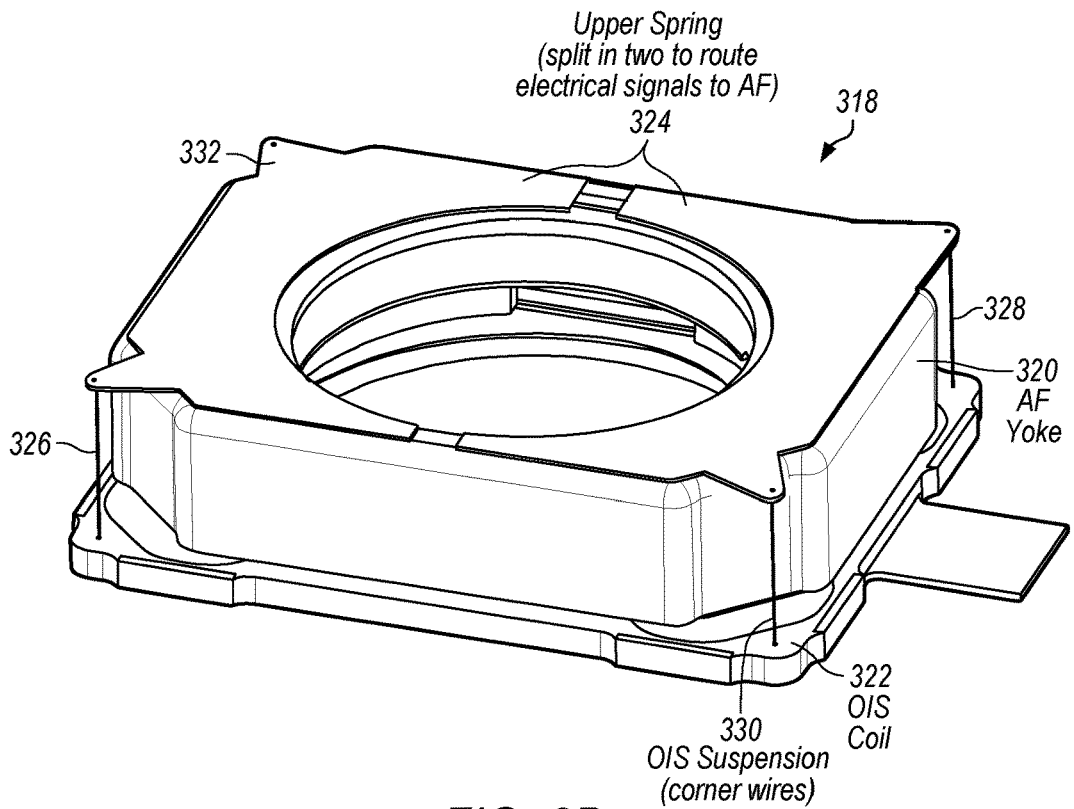
FIG. 3B illustrates an actuator with the outer screening can hidden, according to some embodiments.

FIG. 3B illustrates an actuator with the outer screening can hidden, according to some embodiments. More of the mechanism can thus be observed. In some embodiments, actuator 318 includes an autofocus yoke 320, an optical image stabilization coil 322, an upper spring 324, and optical image stabilization suspension corner wires 326-332.

Figure 3C:
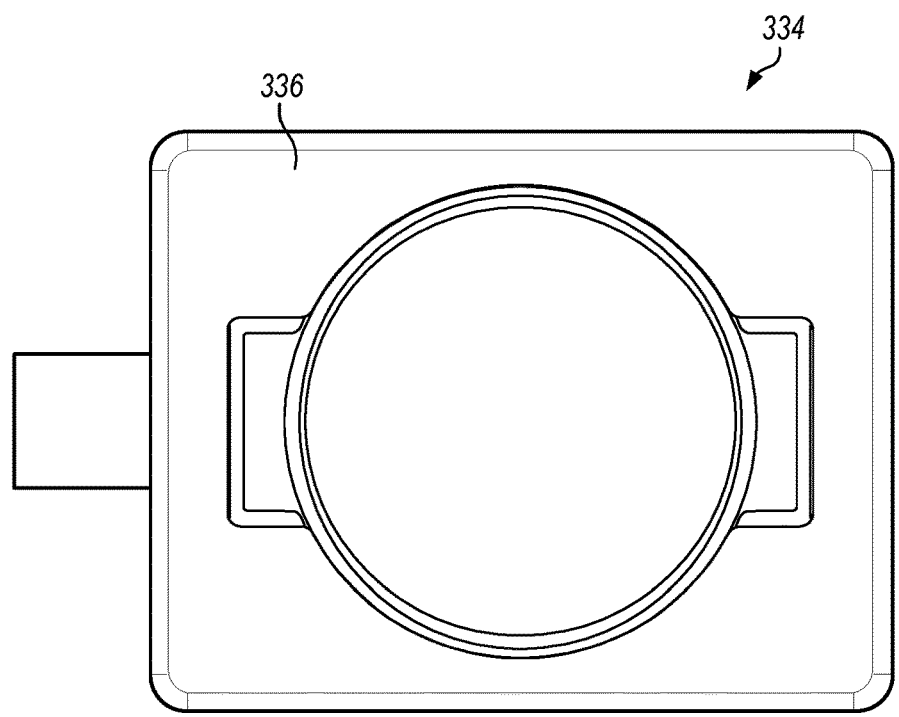
FIG. 3C depicts an actuator in top view, according to some embodiments.
Figure 4:
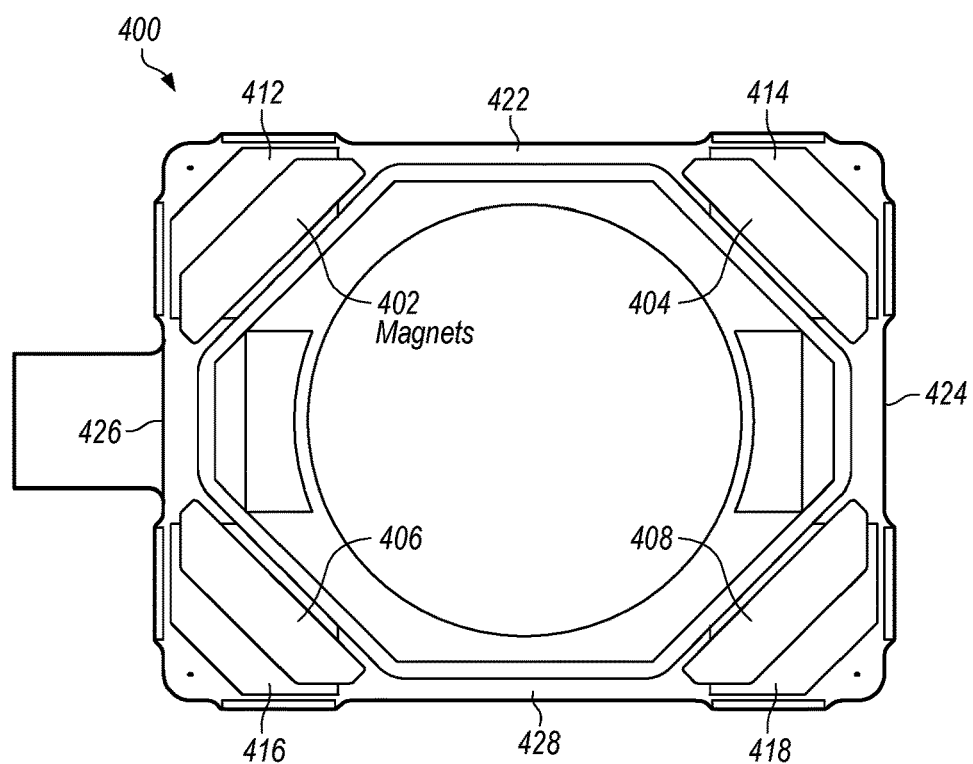
FIG. 4 illustrates an actuator in top view with the outer screening can and yoke hidden, according to some embodiments.

FIG. 3C depicts an actuator 334 in plan view, according to some embodiments. Screening can 336 is included in this view. FIG. 4 illustrates an actuator in plan view with the outer screening can and yolk hidden, according to some embodiments. FIG. 4 shows an identical perspective view of actuator 400 as FIG. 3C, however with the autofocus yoke hidden to reveal the internal components, such as magnets 402-408 and optical image stabilization coils 412-418.

Figure 5:
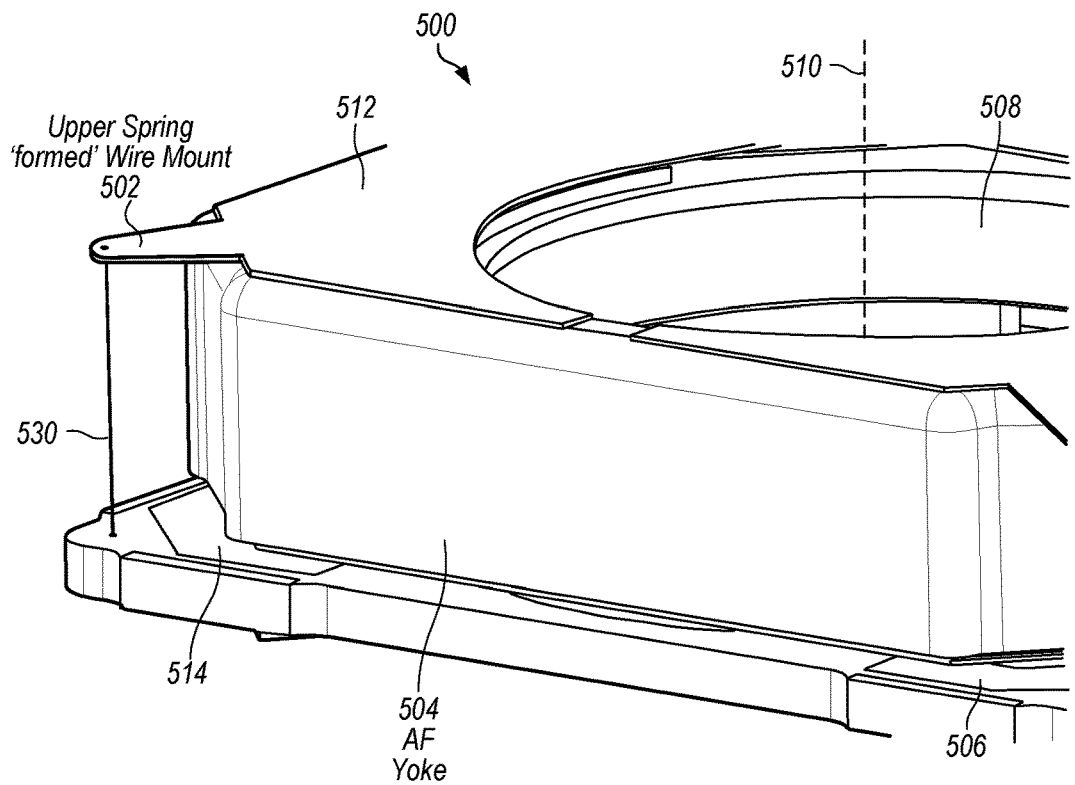
FIG. 5 depicts an actuator with the outer screening can hidden in perspective view, according to some embodiments.

FIG. 5 depicts the actuator in the same state of assembly as 3B, but shows a closer perspective view of one corner of the actuator 500. An autofocus yoke 504 and a wire mount 502 are shown. A basic autofocus voice coil motor configuration of actuator 500 consists of a single autofocus coil (not shown) wound onto a threaded lens carrier 508, into which the lens (not shown) is subsequently screwed. An autofocus yoke component 504 supports and houses four magnets (not shown in this view) in the corners. Each magnet is poled so as to generate a magnetic field, the useful component of which for the autofocus function is orthogonal to the optical axis 510, and orthogonal to the plane of each magnet proximate to the autofocus coil, and where the field for all four magnets are all either directed towards the autofocus coil, or away from it, so that the Lorentz forces from all four magnets act in the same direction along the optical axis 510.

The autofocus yoke 504 acts as the support chassis structure for the autofocus mechanism of actuator 500. The lens carrier 508 is suspended on the autofocus yoke 504 by an upper spring 512 and a lower spring (not visible in this view). In this way when an electric current is applied to the autofocus coil, Lorentz forces are developed due to the presence of the four magnets, and a force substantially parallel to the optical axis 510 is generated to move the lens carrier 508, and hence lens, along the optical axis 510, relative to the support structure of the autofocus mechanism of actuator 500, so as to focus the lens. In addition to suspending the lens carrier 508 and substantially eliminating parasitic motions, the upper spring 512 and lower spring also resist the Lorentz forces, and hence convert the forces to a displacement of the lens. This basic architecture in FIGS. 3A-8 is typical of some embodiments, in which optical image stabilization function includes moving the entire autofocus mechanism of actuator 500 (supported by the autofocus yoke 504) in linear directions orthogonal to the optical axis 510, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

Embodiments achieve this two independent degree-of-freedom motion by using two pairs of optical image stabilization coils (e.g., such as 506 and 514), each pair acting together to deliver controlled motion in one linear axis orthogonal to the optical axis 510, and each pair delivering controlled motion in a direction substantially orthogonal to the other pair. These optical image stabilization coils 506 and 514 are fixed to the camera actuator 500 support structure, and when current is appropriately applied, optical image stabilization coils 506 and 514 generate Lorentz forces on the entire autofocus mechanism of actuator 500, moving it as desired. The required magnetic fields for the Lorentz forces are produced by the same four magnets that enable to the Lorentz forces for the autofocus function. However, since the directions of motion of the optical image stabilization movements are orthogonal to the autofocus movements, it is the fringing field of the four magnets that are employed, which have components of magnetic field in directions parallel to the optical axis 510.

Figure 6:
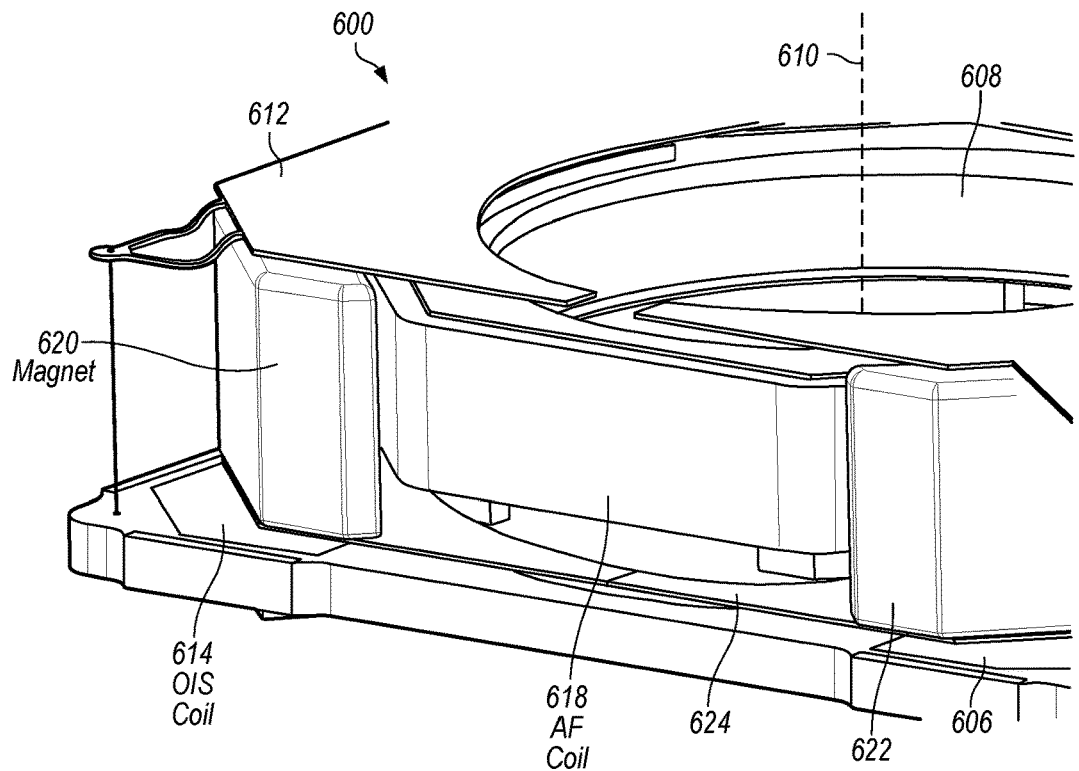
FIG. 6 illustrates an actuator with the outer screening can and yoke hidden in perspective view, according to some embodiments.

FIG. 6 illustrates an actuator with the outer screening can and yoke hidden in perspective view, according to some embodiments. A basic autofocus voice coil motor configuration of actuator 600 consists of a single autofocus coil 618 wound onto a threaded lens carrier 608, into which the lens (not shown) is subsequently screwed. An autofocus yoke component (not shown) supports and houses four magnets (e.g., 620-622) in the corners. Each magnet (e.g., 620-622) is poled so as to generate a magnetic field, the useful component of which for the autofocus function is orthogonal to the optical axis 610, and orthogonal to the plane of each magnet (e.g., 620-622) proximate to the autofocus coil 618, and where the field for all four magnets are all either directed towards the autofocus coil 618, or away from the autofocus coil 618, so that the Lorentz forces from all four magnets (e.g., 620-622) act in the same direction along the optical axis 610.

The autofocus yoke (not shown) acts as the support chassis structure for the autofocus mechanism of actuator 600. The lens carrier 608 is suspended on the autofocus yoke by an upper spring 612 and a lower spring 624. In this way when an electric current is applied to autofocus coil 618, Lorentz forces are developed due to the presence of the four magnets (e.g., 620-622), and a force substantially parallel to the optical axis 610 is generated to move the lens carrier 608, and hence lens, along the optical axis 610, relative to the support structure of the autofocus mechanism of actuator 600, so as to focus the lens. In addition to suspending the lens carrier 608 and substantially eliminating parasitic motions, the upper spring 612 and lower spring 624 also resist the Lorentz forces, and hence convert the forces to a displacement of the lens. This basic architecture in FIGS. 3A-8 is typical of some embodiments, in which optical image stabilization function includes moving the entire autofocus mechanism of actuator 600 (supported by the autofocus yoke) in linear directions orthogonal to the optical axis 610, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

Embodiments achieve this two independent degree-of-freedom motion by using two pairs of optical image stabilization coils (e.g., such as 606 and 614), each pair acting together to deliver controlled motion in one linear axis orthogonal to the optical axis 610, and each pair delivering controlled motion in a direction substantially orthogonal to the other pair. These optical image stabilization coils 606 and 614 are fixed to the camera actuator 600 support structure, and when current is appropriately applied, optical image stabilization coils 606 and 614 generate Lorentz forces on the entire autofocus mechanism of actuator 600, moving it as desired. The required magnetic fields for the Lorentz forces are produced by the same four magnets (e.g., 620-622) that enable to the Lorentz forces for the autofocus function. However, since the directions of motion of the optical image stabilization movements are orthogonal to the autofocus movements, it is the fringing field of the four magnets (e.g., 620-622) that are employed, which have components of magnetic field in directions parallel to the optical axis 610.

Figure 7:
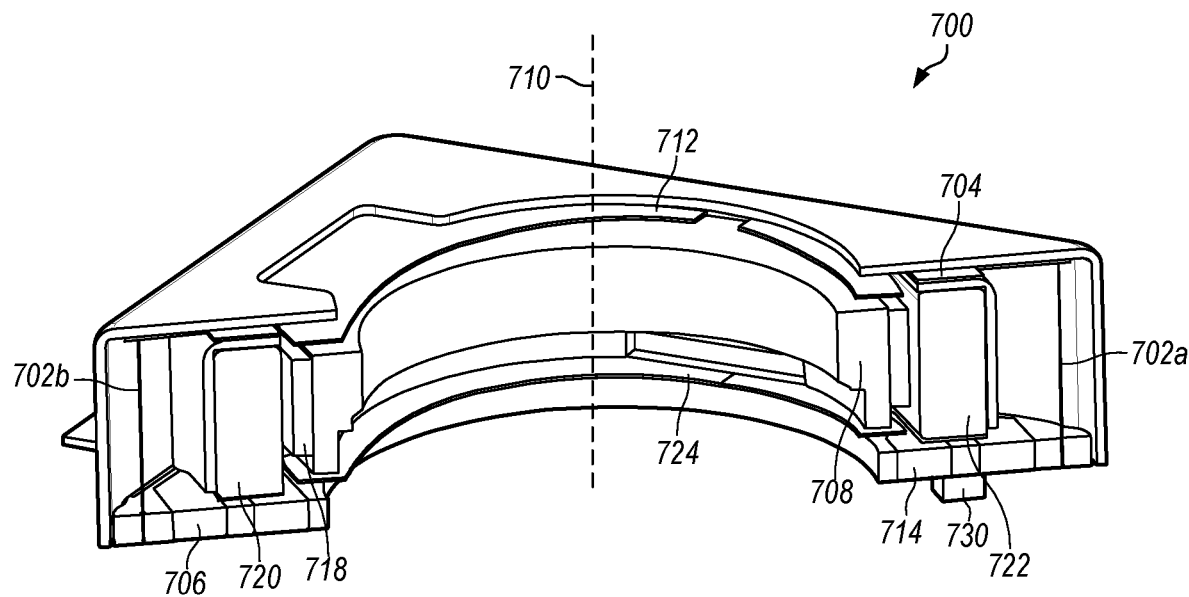
FIG. 7 illustrates an actuator with the outer screening can and yoke hidden in cutaway view, according to some embodiments.

FIG. 7 illustrates an actuator with the outer screening can and yoke hidden in cutaway view, according to some embodiments. An autofocus yoke 704 and a wire mounts 702a-702b are shown. A basic autofocus voice coil motor configuration of actuator 700 consists of a single autofocus coil 718 wound onto a threaded lens carrier 708, into which the lens (not shown) is subsequently screwed. An autofocus yoke component 704 supports and houses four magnets (e.g., 720 and 722) in the corners. Each magnet is poled so as to generate a magnetic field, the useful component of which for the autofocus function is orthogonal to the optical axis 710, and orthogonal to the plane of each magnet (e.g., 720 and 722) proximate to the autofocus coil 718, and where the field for all four magnets (e.g., 720 and 722) are all either directed towards the autofocus coil 718, or away from autofocus coil 718, so that the Lorentz forces from all four magnets (e.g., 720 and 722) act in the same direction along the optical axis 710. A Hall sensor 730 is shown.

The autofocus yoke 704 acts as the support chassis structure for the autofocus mechanism of actuator 700. The lens carrier 708 is suspended on the autofocus yoke 704 by an upper spring 712 and a lower spring 724. In this way when an electric current is applied to autofocus coil 718, Lorentz forces are developed due to the presence of the four magnets (e.g., 720 and 722), and a force substantially parallel to the optical axis 710 is generated to move the lens carrier 708, and hence lens, along the optical axis 710, relative to the support structure of the autofocus mechanism of actuator 700, so as to focus the lens. In addition to suspending the lens carrier 708 and substantially eliminating parasitic motions, the upper spring 712 and lower spring 724 also resist the Lorentz forces, and hence convert the forces to a displacement of the lens. This basic architecture in FIGS. 3A-8 is typical of some embodiments, in which optical image stabilization function includes moving the entire autofocus mechanism of actuator 700 (supported by the autofocus yoke 704) in linear directions orthogonal to the optical axis 710, in response to user handshake, as detected by some means, such a two or three axis gyroscope, which senses angular velocity. The handshake of interest is the changing angular tilt of the camera in 'pitch and yaw directions', which can be compensated by said linear movements of the lens relative to the image sensor.

Embodiments achieve this two independent degree-of-freedom motion by using two pairs of optical image stabilization coils (e.g., such as 706 and 714), each pair acting together to deliver controlled motion in one linear axis orthogonal to the optical axis 710, and each pair delivering controlled motion in a direction substantially orthogonal to the other pair. These optical image stabilization coils 706 and 714 are fixed to the camera actuator 700 support structure, and when current is appropriately applied, optical image stabilization coils 706 and 714 generate Lorentz forces on the entire autofocus mechanism of actuator 700, moving it as desired. The required magnetic fields for the Lorentz forces are produced by the same four magnets that enable to the Lorentz forces for the autofocus function. However, since the directions of motion of the optical image stabilization movements are orthogonal to the autofocus movements, it is the fringing field of the four magnets that are employed, which have components of magnetic field in directions parallel to the optical axis 710.

Figure 8:
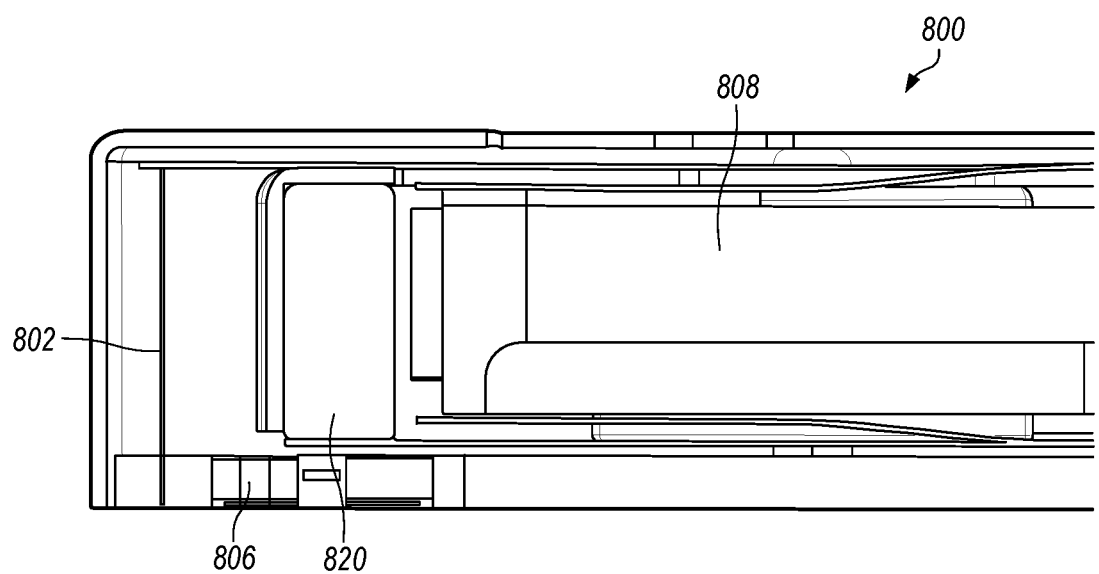
FIG. 8 depicts an actuator in elevation view, showing a cross-section through a corner, according to some embodiments.

FIG. 8 depicts an actuator in elevation view, showing a cross-section through a corner, according to some embodiments. Within actuator 800, suspension wire 802, optical image stabilization coil 806, magnet 820 and lens carrier 808 are marked. FIGS. 4, 6, 7 and 8 illustrate how the optical image stabilization coils are arranged relative to the magnets mounted in the AF mechanism.

Figure 9:
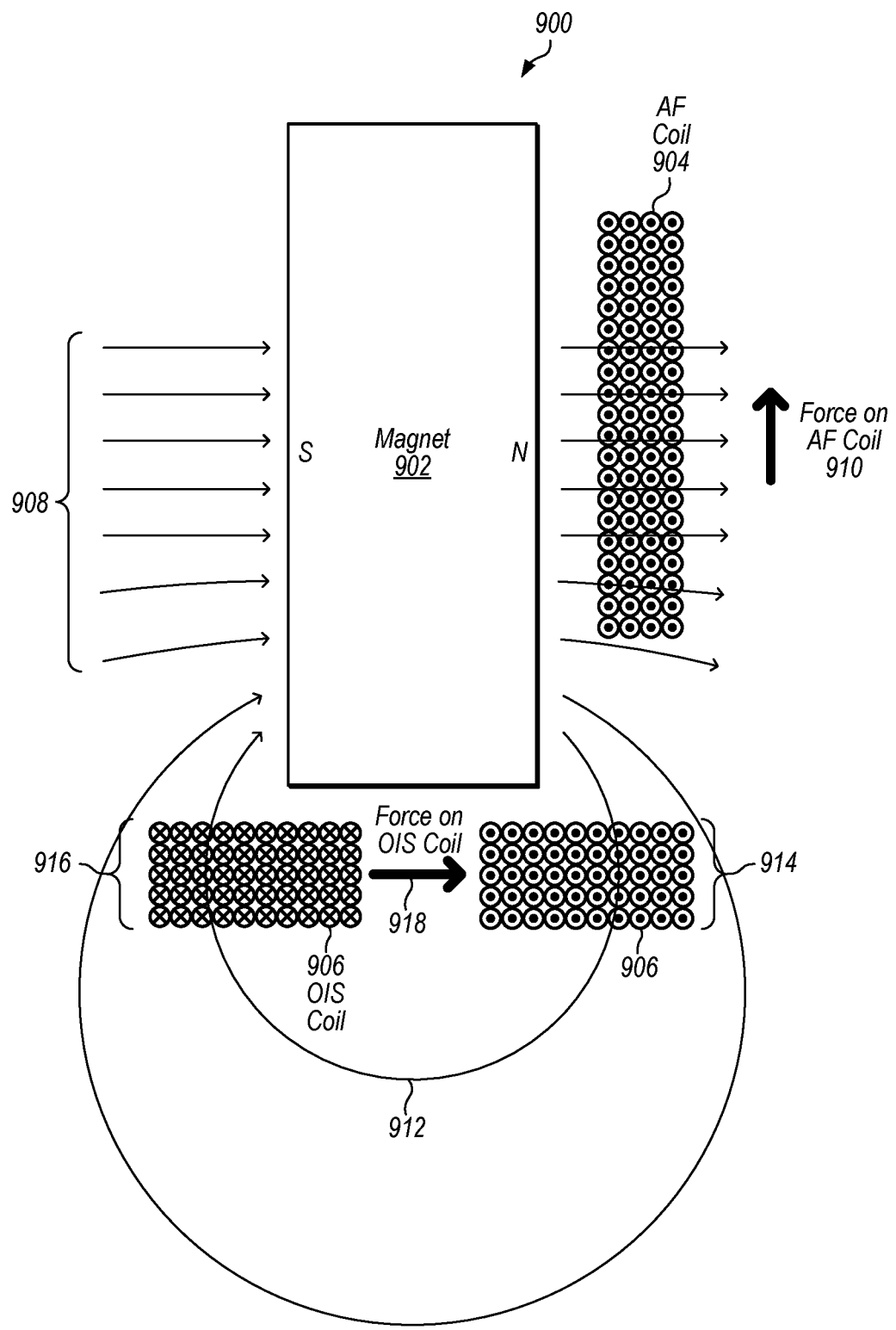
FIG. 9 illustrates a schematic view of a magnet and coil configuration, according to some embodiments.

FIG. 9 illustrates a schematic view of a magnet and coil configuration, according to some embodiments. FIG. 9 is a schematic representation 900 of a cross-section, similar to FIGS. 7 and 8, through one magnet 902, the autofocus coil 904 and an optical image stabilization coil 906. A magnetic field component 908 is 'horizontal' and enables the Lorentz force for the autofocus function 910. However, also note that the fringing field 912 cuts through each half of the optical image stabilization coil 906, with the 'vertical' component of the field 912 in the opposite direction in each half of the optical image stabilization coil 906. Note also that since the optical image stabilization coil 906 is contiguous, the direction of current flow in each half of the optical image stabilization coil 906 is also opposite. This is illustrated by the 'dots' 914 in each wire of one half of optical image stabilization coil 906 indicating current coming out of the page, whilst the 'crosses' 916 in each wire of the other half of optical image stabilization coil 906 indicating current going into the page. Hence the Lorentz force 918 generated in each half of optical image stabilization coil 906 is in the same direction, in this case to the right. And the Lorentz force in the autofocus coil 910 is upwards.

Returning to FIG. 5, the suspension of the autofocus mechanism on the actuator 500 support structure is achieved by the use of four corner wires (e.g., 530), of most desirably circular cross-section. Wire 530 acts as a flexure beams capable of bending with relatively low stiffness, thus allowing motion in both optical image stabilization degrees-of-freedom. However, wire 530 is in some embodiments relatively stiff in directions parallel to the optical axis, as this would require the wire to stretch or buckle, thus substantially preventing parasitic motions in these directions. In addition, the presence of four such wires, appropriately separated allows them to be stiff in the parasitic tilt directions of pitch and yaw, thus substantially preventing relative dynamic tilt between the lens and image sensor. This may be seen by appreciating that each wire 530 is stiff in directions that require it to change in length, and hence the fixed points at the ends of each wire (eight points in total) will substantially form the vertices of a parallelepiped for all operational positions of the optical image stabilization mechanism.

Note that owing to the tough shock and drop testing requirements for multifunction devices, some embodiments provide a means to decouple the optical image stabilization suspension wires from motions of the autofocus mechanism along the optical axis caused by such shock. The decoupling means can be stiff at operational loads, but sufficiently compliant to accommodate the allowable motion of the autofocus mechanism, and hence prevent the corner wires from stretching and plastically deforming. The decoupling structure (wire mount 502) is embodied as an extension to the autofocus upper spring in each corner. In this way the corner wires 530 are joined to the autofocus yoke via relatively short flexure springs, which are stiff, but allow some motion in extreme conditions. Such structures useful for mechanism reliability, and one is highlighted in FIG. 5.

Referring briefly to FIG. 4, some embodiments feature advantageous arrangement of the position and orientation of the magnets 402-408, with the magnets 402-408 at the corners, where the magnet, and its poling direction are substantially 45 degrees to each side 422-428 of the actuator module 400.

Referring briefly to FIG. 9. the use of the fringing field 912 of the magnet 902 implies that, in some embodiments, each optical image stabilization coil 906 has a larger footprint (width) than the thickness of the magnet. Referring back to FIG. 4, where the optical image stabilization coils 412-418 can be seen either side of the magnets 402-408 (although one part is hidden by the autofocus coil and lens carrier). Some embodiments exploit the observation that, for some applications, the X dimension of the camera is less important than the Y dimension, and the Magnets and optical image stabilization coils 412-418 are moved around the lens to eliminate any impact on the Y dimension.

Some embodiments still maintain the 45 degree angle of the magnets 402-408 and optical image stabilization coils 412-418, so that each pair of optical image stabilization coils 412-418 produces forces substantially orthogonal to the other. However, now each of optical image stabilization coils 412-418 produces a force on the autofocus mechanism that no longer acts through the optical axis, and hence generates a torque around the lens. To combat this, it may be noted that the torque produced by each of optical image stabilization coils 412-418 is nominally equal in magnitude and opposite in direction to the torque produced by its diagonally opposite partner, hence there is nominally no net torque from the pair of optical image stabilization coils 412-418.

In addition, some embodiments provide a mapping to convert the handshake tilt as measured by a tilt sensor (most typically the gyroscope) to movement of the lens in the directions of the two 45 degree axes. In some embodiments, this configuration of magnets 402-408 and optical image stabilization coils 412-418 eliminates the impact on the camera Y dimension from the presence of these components, and the use of the fringing field.

Figure 10:
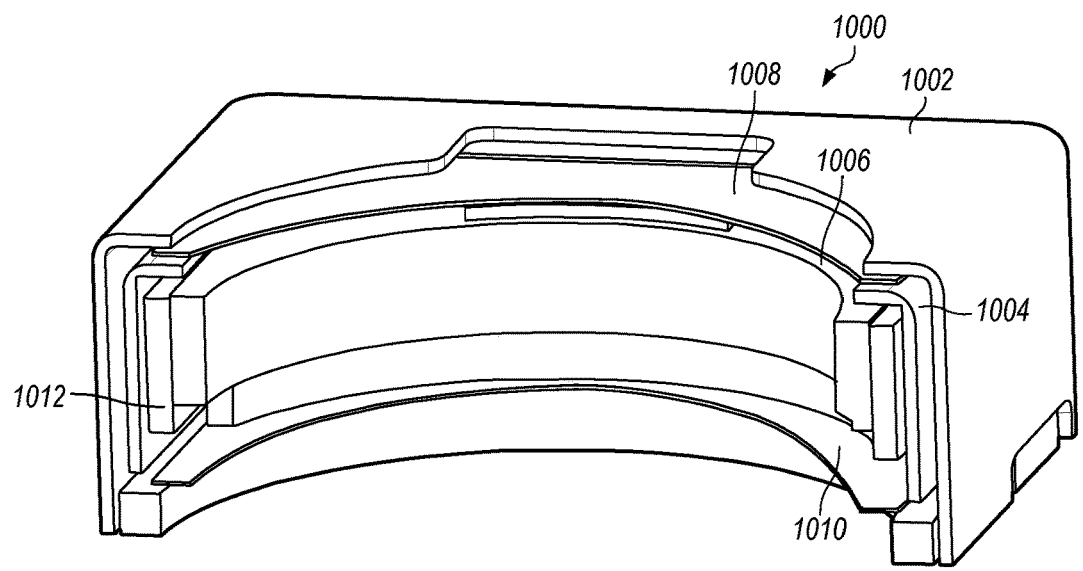
FIG. 10 depicts an actuator in elevation view, showing a cross-section through the middle, parallel to short sides, according to some embodiments.

FIG. 10 depicts an actuator in elevation view, showing a cross-section through the middle, parallel to short sides, according to some embodiments. Actuator 1000 includes screening can 1002, autofocus yoke 1004, autofocus coil 1112, lens carrier 1006, upper spring 1008, and lower spring 1010.

Figure 11:
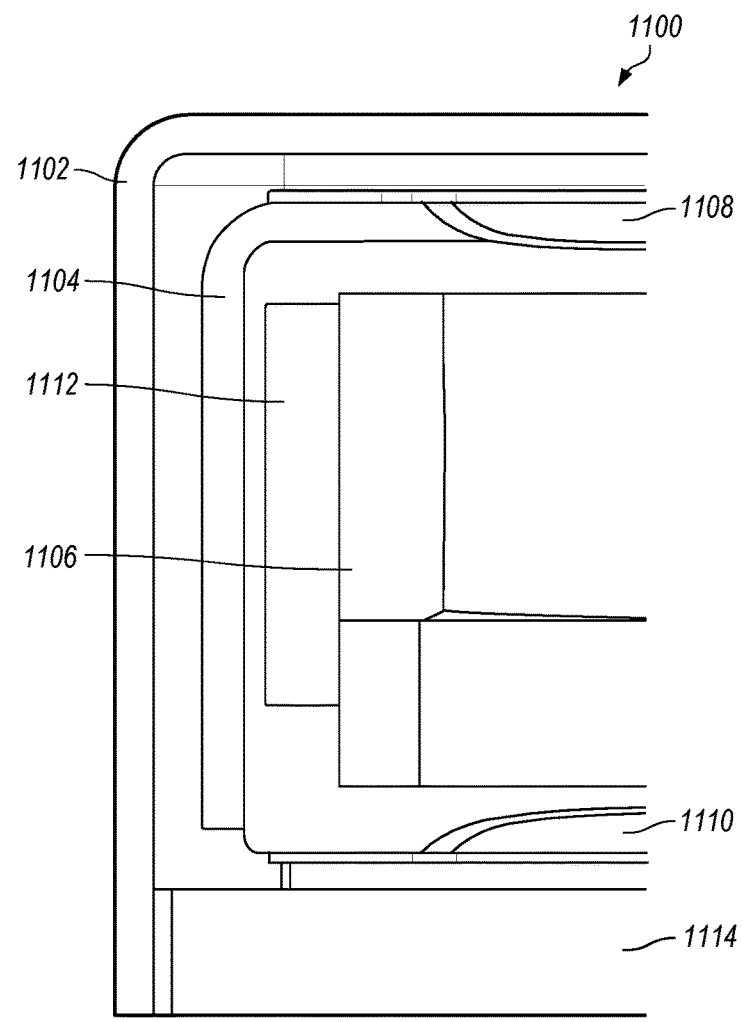
FIG. 11 illustrates an actuator in elevation view, showing a cross-section across the middle, according to some embodiments.

FIG. 11 illustrates an actuator in elevation view, showing a cross-section across the middle, according to some embodiments. Actuator 1100 includes screening can 1102, autofocus yoke 1104, autofocus coil 1112, lens carrier 1106, upper spring 1108, and lower spring 1110.

In some embodiments, the autofocus yoke 1104 forms the autofocus mechanism support structure, such that there are no molded support structure components to the autofocus mechanism. The impact of this aspect of embodiments is apparent in FIGS. 10 and 11. In some embodiments, the Y dimension of the camera is set by a stack up of dimensions:

The lens diameter and thread

The molded wall thickness of the lens carrier 1106 outside the thread

The thickness of the autofocus coil 1112

The gap between the autofocus coil 1112 and the autofocus yoke 1104 (needed to allow relative motion and manufacturing and assembly tolerances)

The thickness of the autofocus yoke 1104

The gap between the autofocus yoke 1104 and the screening can 1102 (needed to allow the optical image stabilization motion and manufacturing and assembly tolerances)

The thickness of the screening can 1102.

The use of the autofocus yoke 1104 as the autofocus mechanism support structure reduces a part of this stack, as the autofocus yoke 1104 thickness is typically 0.1 mm to 0.15 mm. In some embodiments, other improvements are part of the present invention, including using a lens without a thread, and indeed eliminating the lens carrier 1106 altogether and mounting the autofocus coil 1112 directly on the lens.

In addition, some embodiments split the autofocus coil 1112 in four corner coils so that the autofocus coil 1112 does not impact the Y dimension. However, such embodiments frequently use multi-pole magnets, which may reduce the fringing field and hence reduce the Lorentz forces for a given current in the optical image stabilization mechanism.

In some embodiments, the use of the autofocus yoke 1104 as the autofocus mechanism support structure also impacts the Z dimension of the actuator 1100. The upper spring 1108 is mounted directly onto the autofocus yoke 1104, and hence the Z dimension of the structure is minimized. The electrical connections to the autofocus coil 1112 are made by splitting the upper spring 1108 into two pieces, and soldering one end of the autofocus coil 1112 to each half of the upper spring 1108. The electrical signals are then routed down the corner wires (not shown) to the optical image stabilization flexible printed circuit 1114, which in some embodiments forms the base of the actuator 1100, and incorporates the embedded optical image stabilization coils (not shown). This electrical path employs electrical isolation from upper spring 1108 to the autofocus yoke 1104, which is typically a deep drawn from a soft magnetic and electrically conductive sheet metal material. In some embodiments, this is achieved by coating the autofocus yoke 1104 with some kind of non-conductive coating. As an alternative, some kind of thin insulating gasket or other layer is interposed between upper spring 1108 and autofocus yoke 1104 in some embodiments. Nevertheless, in either case, autofocus yoke 1104 is still providing the structural support function of the autofocus mechanism, and forms the rigid mount for upper spring 1108.

Some embodiments include mechanical connections of both upper spring 1108 and lower spring 1110 to the molded lens carrier 1106, typically using a heatstaking process, whereby typically regions of upper spring 1108 and lower spring 1110 with holes are fitted over plastic posts on the lens carrier 1106, which are then heated and pressed to form mushroom heads, hence retaining the upper spring 1108 and lower spring 1110. In some embodiments, these mechanical connections between the lens carrier 1106 and upper spring 1108 and lower spring 1110 are disposed along the X-direction of the lens carrier 1106 (i.e. they are closest to the two short sides of the actuator 1100). There are no mounting points in positions that would impact the Y dimension of the camera.

Some embodiments are designed to minimize the Z dimension of the actuator 1100. Owing to the use of the autofocus yoke 1104 as the support structure to which the upper spring 1108 is effectively bonded (albeit potentially through some kind of thin interposing layer), Upper spring 1108 is at the top of the autofocus mechanism. In some embodiments, the method of attaching the corner wires to the upper spring 1108 is to make a solder joint on the top and more accessible side of the upper spring 1108 and wire in the corners. This means that a solder ball is accommodated on the top side of the upper spring 1108. In this way, the some embodiments solve this issue by forming the corners of the upper spring 1108, as shown in FIG. 5, to make room for the solder ball without impacting the Z dimension. This forming process may introduce variability into these corner regions of the upper spring 1108, and hence is undesirable from a manufacturing perspective. However a tolerance analysis shows that, in some embodiments, this variability has a negligible effect on factors such as stiffness and tilt, and hence is viable.

Figure 12:
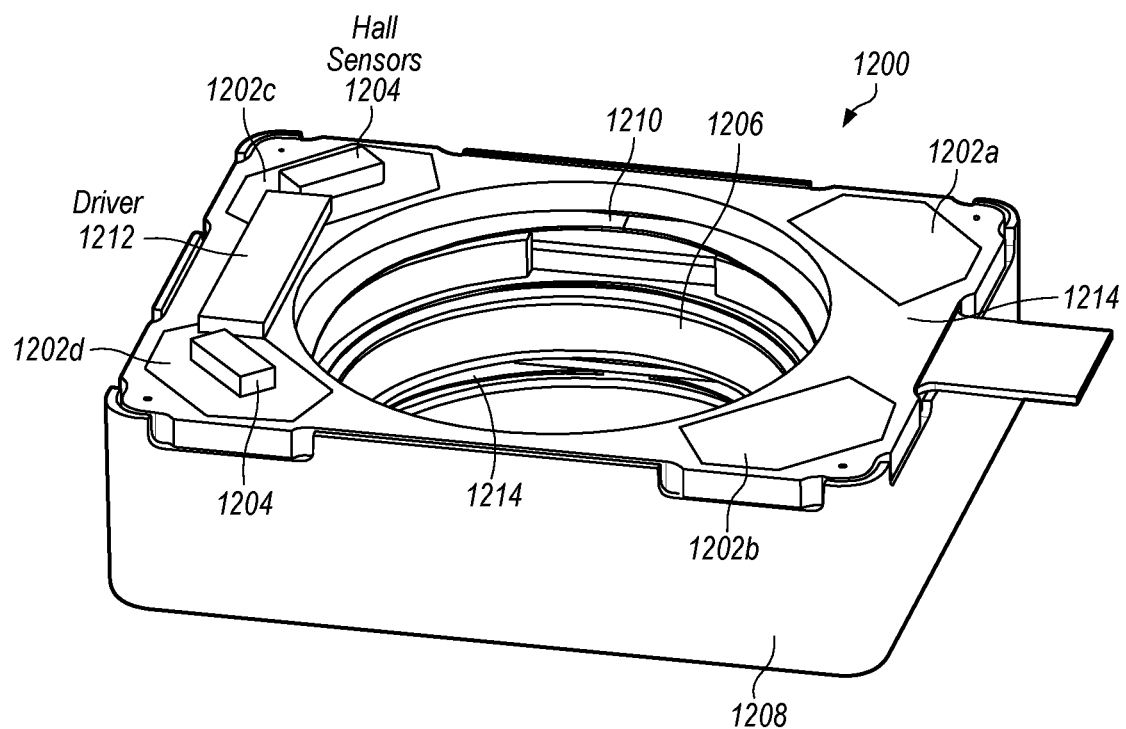
FIG. 12 depicts a complete actuator module, shown from the underside, with two (Hall) position sensors and a driver integrated circuit, according to some embodiments.

Some embodiments incorporate the use of Hall sensors as position sensors of the optical image stabilization mechanism. FIGS. 7 and 12 show the positions of the Hall sensors. FIG. 12 depicts a complete actuator module, shown from the underside, with two (Hall) position sensors and a driver integrated circuit, according to some embodiments. Parts of actuator 1200 that are visible include screening can 1208, lens carrier 1206, lower spring 1210, optical image stabilization coils 1202a-1202d, upper spring 1214, Hall sensors 1204, and driver integrated circuit 1212.

FIG. 12 shows the location of the driver integrated circuit 1212 for both the autofocus and optical image stabilization actuators. Some embodiments place the Hall sensors 1204 at the center of two of the optical image stabilization coils 1202c-1202d, soldered on the underside of the board, and sense the position of the autofocus mechanism based on the same fringing field as used by the optical image stabilization coils 1202c-1202d to generate the Lorentz forces. In this way, extra magnets for use with the Hall sensors 1204 are avoided. Likewise the driver integrated circuit 1212 is also mounted on the underside of the optical image stabilization flexible printed circuit 1214. In this way, size of actuator 1200 is minimized by avoiding the need for extra sensing magnets. In addition, it is some embodiments mount the driver integrated circuit 1212 on the image sensor substrate (not shown), next to the infrared filter (not shown), along with other passive components (not shown) needed for the actuator 1200 and image sensor.

Mounting the Hall sensors 1204 and driver integrated circuit 1212 in the manner shown on the underside of the optical image stabilization flexible printed circuit 1214 utilizes the same space in the camera, only with these components mounted on the actuator rather than the image sensor substrate. This means that the addition of the Hall sensors 1212 has no impact on the camera size. It also allows much of the electrical connectivity between the optical image stabilization coils 1202a-1202d, Hall sensors 1204 and driver integrated circuit 1212 to be contained inside the actuator 1200, and minimizes the electrical terminal required to the substrate to four terminals (power, ground and two communication lines—typically I2C).

Summary of Voice Coil Motor (VCM) Optical Image Stabilization (OIS) Wires

As discussed above, some embodiments provide an actuator module for controlling the position of a lens relative to an image sensor in a miniature camera along three orthogonal axes, one parallel to the optical axis for focus adjustment, and two orthogonal to the optical axis and to each other to compensate for user handshake. The actuator module is substantially cuboid in envelope.

In some embodiments, the actuator consists of four magnets, each poled with magnetic domains substantially aligned in the same direction throughout each magnet, and with each magnet contributing to the forces to adjust focus based on Lorentz forces generated from a single coil driven with an appropriate electric current that is rigidly disposed around the lens and mounted in the magnetic field of each magnet. These four magnets are all mounted to a support structure of the focusing mechanism. The poling directions of each magnet as mounted in the actuator module are substantially orthogonal to the optical axis, and each substantially angled at 45 degrees to at least one of the planar sides of the substantially cuboid actuator module.

The focusing mechanism is suspended on the actuator module support structure by a means that substantially limits the relative motion to linear directions orthogonal to the optical axis, and the fringing magnetic field of each magnet interacts with four additional coils when appropriately driven with electric currents, which are fixed to the actuator module support structure so that components of the fringing magnetic field parallel to the optical axis allow Lorentz forces to be generated in directions orthogonal to the optical axis, and hence these forces can generate controlled motion of the focusing mechanism, and hence lens, in directions orthogonal to the optical axis.

In some embodiments, the substantially rectangular dimensions of the actuator module in directions orthogonal to the optical axis are arranged so that there is a long side and a short side, so that whilst each magnet and fixed coil may together exhibit mirror symmetry about a plane at 45 degrees to at least one side of the actuator module, the combined arrangement of four magnets and four fixed coils does not exhibit mirror symmetry about a plane at 45 degrees to at least one side of the actuator module and through the optical axis.

Some embodiments further include a magnetic yoke component that forms the support structure of the focusing mechanism, in that it directly mounts the four magnets and an upper spring, used to suspend the lens and focusing coil on the focusing mechanism support structure. In some embodiments, a means is provided to electrically insulate the upper spring for the yoke, where the upper spring is split into two portions, each connected to one terminal of the focusing coil, so that in operation they may have different voltages applied so as to drive current through the focusing coil, from the yoke. In some embodiments, the conduction path to the two portions of the upper spring is through the suspension mechanism that guides the focusing mechanism to only substantially move in linear directions orthogonal to the lens optical axis, relative to the actuator module fixed support structure.

Some embodiments further include a lower spring, also used in combination with the upper spring to suspend the lens and focusing coil on the focusing mechanism support structure. In some embodiments, the lower spring is mounted on the four magnets, between the magnets and the four fixed coils.

In some embodiments, the Upper Spring has portions in each corner to join in each corner to a wire oriented substantially parallel to the optical axis, that collectively act to suspend the focusing mechanism to the actuator module support structure. The substantially planar upper spring is plastically formed out of plane in each corner to make space for the solder connection between the upper spring and the wires.

Some embodiments further include a printed circuit board, or flexible printed circuit, to which the four fixed coils are either embedded in as part of the manufacturing process of the board, or onto which they are mounted, the board being part of the fixed actuator module support structure, and oriented so that the plane of the board is orthogonal to the optical axis. Two Hall sensors are mounted to the board in the center of two of the fixed coils on the opposite side of the board from the magnets, which can sense the position of the focusing mechanism when appropriately electrically connected. A driver integrated circuit is also mounted to the underside of the board, which connects to the Hall sensors and provides the drive currents for the five coils as appropriate.

Figure 13:
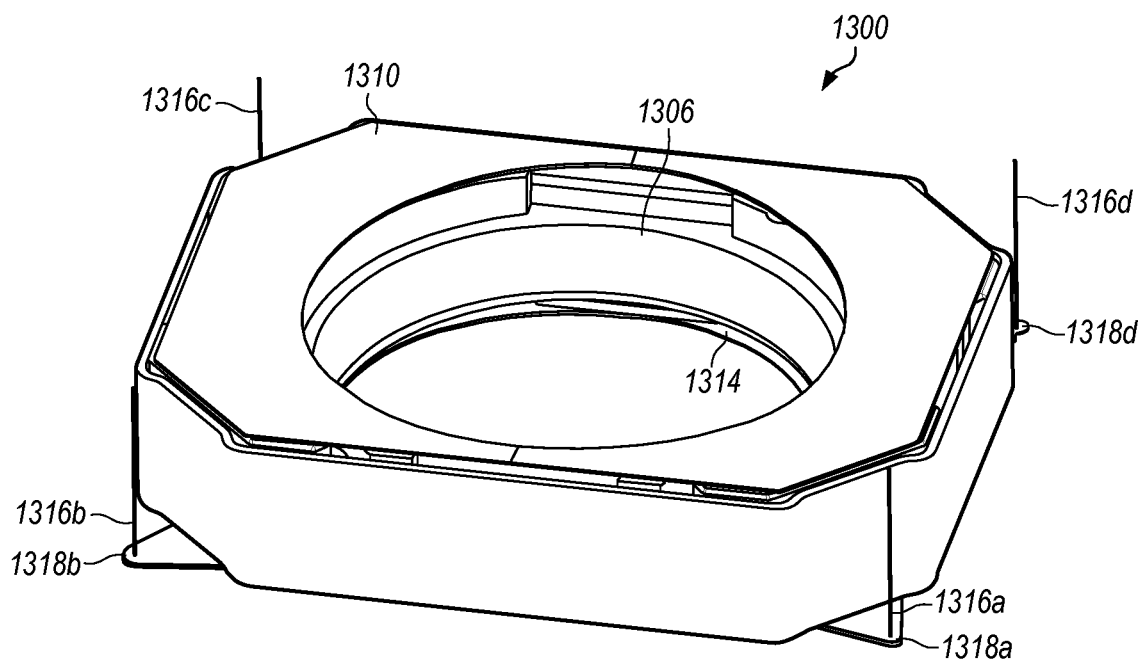
FIG. 13 illustrates an actuator module, shown from the underside, with (Hall) position sensors, driver integrated circuit, OIS coil FPC, and can hidden to reveal the lower spring, according to some embodiments.

FIG. 13 illustrates an actuator module, shown from the underside, with (Hall) position sensors, driver integrated circuit, optical image stabilization coil, flexible printed circuit, and can hidden to reveal the lower spring, according to some embodiments. Parts of actuator 1300 that are visible include lens carrier 1306, lower spring 1310, upper spring 1314, corner wires 1316a-d and flexure springs 1318a-d.

Voice Coil Motor Optical Image Stabilization Shape Memory Alloy Wires

In some embodiments, the voice coil motor optical image stabilization mechanism described above provides an actuator module and mechanism to deliver three linear degrees-of-freedom of controlled relative motion between a fixed image sensor and a moving lens. One degree of freedom is linear movement of the lens parallel to the lens optical axis used for focusing the lens to different object distances. The other two degrees of freedom are linear motions in direction orthogonal to the optical axis, with each orthogonal to the other. These are used to compensate for user handshake, which causes pitch and yaw tilt of the entire camera, and hence allows for longer exposure times for a given level of blur in the resulting images.

Some embodiments provide an augmentation of the above-discussed voice coil motor optical image stabilization actuator architecture, which adds two further degrees of freedom to the controlled motion of the lens relative to the image sensor; these being pitch and yaw tilt of the lens relative to the image sensor (i.e. tilt of the lens about two axes orthogonal to each other and both orthogonal to the optical axis). In some embodiments, these extra degrees of freedom augment camera performance largely by substantially eliminating the relative tilt between the lens optical axis, and an axis orthogonal to the plane of the image sensor. Nominally these axes are parallel, however manufacturing tolerances, and inertial effects of the lens can introduce parasitic relative tilts.

For example, manufacturing tolerances may mean that for a given camera, when at its neutral position, the lens optical axis is naturally tilted to an axis orthogonal to the plane of the image sensor. The addition of mechanisms to perform optical image stabilization may worsen such tilt manufacturing tolerances. In addition, further tolerances may mean that at different positions of the three controlled linear degrees of freedom, the relative tilt may be different. In addition, particularly for complex and size constrained mechanisms, such as the optical image stabilization mechanism, the center of gravity of the lens is not located as the center of the lens suspension structure, meaning that different orientations of the camera may alter the tilt of the lens relative to the image sensor (known as posture dependent tilt). Hence, for these reasons, the addition of active tilt compensation to some embodiments, either based on a factory calibration, or on sensors that detect the orientation of the camera, or on feedback from captured images is advantageous to camera performance.

Figure 14A:
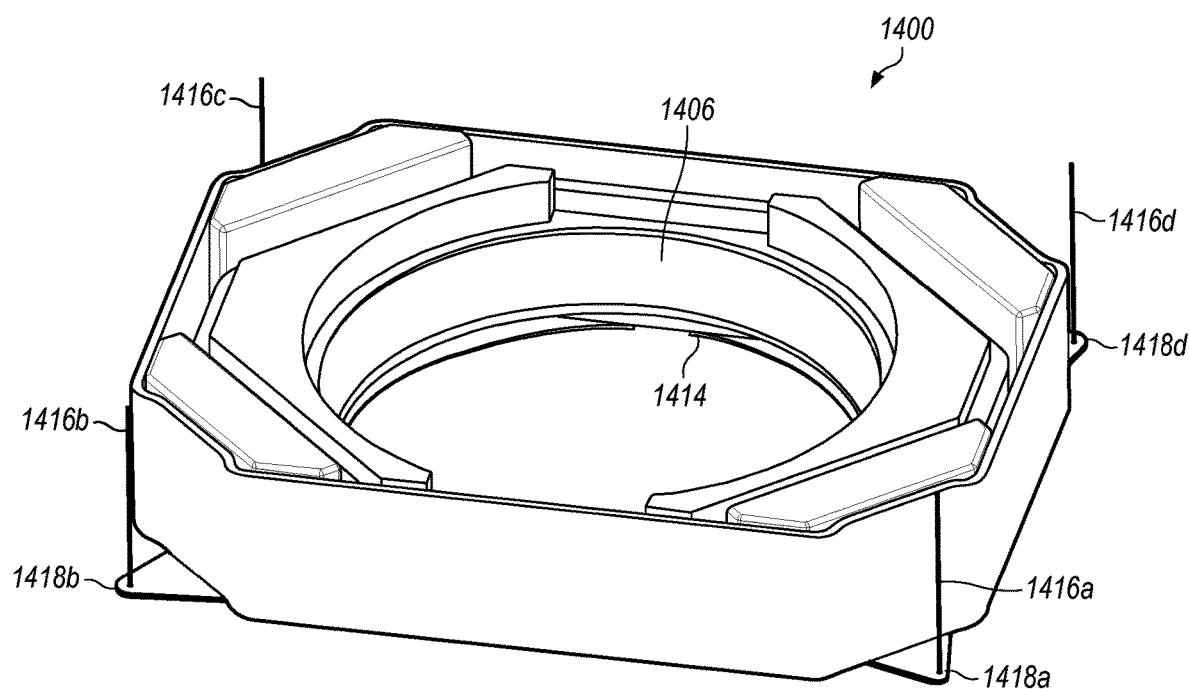
FIG. 14A depicts an actuator module, shown from the underside, with the lower spring removed, according to some embodiments.

FIG. 14A depicts an actuator module, shown from the underside, with the lower spring removed, according to some embodiments. Parts of actuator 1400 that are visible include lens carrier 1406, upper spring 1414, corner wires 1416a-d and flexure springs 1418a-d.

Figure 14B:
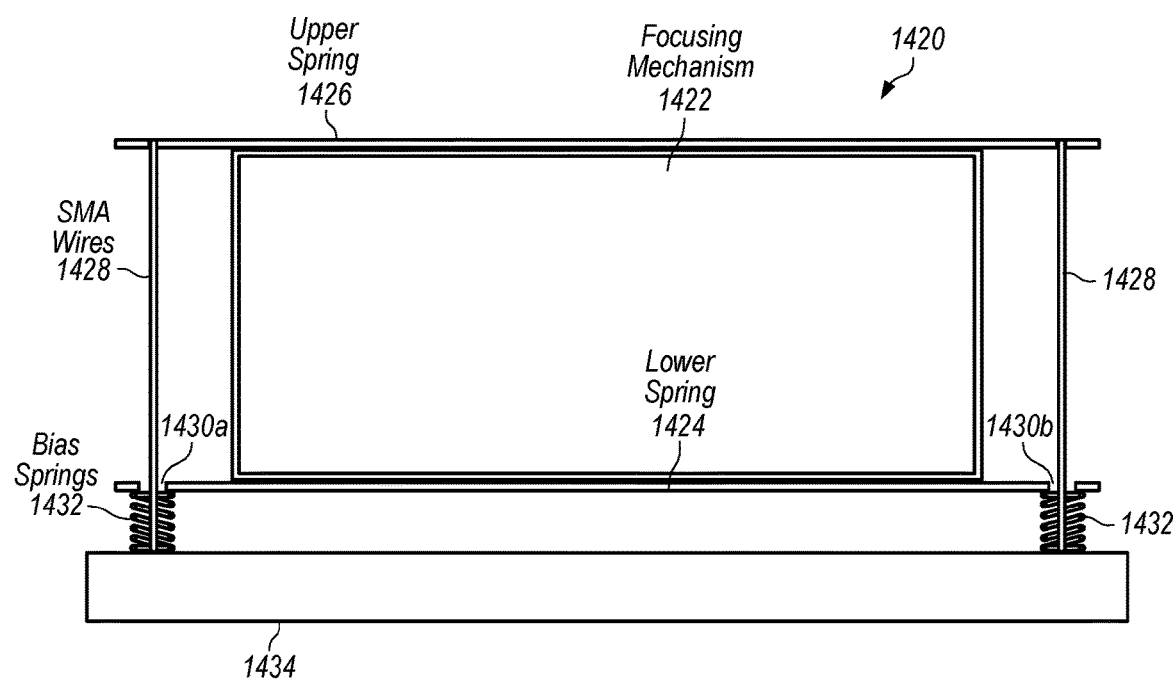
FIG. 14B illustrates a schematic representation of SMA corner wires and bias springs to allow active lens tilt, according to some embodiments.

FIG. 14B illustrates a schematic representation of shape memory alloy corner wires and bias springs to allow active lens tilt, according to some embodiments. While some embodiments incorporate a different mechanism for this function, some embodiments incorporate a mechanism, depicted below, to add these tilt degrees of freedom to the voice coil motor optical image stabilization actuator module, as is shown schematically shown in FIG. 14B. FIG. 14B illustrates a schematic representation of SMA corner wires 1428 and bias springs 1432 to allow active lens tilt, according to some embodiments. Parts of actuator 1420 that are visible include focusing mechanism 1422, lower spring 1424, upper spring 1426, and corner (shape memory alloy) wires 1428.

In some embodiments, the corner wires 1428, which perform the function of suspending the focusing mechanism 1422 on the support structure of the actuator 1420, so as to substantially prevent parasitic motions, whilst allowing movement in linear directions orthogonal to the lens optical axis, are formed of shape memory alloy (SMA).

In some embodiments, shape memory alloy includes a class of materials that undergo a solid state phase change when appropriately heated or cooled, and where, depending on the mechanical configuration, this phase change has an associated change in shape. In some embodiments, the shape memory alloy corner wires 1428 are made from Nitinol, a binary alloy of Nickel and Titanium. At 'high' temperature, the crystal structure is in an austenite phase, which is a conventional and largely linear phase, where strain is substantially proportional to stress. At 'lower' temperature, the material enters a martensite phase, which can be highly non-linear, and under load in a certain range can exhibit high strains for relatively little change in stress.

In some embodiments, such material is used as a corner wire 1428, where its grain structure can be adjusted to give high fatigue life. In addition, it is typical to operate such shape memory alloy wires 1428 against a bias spring 1432. A single actuator of shape memory alloy wire 1428 and bias spring 1432 is typically configured such that the bias spring 1432 stretches the shape memory alloy wire 1428. When the shape memory alloy wire 1428 is heated and changes to an austenite rich phase, it becomes stiff and shortens. When the shape memory alloy wire 1428 is allowed to cool and enters its martensite phase, it becomes less stiff and stretches under the action of the bias spring 1432.

Some embodiments use four such shape memory alloy wires 1428 in this configuration, acting against a passive bias spring 1432. In some embodiments, the shape memory alloy wires 1428 are sufficiently stiff to successfully act as the suspension mechanism for the focusing mechanism on the support structure of the actuator module 1420, and hence guide the optical image stabilization motion. However when one wire 1428 is heated through resistive heating by passing an electric current through it, it shortens, which will tilt that corner of the focusing mechanism. Likewise for a second corner, the current through the shape memory alloy wire 1428 may be reduced, allowing it to cool, and hence allowing the bias spring 1432 in that corner to stretch the wire 1428. In this way the shape memory alloy wires 1428 in the four corners are used in combination to tilt the focusing mechanism about two orthogonal axes, both orthogonal to the optical axis.

Describing FIG. 14B in more detail, one end of each of shape memory alloy wires 1428 is fixed to corner extensions of the upper spring 1426. Each of shape memory alloy wires 1428 passes through holes 1430a-b in similar corner extensions of the lower spring 1424, although there is no contact between the shape memory alloy wires 1428 and the lower spring 1424. These lower spring 1424 corner extensions act as mounting points of the bias springs 1432, most preferably configured so that each is coaxial with its respective one of shape memory alloy wires 1428. With helical bias springs 1432 as shown, the shape memory alloy wires 1428 may pass through the center of the bias springs 1432. The bias springs 1432 are designed so that its stiffness in directions orthogonal to the optical axis is small, so that it has a small effect on the optical image stabilization suspension function.

However, by reacting against the extensions of lower spring 1424 and the fixed actuator base 1434, and hence being in compression, the force from the bias springs 1432 tends to stretch the shape memory alloy wires 1428. In this way, the length of each of shape memory alloy wires 1428 can be adjusted by adjusting the current through each of shape memory alloy wires 1428. Hence this enables active tilt control of the lens and focusing mechanism, which minimally adding to the size of the actuator.

With respect to the electrical connectivity of the autofocus coil (not shown) and four corner shape memory alloy wires 1428, in some embodiments, the autofocus mechanism is bi-directional. In some such embodiments, the autofocus coil requires two terminals that can both change their voltage, hence neither can be used as, for example, a ground terminal that could also be used for the shape memory alloy wires 1428.

As a result, in some embodiments, the lower spring 1424 is split into at least two portions. One terminal of the autofocus coil (not shown) is electrically connected to a different portion of the lower spring 1424. The lower spring 1424 is electrically isolated from the focusing mechanism support structure to avoid short-circuiting the autofocus coil. Electrical connection is made between the two portions of the lower spring 1424 electrically connected to the autofocus coil and the respective bias springs 1432 for the shape memory alloy wires 1428 in the corners of the actuator module 1420. The bias springs 1432 then route the electrical signal for the autofocus coil to the base support structure 1434 of the actuator module 1420. This base support structure 1434 will incorporate some means for electrically connecting to the bias springs 1432.

One embodiment is for the base support structure 1434 to include a flexible printed circuit board to route the connections, and possibly also mount the drive circuitry. In this way the lower spring 1424 and bias springs 1432 route the electrical connections to the autofocus coil. At least two bias springs 1432 and two corners of the lower spring 1424 are used.

Considering the expected electrical connectivity to the shape memory alloy wires 1428, one configuration is to utilize the connections each of shape memory alloy wires 1428 makes to the upper spring 1426, which is configured as one piece. Means is provided for electrically grounding the upper spring 1426 (or holding it at another convenient constant voltage). This may be provided by routing an electrical connection within the focusing mechanism between the upper spring 1426, and a third portion of the lower spring 1424, which is then electrically connected to a third bias spring 1432. In this way, the other ends of the shape memory alloy wires 1428, which can be electrically connected to the base support structure 1434 of the actuator module 1420, may each be independently driven with a different electrical current, such that there are four independent electrical controls of the shape memory alloy wires 1428; one for each wire, to allow the two degree of freedom tilt to be controlled. A common mode current to all shape memory alloy wires 1428 will also allow some control of the Z position of the focusing mechanism above the base support structure 1434 of the actuator module 1420, which could be used to compensate for manufacturing tolerances, or lens positioning tolerances within the focusing mechanism.

However this arrangement may leave an extra control degree of freedom, which could manifest itself as a 'lack of fit' where one of shape memory alloy wires 1428 is slack or slightly buckled by the other three shape memory alloy wires 1428. In some embodiments, one solution to this problem is to only use shape memory alloy wires 1428 in three corners of the actuator module 1420; the fourth corner having a regular passive non-shape memory alloy wire. For force symmetry purposes it is in some embodiments still advantageous to assemble a bias spring 1432 in this corner. This passive non-shape memory alloy wire is then used as the ground connection to the upper spring 1426, as required for the three shape memory alloy wires 1428, and hence avoids the need to split the lower spring 1424 into three portions, and the need to make electrical connection within the focusing mechanism between upper spring 1426 and lower spring 1424. Some embodiments eliminate the possibility of independent Z height control of the focusing mechanism, however neatly solving the 'lack of fit' problem, and electrical connectivity problem.

Summary of Voice Coil Motor Optical Image Stabilization Shape Memory Alloy Wires In some embodiments, an actuator module is provided for controlling the position of a lens relative to an image sensor in a miniature camera along three orthogonal linear axes, one parallel to the optical axis for focus adjustment, and two orthogonal to the optical axis and to each other to compensate for user handshake, and two tilt axes, both orthogonal to the optical axis, and to each other.

In some embodiments, the mechanism for moving the lens along the optical axis is suspended on four wires, one in each corner, each substantially parallel to the optical axis, and hence each capable of bending deformations that allow the focusing mechanism to move in linear directions orthogonal to the optical axis, whilst substantially preventing parasitic motions in other direction and hence suspend the focusing mechanism on the actuator module support structure to allow the linear motions required for the handshake correction. In some embodiments, at least three of the corner wires are fabricated from shape memory alloy (SMA), each shape memory alloy wire is configured with a passive bias spring providing a tensile force along the length of the wire, so that when heated by passing an electric current through the wire, or cooled by removing a proportion of the current, the length of each wire can be controlled, and in this way the tilt of the focusing mechanism and the lens relative to the image sensor can be controlled.

In some embodiments, there are at least three passive bias springs, one for each shape memory alloy wire, and each spring reacts between a portion of the focusing mechanism and the actuator support structure. In some embodiments, the passive bias springs route the electrical connection to the focusing mechanism. In some embodiments, one of the corner wires is not fabricated from shape memory alloy material, but is a passive and substantially linear and elastic in its stress and strain characteristic at the operational loads of the actuator module mechanism.

Voice Coil Motor Drive Scheme

Some embodiments further provide a drive scheme for an actuator for a miniature camera, such as may be used in a mobile handheld device or other multifunction device. Some embodiments provide a voice coil motor actuator configuration, which uses 'fixed' magnets and a moving coil around a threaded lens carrier, on which is mounted a threaded lens. Some embodiments further incorporate a method for arranging the actuator and a method of driving the actuator with linear current and voltage sources so as to avoid electrical noise that may disturb the quality of the camera images, or other sensitive devices in the product.

In some embodiments, the actuator module includes four separate autofocus coils, one in each corner of the actuator module, each accompanied by its own magnet. In some embodiments, there is a size advantage to this arrangement, because the autofocus coil no longer proceeds all the way around the lens carrier, and hence minimizes the size of the actuator module. In order to deliver Lorentz forces in the same direction from each side of each coil, some embodiments use dual-pole magnets, where the domains in different portions of the magnet are aligned in opposite directions.

Figure 19:
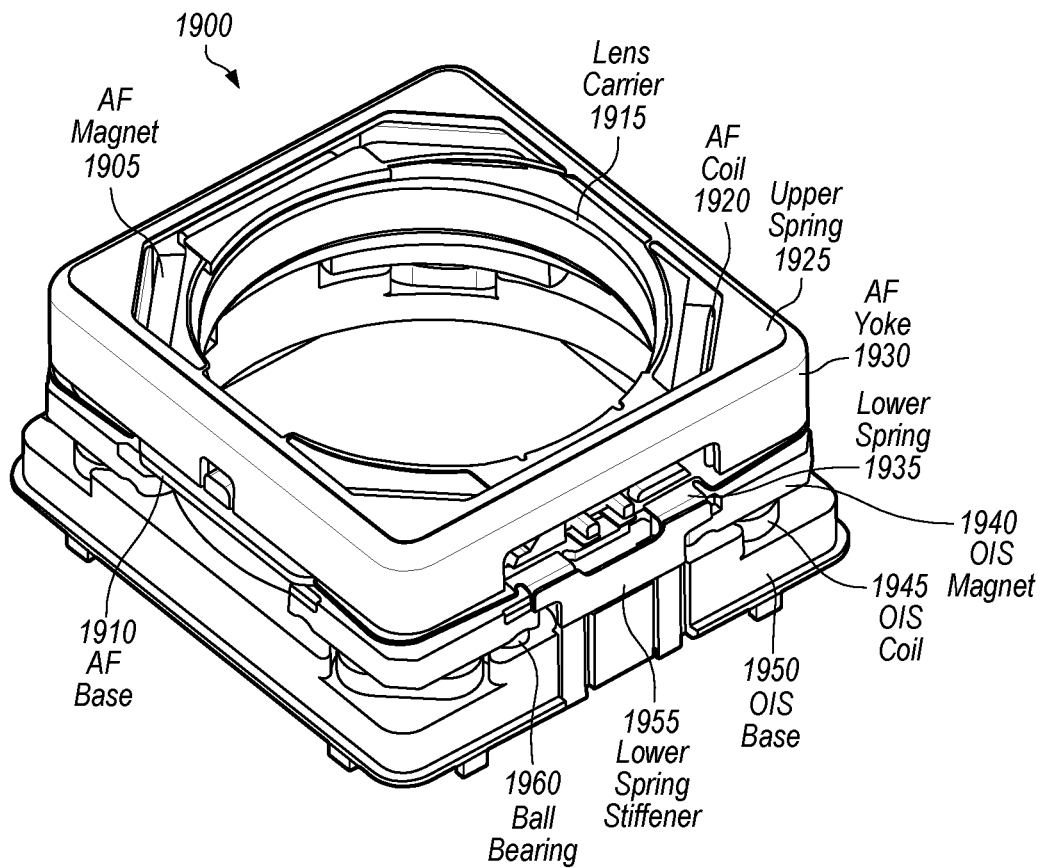
FIG. 19 depicts an example actuator module without screening can, according to some embodiments.

An embodiment of this arrangement of coils and magnets is illustrated in the accompanying drawings. FIG. 19 depicts an example actuator module without screening can, according to some embodiments. Components of actuator module 1900 that are shown in FIG. 19 include autofocus magnet 1905, an autofocus base 1910, a lens carrier 1915, an autofocus coil 1920, an upper spring 1925, an autofocus yoke 1930, a lower spring 1935, an optical image stabilization magnet 1940, an optical image stabilization coil 1945, an optical image stabilization base 1950, a lower spring stiffener 1955, and a ball bearing 1960.

In particular, FIG. 19 shows an example arrangement of such an actuator module 1900, which in this case also incorporates a mechanism for delivering an optical image stabilization (OIS) function, although the present invention is not limited to such an augmented actuator.

Figure 20A:
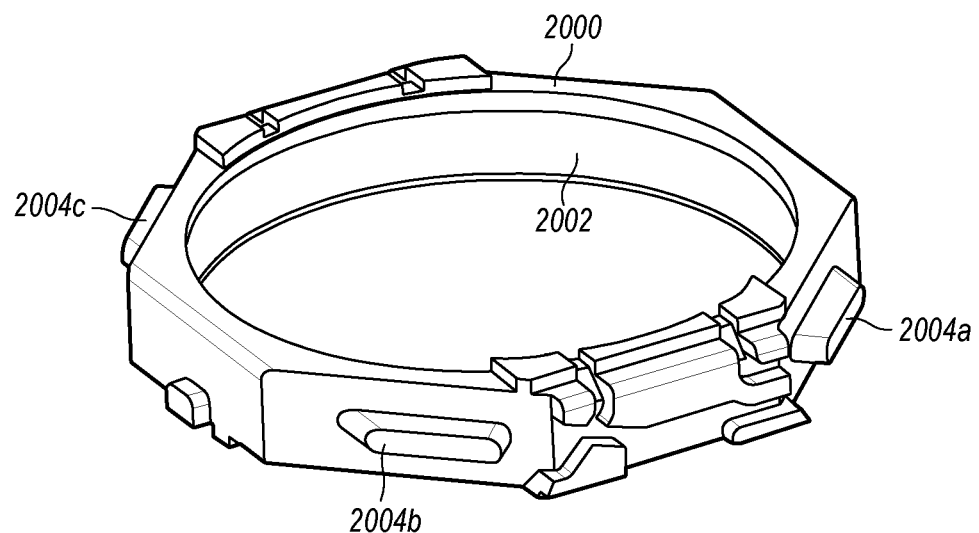
FIG. 20A illustrates an example lens carrier, according to some embodiments.

FIG. 20A illustrates an example lens carrier, according to some embodiments. A lens carrier 2000 has a threaded portion 2002 for attachment of a lens (not shown) and attachment points 2004a-2004c for attachment of coils (not shown).

Figure 20B:
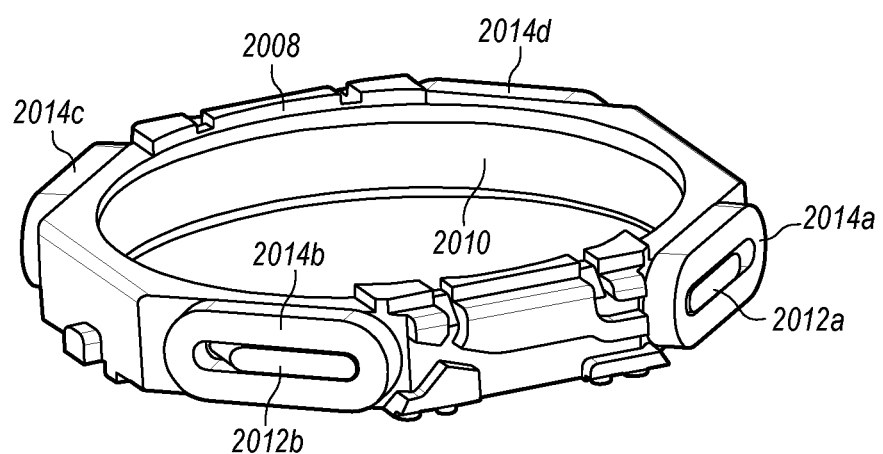
FIG. 20B depicts an example lens carrier with coils, according to some embodiments.

FIG. 20B depicts an example lens carrier with coils, according to some embodiments. A lens carrier 2008 has a threaded portion 2010 for attachment of a lens (not shown) and attachment points 2012a-2012b for attachment of coils 2014a-2014d.

Figure 20C:
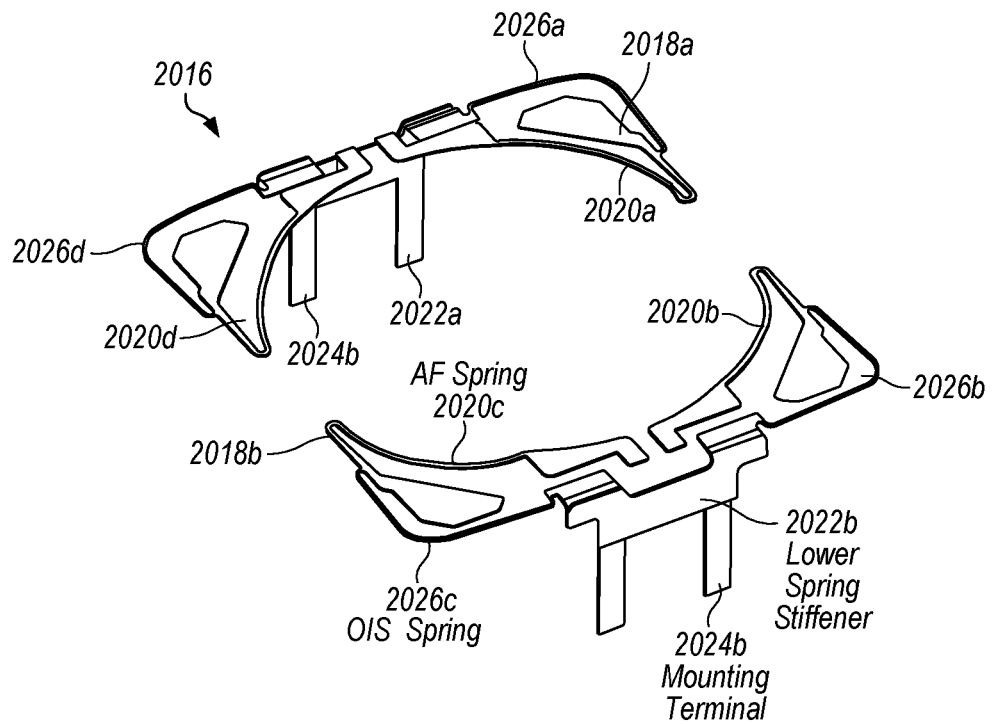
FIG. 20C illustrates an example lower spring subassembly, according to some embodiments.

FIG. 20C illustrates an example lower spring subassembly, according to some embodiments. Lower spring subassembly 2016 is composed of halves 2018a-2018b, each of which is composed of autofocus springs 2020a-2020d, a lower spring stiffener 2022a-2022b, a mounting terminal 2024a-2024b, and optical image stabilization springs 2026a-2026d.

Figure 20D:
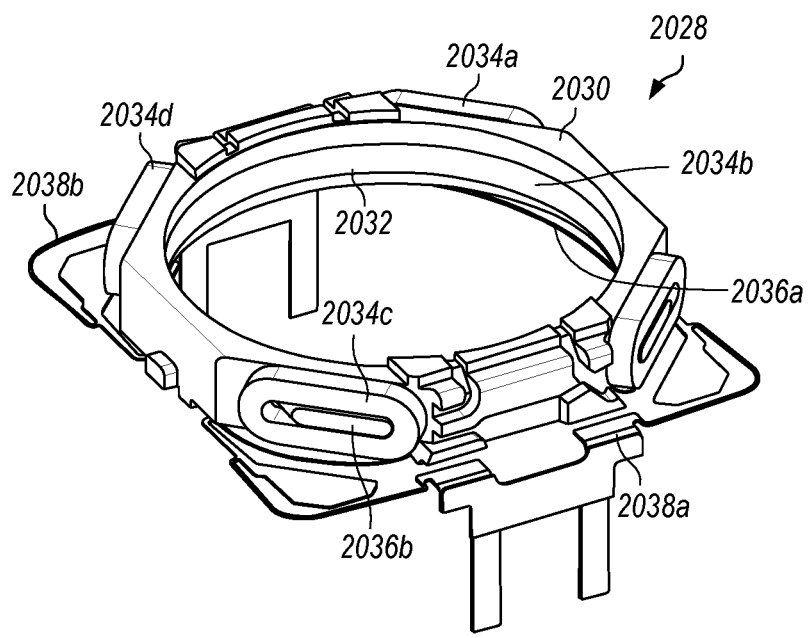
FIG. 20D depicts an example actuator module: lens carrier with coils and lower spring subassembly, according to some embodiments.

FIG. 20D depicts an example actuator module: lens carrier with coils and lower spring subassembly, according to some embodiments. Actuator module 2028 includes a lens carrier 2030 having a threaded portion 2032 for attachment of a lens (not shown) and attachment points 2036a-2036b for attachment of coils 2034a-2034d. Lower spring subassembly is composed of halves 2038a-2038b FIGS. 20A-D illustrate an example actuator module, where it is possible to see the four separate focusing coils mounted onto a molded threaded lens carrier, which is ultimately used for housing a threaded Lens. FIG. 20C also shows the assembly of the lower spring, which is part of the suspension mechanism of the lens carrier on the support structure of the actuator focusing mechanism. Note that the lower spring is split into four portions; one for each corner of the actuator. One terminal from each coil is electrically connected to its respective portion of the lower spring. This allows one terminal from each coil to be routed off the moving lens carrier, back to the fixed support structure, and so ultimately to appropriate drive circuitry.

Although not shown, there is a second upper spring component as part of the suspension mechanism. In one embodiment, this upper spring is not split, but is a single piece, and the second terminal of each coil is electrically connected to the upper spring, which are not routed to the drive circuitry. In this way one terminal from each coil are all electrically connected together. This avoids the need to find another means of routing electrical terminals off the moving portion of the actuator to the fixed support structure. In some embodiments, this arrangement is particularly valuable in the case of the optical image stabilization actuator structure shown, where the support structure of the focusing mechanism is itself moving by means of the optical image stabilization actuator.

Figure 17:
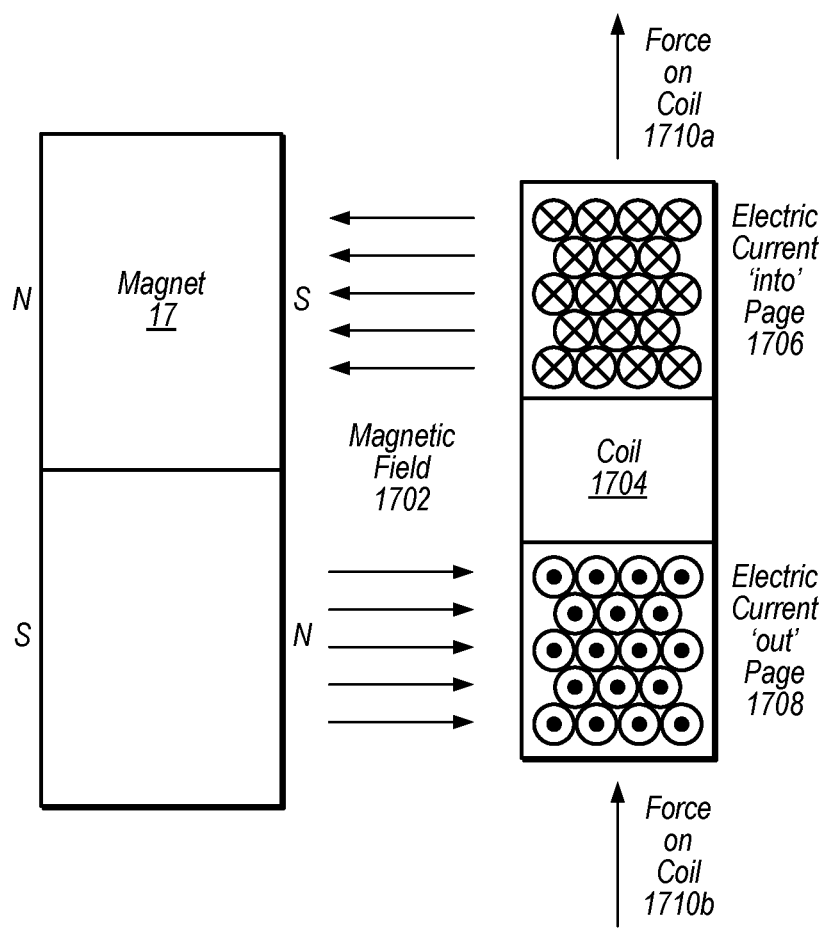
FIG. 17 depicts a schematic of magnet and coil configuration, according to some embodiments.

FIG. 17 depicts a schematic of magnet and coil configuration, according to some embodiments. A magnet 1700 and accompanying magnetic field 1702 are shown in conjunction with a coil 1704. Electric current into the page 1706 and electric current out of the page 1708 are shown, as are force on the coil 1710a-1710b.

Figure 18:
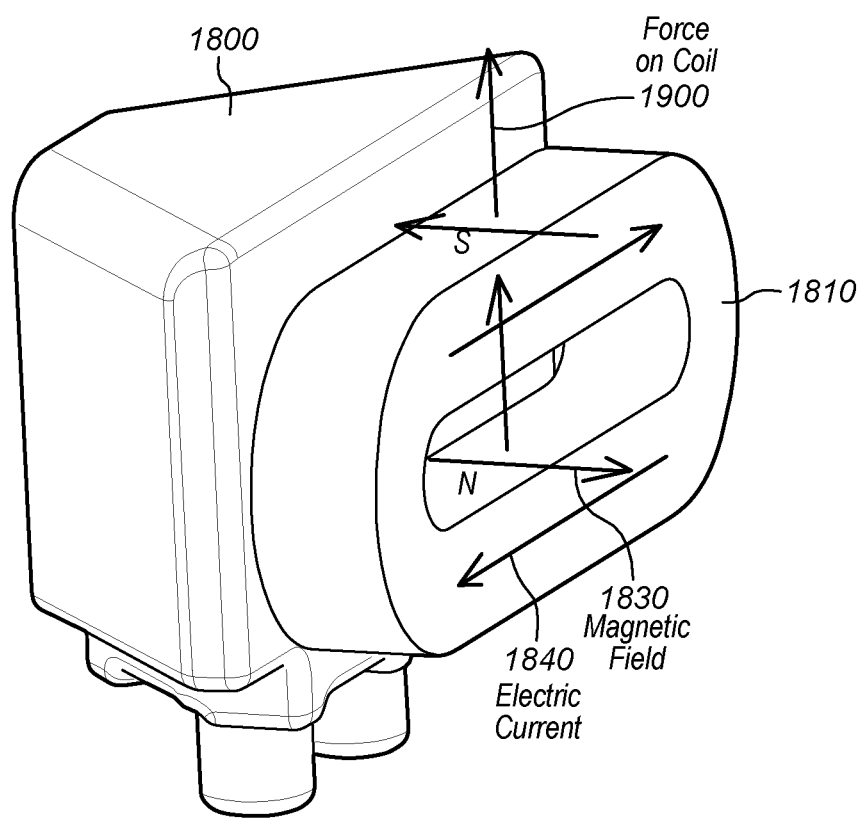
FIG. 18 illustrates autofocus magnet and coil configuration in a perspective view, according to some embodiments.

FIG. 18 illustrates autofocus magnet and coil configuration in a perspective view, according to some embodiments. FIG. 18 shows in more detail how the dual-pole magnet 1800 in each corner of the actuator module interacts through a magnetic field 1830 with the focusing coil 1810 carrying current 1840 to produce a consistent force 1820 from each magnet 1800 and coil 1810 on the lens carrier (not shown) in directions parallel to the lens optical axis (not shown).

Figure 15:
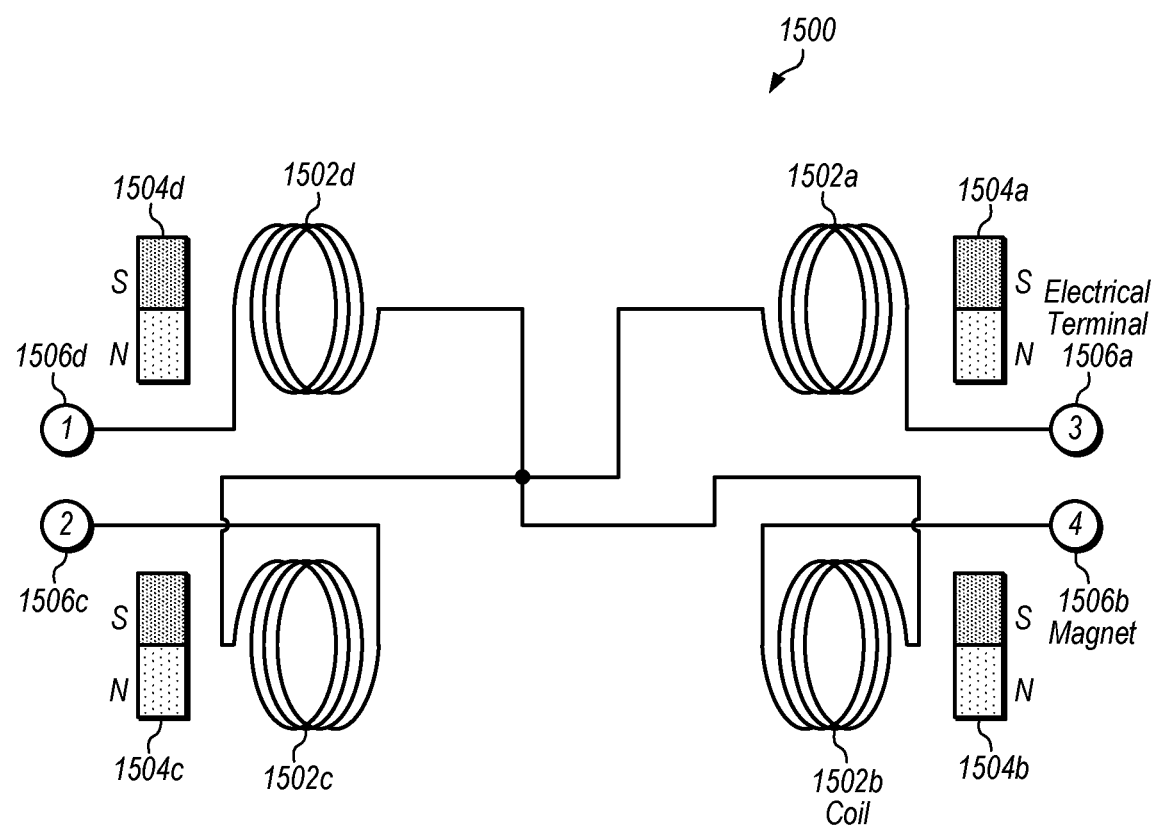
FIG. 15 depicts a schematic representation of actuator coil connectivity, according to some embodiments.

FIG. 15 depicts a schematic representation of actuator coil connectivity, according to some embodiments. Given the above description of the coil and magnet arrangement, and the electrical connectivity, this can schematically be represented by the diagram 1500 in FIG. 15. There are four separate coils 1502a-1502d and magnets 1504a-1504d, and four terminals 1506a-1506d, with the other terminal of each of coil 1502a-1502d connected together. Some embodiments derive advantage from how these coils 1502a-1502d are configured and electrically driven, enabling by the described mechanical structure is that it is potentially possible to drive the different coils 1502a-1502d independently. In this way it is possible to deliver active tilt control of the lens relative to the image sensor, in addition to active focus control, so long as it is possible to drive the coils 1502a-1502d to control tilt about two axes orthogonal to each other and both orthogonal to the optical axis.

In some embodiments, this is achieved by operating the coils 1502a-1502d so that diagonally opposite coils 1502a-1502d deliver control of the tilt about an axis close to the other diagonal. In addition, coils 1502a-1502d adjacent to each other are wound, or electrically connected opposite to each other, or the magnets must be poled oppositely. So that for example if one of coils 1502a-1502d is driven with a 'positive' current, and the adjacent one of coils 1502a-1502d is driven with a 'negative' current, then the Lorentz forces from both on the lens carrier will be in the same direction along the optical axis. In addition, in some embodiments all coils 1502a-1502d are capable of being driven with currents of either polarity, so that the actuators are bi-directional. This means that if diagonally opposite coils 1502a-1502d are driven with electrical current of the same polarity, they will both generate forces on the lens carrier in the same direction parallel to the lens optical axis.

Some embodiments include a method of driving these coils 1502a-1502d using multiple linear current drives. Such embodiments are advantageous as it minimizes the electrical noise that could adversely effect the quality of the images captured by the image sensor, or other components in the product that might be susceptible to noise.

FIG. 16 is a table of example currents applied to each terminal and their effect on actuator position and tilt, according to some embodiments. Operation of some embodiments will now be described with reference to FIG. 15 and in particular the table in FIG. 16. Consider the case in the first row 1602 of the table 1600, where the current through all four terminals is zero. The position of the lens is then determined by the resting position of the lens and lens carrier on the springs, which will be affected by the orientation of the camera. The assumption for FIG. 16 is that the camera is pointing horizontally, so that the weight of the lens and lens carrier does not cause the lens to sag on the springs. In the table, infinity focus is assumed to correspond to the lens position at '0 um'.

The specified close focus lens position (for example corresponding to an object focal distance of 10 cm) is 180 um. Although the focusing actuator is bi-directional, the neutral position is chosen to be 50 um away from infinity focus, rather than in the middle of travel. This can be freely chosen, but since camera users typically spend more time focusing at objects that are 'far away', a neutral position closer to infinity focus will minimize power. Hence for the case when no current is flowing through any coil, the lens is positioned at the 50 um position. For the example actuator chosen, the Lorentz force sensitivity of the four coils 1502a-

1502d and magnets 1504a-1504d is such that a common mode current through all four coils 1502a-1502d of 1 mA (of the appropriate polarity in each of coils 1502a-1502d), produces a movement of 2 um. Therefore, considering the second row 1604 of the table 1600, each of coils 1502a-1502d is driven with 20 mA, and hence the lens has moved by 40 um to the 90 um position.

Note that since there are four terminals, using Kirchoff's law, it is necessary in some embodiments for all the currents into the system to sum to zero. This is why it is necessary for two of coils 1502a-1502d to be wound, connected, and mounted in relationship to their magnets differently from the other two of coils 1502a-1502d, as two of coils 1502a-1502d are driven with a 'positive' polarity current, and two of coils 1502a-1502d are driven with a 'negative' polarity current. In this case, two of coils 1502a-1502d are driven with +20 mA, and two with −20 mA, but all four coils 1502a-1502d produce Lorentz forces in the same direction to move the lens away from the neutral position towards macro focus, and all four currents sum to zero.

Now consider the third row 1606 in the table 1600. The current in each of coils 1502a-1502d is now 25 mA, but the direction of the current in each of coils 1502a-1502d has been changed. This means that each of coils 1502a-1502d is now applying a force to the lens in the opposite direction. Given the force sensitivity of each of coils 1502a-1502d, 25 mA moves the lens to the infinity position (−50 um from the neutral position).

Now consider the fourth row 1608 in the table 1600. The current through Coils 2 and 3 remain unchanged at 25 mA. Therefore the common mode current through Coils 1 and 4 also remain unchanged, since the total current must sum to zero. This means that the focal position also remains unchanged, at infinity focus. However now we are applying a small differential current to Coils 1 and 4, which are diagonally opposite each other, as shown in FIG. 15. A differential current between Coils 1 and 4 produces a net tilt about an axis roughly across the diagonal through Coils 2 and 3. In this case Coil 1 is pushing its corner further from the neutral position than Coil 4.

For the example actuator, a 4 mA differential current between diagonally opposite coils 1502a-1502d produces a 0.1 degree tilt about one axis. The other rows in the table are a logical extension from the first four. Note, as in row six that diagonally opposite coils do not always necessarily need to have current of the same polarity, depending on the relative focal position, and tilt.

Some embodiments demonstrate that the four coils may be configured and driven to achieve three degrees of controlled motion of the lens relative to the image sensor: linear movement parallel to the optical axis and tilts about axes orthogonal to the optical axis. In some embodiments, these extra tilt degrees of freedom augment camera performance by substantially eliminating the relative tilt between the lens optical axis, and an axis orthogonal to the plane of the image sensor. Nominally these axes should be parallel, however manufacturing tolerances, and inertial effects of the lens can introduce parasitic relative tilts.

For example, manufacturing tolerances may mean that for a given camera, when at its neutral position, the lens optical axis is naturally tilted to an axis orthogonal to the plane of the image sensor. In addition, further tolerances may mean that at different focal positions (or optical image stabilization positions if present), the relative tilt may be different. In addition, particularly for complex and size constrained mechanisms, such as the optical image stabilization positions mechanism, the center of gravity of the lens is not necessarily located as the center of the lens suspension structure, meaning that different orientations of the camera may alter the tilt of the lens relative to the image sensor (known as posture dependent tilt). Hence, for these reasons, the addition of active tilt compensation, potentially based on a factory calibration, or on sensors that detect the orientation of the camera, or on feedback from captured images will be advantageous to camera performance and image quality.

In some embodiments, the actuator arrangement controls the movement of the lens relative to the image sensor in three degrees of freedom, however the actuator is made up of four separate coils, each of which is potentially driven with different electric currents. Hence there appears to be a static indeterminacy. Another way of describing the problem is that a necessary constraint on the electrical drive of the system is that the electrical currents through the four coils must all sum to zero, so that in practice there are not four independent choices of electrical current through the coil: only three.

Some embodiments address this problem by driving three of the four coils with bi-directional programmable current sources, for example terminals 1, 2 and 3, whilst terminal 4 is then driven with a voltage source. The voltage source effectively ensures the voltage of the central node, to which one terminal of each coil is connected, is held at a roughly known or constant voltage, via the resistance of the coil 4. The voltage source can sink or source as much current as is necessary to ensure the currents sum to zero. The voltage source does not determine the current through coil 4, this is determined by the combined currents through coils 1, 2 and 3. In practice the Lorentz force sensitivity of each coil will show variability due to manufacturing tolerances. In addition, the different programmable current sources for terminals 1, 2 and 3 will also show variability due to manufacturing tolerances. These and other sources of variability will alter the actual angle and position of the Lens relative to the image sensor for a given series of programmed currents. All these effects can be accounted for by performing a calibration process, whereby for a series of currents applied to the different terminals, the actual position and angle of the lens is measured. Parameters in the control algorithms that alter the effective gain and offset of each coil and magnet can then be determined, and used to accurately position and tilt the lens.

Summary of Voice Coil Motor Drive Scheme

Some embodiments provide an actuator module for a miniature camera, which incorporates a focusing mechanism that provides at least three controlled degrees of positioning a lens relative to an image sensor, one being linear positioning of a lens relative to an image sensor in directions along the lens optical axis, and two others being tilts of the lens relative to the image sensor about two axes orthogonal to each other and both orthogonal to the optical axis. These degrees of freedom are achieved by four bi-directional actuators acting on four different regions about the lens, each capable of generating forces on the lens that are parallel to the lens optical axis, and where each actuator is a two-terminal device driven by an electric current. One terminal from each actuator are electrically connected together, and wherein the other terminal of each actuator is driven with an electric current or voltage applied to each terminal, hence meaning that in combination the arrangement of actuators is driven with four terminals, wherein three of the said terminals are driven with linear bidirectional programmable current sources, whilst the fourth terminal is driven with a voltage source that can sink or source the current necessary so that the current flowing into the actuator from the four terminals sums to zero.

In some embodiments, the four actuators are positioned at the corners of the generally cuboid actuator when viewed along the optical axis. For a given polarity current applied to a first actuator through its terminal, it produces a force on the lens in a first direction along the optical axis, whereas for actuators at adjacent corners to the first actuator, applied currents through their respective terminals of the same polarity as for the first actuator will produce forces on the lens in a second direction opposite to the first.

In some embodiments, the four actuators are voice coils motors with four coils mounted on the lens or lens support structure, and the four magnets are dual-poled and mounted to the support structure of the actuator module focusing mechanism.

In some embodiments, adjacent coils are either wound the opposite way round, or are connected the opposite way round, or where the magnets are poled the opposite way round, so that currents of opposite polarity in adjacent coils produce forces on the lens from the two actuators in the same direction along the optical axis.

In some embodiments, each actuator and its respective current or voltage source driver are calibrated for their sensitivity gain and offset so as to determine what position and tilt are actually developed for a given combination of applied current, so as to compensate for manufacturing variability.

Figure 21:
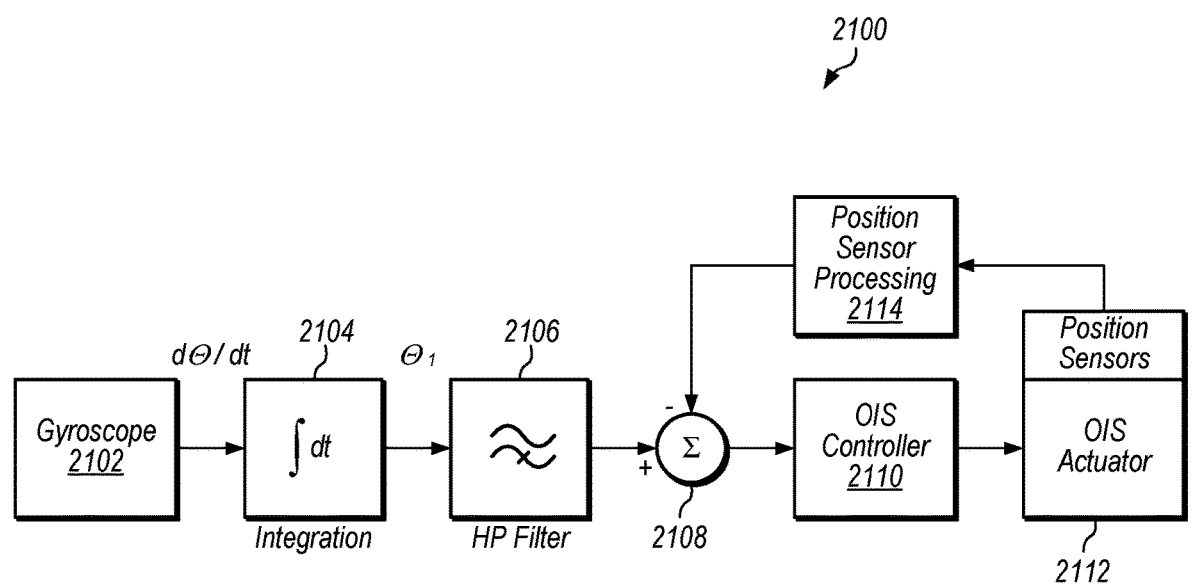
FIG. 21 depicts a system for optical image stabilization, according to some embodiments.

FIG. 21 depicts a system for optical image stabilization, according to some embodiments. A camera control 2100 includes various components described below. A gyroscope 2102 transmits a derivative of orientation angle with respect to time to an integration unit 2104, which transmits an orientation angle to a high-pass filter 2106. High-pass filter 2106 filters this angle to transmit a signal to a subtraction unit 2108, which also receives input from a position sensing processor 2114. The subtractive output of subtraction unit 2109 is transmitted to an optical image stabilization controller 2110, which sends signals to activate actuators coupled to position sensors 2112. Position sensors coupled to actuators 2112 transmit a signal to the position sensor processor 2114.

Camera Control Methods

Figure 22:
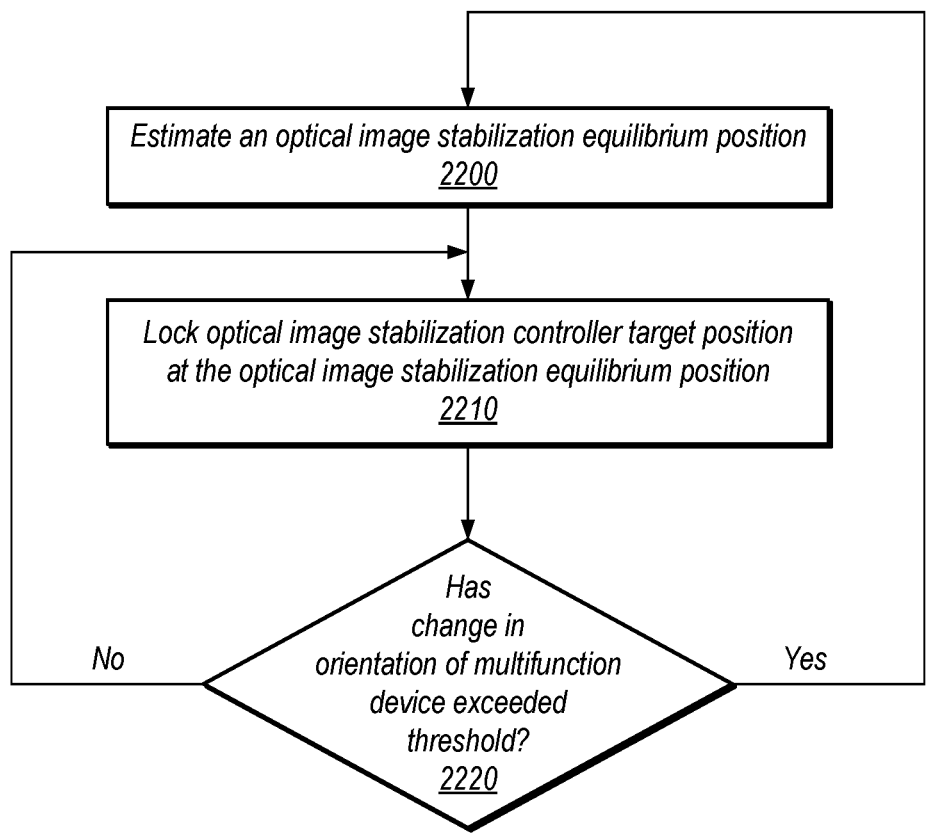
FIG. 22 is a flowchart of a method for optical image stabilization, according to some embodiments.

FIG. 22 is a flowchart of a method for optical image stabilization, according to some embodiments. An optical image stabilization equilibrium position is estimated (block 2200). The optical image stabilization controller target position is locked at the optical image stabilization equilibrium position (block 2210). A determination is made as to whether change in orientation of the multifunction device exceeded a threshold (block 2220). If the change has exceeded the threshold, the process returns to step 2200, which is described above. If the change has not exceeded the threshold, then the process returns to step 2210, which is described above.

Figure 23:
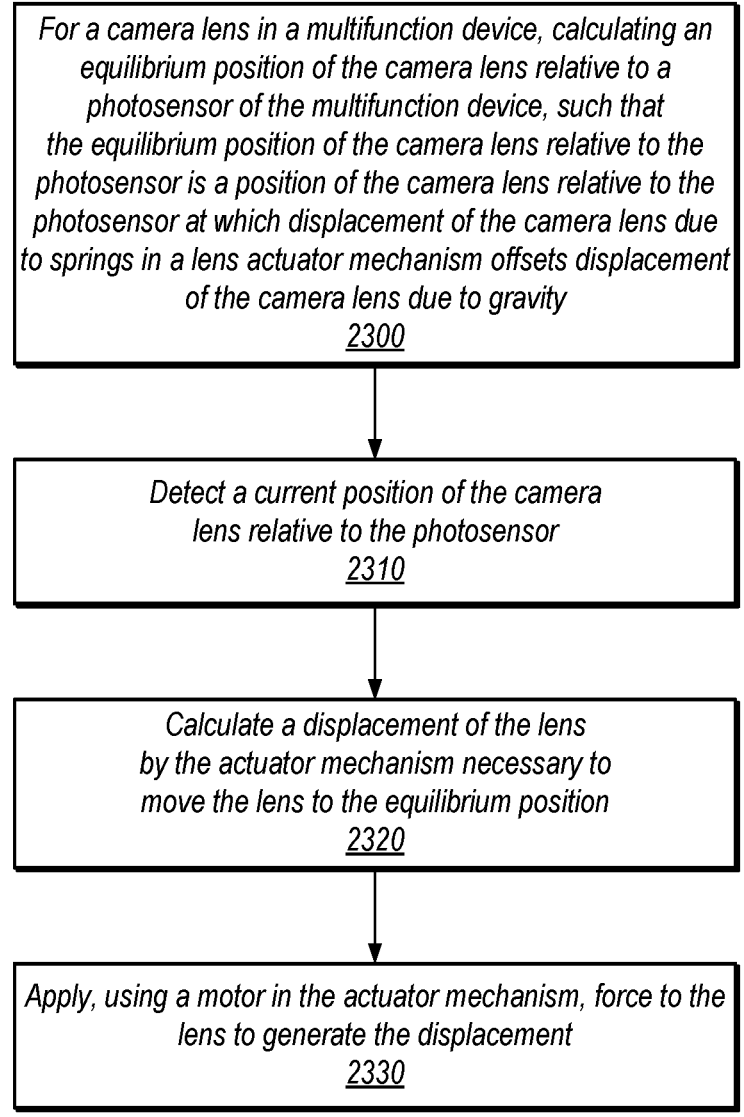
FIG. 23 is a flowchart of a method for optical image stabilization, according to some embodiments.

FIG. 23 is a flowchart of a method for optical image stabilization, according to some embodiments. For a camera lens in a multifunction device, an equilibrium position of the camera lens relative to a photosensor of the multifunction device is calculated, such that the equilibrium position of the camera lens relative to the photosensor is a position of the camera lens relative to the photosensor at which displacement of the camera lens due to springs in a lens actuator mechanism offsets displacement of the camera lens due to gravity (block 2300). A current position of the camera lens relative to the photosensor is detected (block 2310). A displacement of the lens by the actuator mechanism necessary to move the lens to the equilibrium position is calculated (block 2320). Using a motor in the actuator mechanism, force is applied to the lens to generate the displacement (block 2330).

Figure 24:
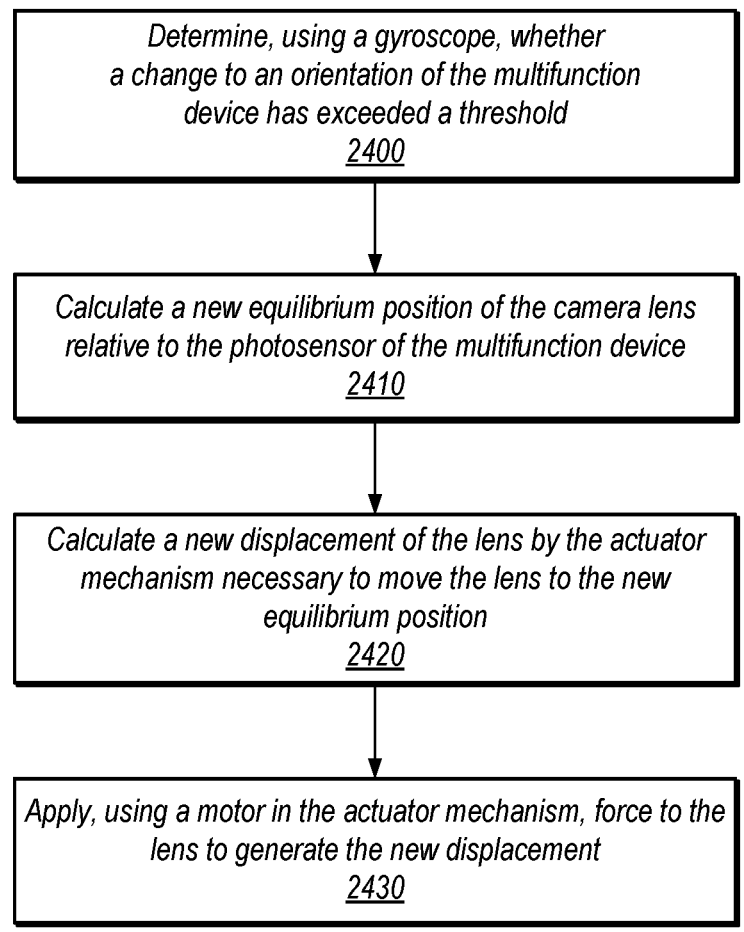
FIG. 24 is a flowchart of a method for optical image stabilization, according to some embodiments.

FIG. 24 is a flowchart of a method for optical image stabilization, according to some embodiments. Using a gyroscope, a determination is made as to whether a change to an orientation of the multifunction device has exceeded a threshold (block 2400). A new equilibrium position of the camera lens relative to the photosensor of the multifunction device is calculated (block 2410). A new displacement of the lens by the actuator mechanism necessary to move the lens to the new equilibrium position is calculated (block 2420). Using a motor in the actuator mechanism, force is applied to the lens to generate the new displacement (block 2430).

Figure 25:
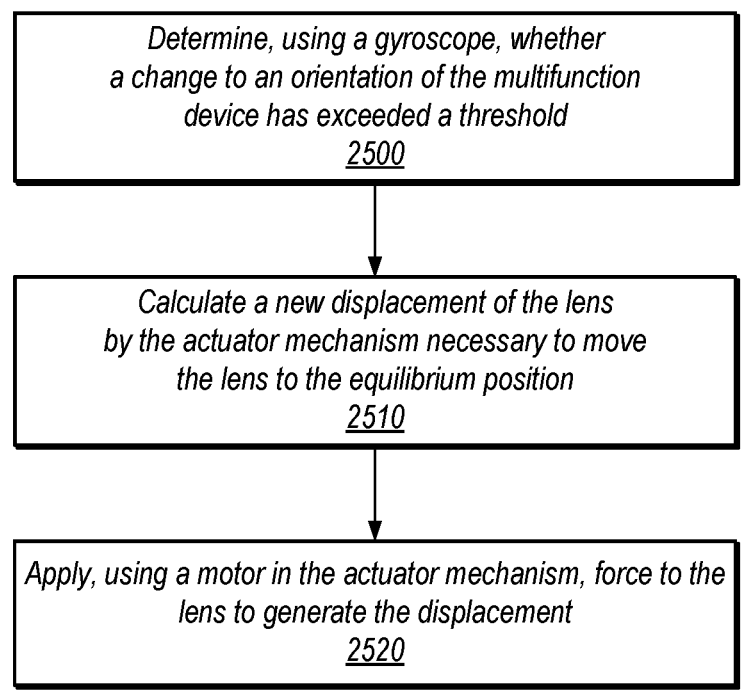
FIG. 25 is a flowchart of a method for optical image stabilization, according to some embodiments.

FIG. 25 is a flowchart of a method for optical image stabilization, according to some embodiments. Using a gyroscope, a determination is made as to whether a change to an orientation of the multifunction device has exceeded a threshold (block 2500). a new displacement of the lens by the actuator mechanism necessary to move the lens to the equilibrium position is calculated (block 2510). Using a motor in the actuator mechanism, force is applied to the lens to generate the displacement (block 2520).

Figure 26:
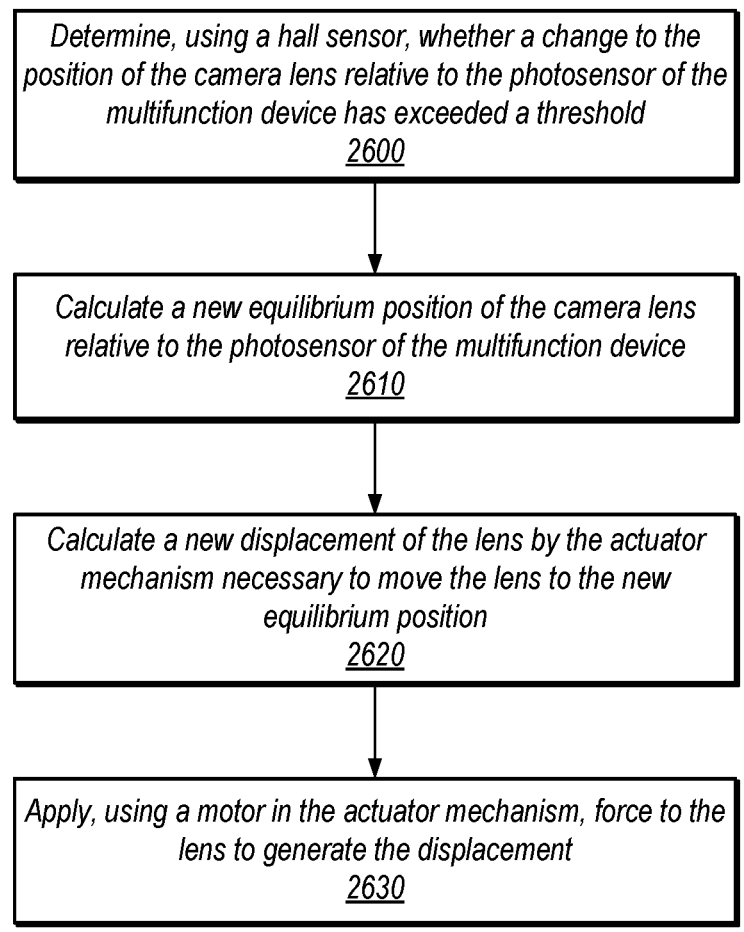
FIG. 26 is a flowchart of a method for optical image stabilization, according to some embodiments.

FIG. 26 is a flowchart of a method for optical image stabilization, according to some embodiments. Using a hall sensor, a determination is made as to whether a change to the position of the camera lens relative to the photosensor of the multifunction device has exceeded a threshold (block 2600). A new equilibrium position of the camera lens relative to the photosensor of the multifunction device is calculated (block 2610). A new displacement of the lens by the actuator mechanism necessary to move the lens to the new equilibrium position is calculated (block 2620). Using a motor in the actuator mechanism, force is applied to the lens to generate the displacement (block 2630).

Figure 27:
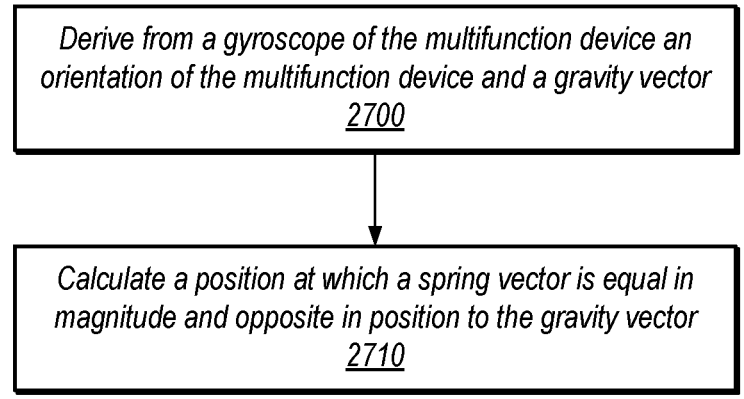
FIG. 27 is a flowchart of calculations used in a method for optical image stabilization, according to some embodiments.

FIG. 27 is a flowchart of calculations used in a method for optical image stabilization, according to some embodiments. An orientation of the multifunction device and a gravity vector is derived from a gyroscope (block 2700). A position at which a spring vector is equal in magnitude and opposite in position to the gravity vector is calculated (block 2710).

Figure 28A:
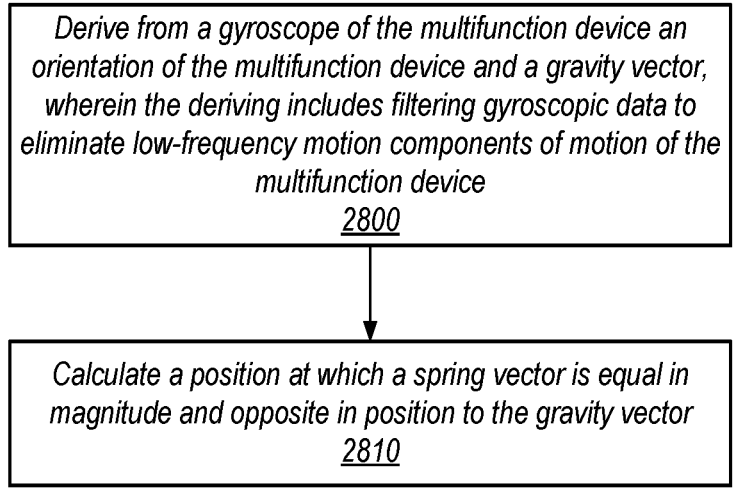
FIG. 28A is a flowchart of calculations used in a method for optical image stabilization, according to some embodiments.

FIG. 28A is a flowchart of calculations used in a method for optical image stabilization, according to some embodiments. An orientation of the multifunction device and a gravity vector are derived from a gyroscope, wherein the deriving includes filtering gyroscopic data to eliminate low-frequency motion components of motion of the multifunction device an orientation of the multifunction device and a gravity vector, wherein the deriving includes filtering gyroscopic data to eliminate low-frequency motion components of motion of the multifunction device (block 2800). A position at which a spring vector is equal in magnitude and opposite in position to the gravity vector is calculated (block 2810).

Figure 28B:
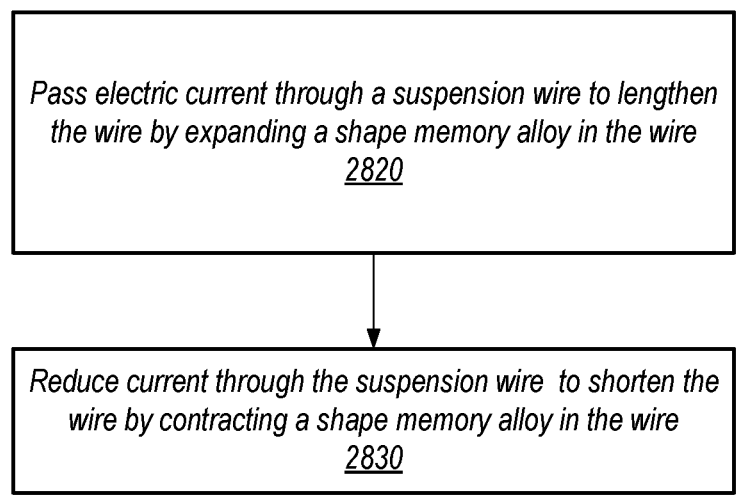
FIG. 28B is a flowchart of calculations used in a method for camera component control, according to some embodiments.

FIG. 28B is a flowchart of calculations used in a method for camera component control, according to some embodiments. An electric current is passed through a suspension wire to lengthen the wire by expanding a shape memory alloy in the wire (block 2820). The current through the suspension wire is reduced to shorten the wire by contracting a shape memory alloy in the wire (block 2830).

Example Computer System

FIG. 21 illustrates computer system 2900 that is configured to execute any or all of the embodiments described above. In different embodiments, computer system 2900 may be any of various types of devices, including, but not limited to, a personal computer system, desktop computer, laptop, notebook, tablet, slate, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, may be executed in one or more computer systems 2900, which may interact with various other devices. Note that any component, action, or functionality described above with respect to FIGS. 1-20 may be implemented on one or more computers configured as computer system 2900 of FIG. 29, according to various embodiments. In the illustrated embodiment, computer system 2900 includes one or more processors 2910 coupled to a system memory 2920 via an input/output (I/O) interface 2930. Computer system 2900 further includes a network interface 2940 coupled to I/O interface 2930, and one or more input/output devices 2950, such as cursor control device 2960, keyboard 2970, and display(s) 2980. In some cases, it is contemplated that embodiments may be implemented using a single instance of computer system 2900, while in other embodiments multiple such systems, or multiple nodes making up computer system 2900, may be configured to host different portions or instances of embodiments. For example, in one embodiment some elements may be implemented via one or more nodes of computer system 2900 that are distinct from those nodes implementing other elements.

In various embodiments, computer system 2900 may be a uniprocessor system including one processor 2910, or a multiprocessor system including several processors 2910 (e.g., two, four, eight, or another suitable number). Processors 2910 may be any suitable processor capable of executing instructions. For example, in various embodiments processors 2910 may be general-purpose or embedded processors implementing any of a variety of instruction set architectures (ISAs), such as the x829, PowerPC, SPARC, or MIPS ISAs, or any other suitable ISA. In multiprocessor systems, each of processors 2910 may commonly, but not necessarily, implement the same ISA.

System memory 2920 may be configured to store camera control program instructions 2922 and/or camera control data accessible by processor 2910. In various embodiments, system memory 2920 may be implemented using any suitable memory technology, such as static random access memory (SRAM), synchronous dynamic RAM (SDRAM), nonvolatile/Flash-type memory, or any other type of memory. In the illustrated embodiment, program instructions 2922 may be configured to implement a lens control application 2924 incorporating any of the functionality described above. Additionally, existing camera control data 2932 of memory 2920 may include any of the information or data structures described above. In some embodiments, program instructions and/or data may be received, sent or stored upon different types of computer-accessible media or on similar media separate from system memory 2920 or computer system 2900. While computer system 2900 is described as implementing the functionality of functional blocks of previous Figures, any of the functionality described herein may be implemented via such a computer system.

In one embodiment, I/O interface 2930 may be configured to coordinate I/O traffic between processor 2910, system memory 2920, and any peripheral devices in the device, including network interface 2940 or other peripheral interfaces, such as input/output devices 2950. In some embodiments, I/O interface 2930 may perform any necessary protocol, timing or other data transformations to convert data signals from one component (e.g., system memory 2920) into a format suitable for use by another component (e.g., processor 2910). In some embodiments, I/O interface 2930 may include support for devices attached through various types of peripheral buses, such as a variant of the Peripheral Component Interconnect (PCI) bus standard or the Universal Serial Bus (USB) standard, for example. In some embodiments, the function of I/O interface 2930 may be split into two or more separate components, such as a north bridge and a south bridge, for example. Also, in some embodiments some or all of the functionality of I/O interface 2930, such as an interface to system memory 2920, may be incorporated directly into processor 2910.

Network interface 2940 may be configured to allow data to be exchanged between computer system 2900 and other devices attached to a network 2985 (e.g., carrier or agent devices) or between nodes of computer system 2900. Network 2985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2950 may, in some embodiments, include one or more display terminals, keyboards, keypads, touchpads, scanning devices, voice or optical recognition devices, or any other devices suitable for entering or accessing data by one or more computer systems 2900. Multiple input/output devices 2950 may be present in computer system 2900 or may be distributed on various nodes of computer system 2900. In some embodiments, similar input/output devices may be separate from computer system 2900 and may interact with one or more nodes of computer system 2900 through a wired or wireless connection, such as over network interface 2940.

Figure 29:
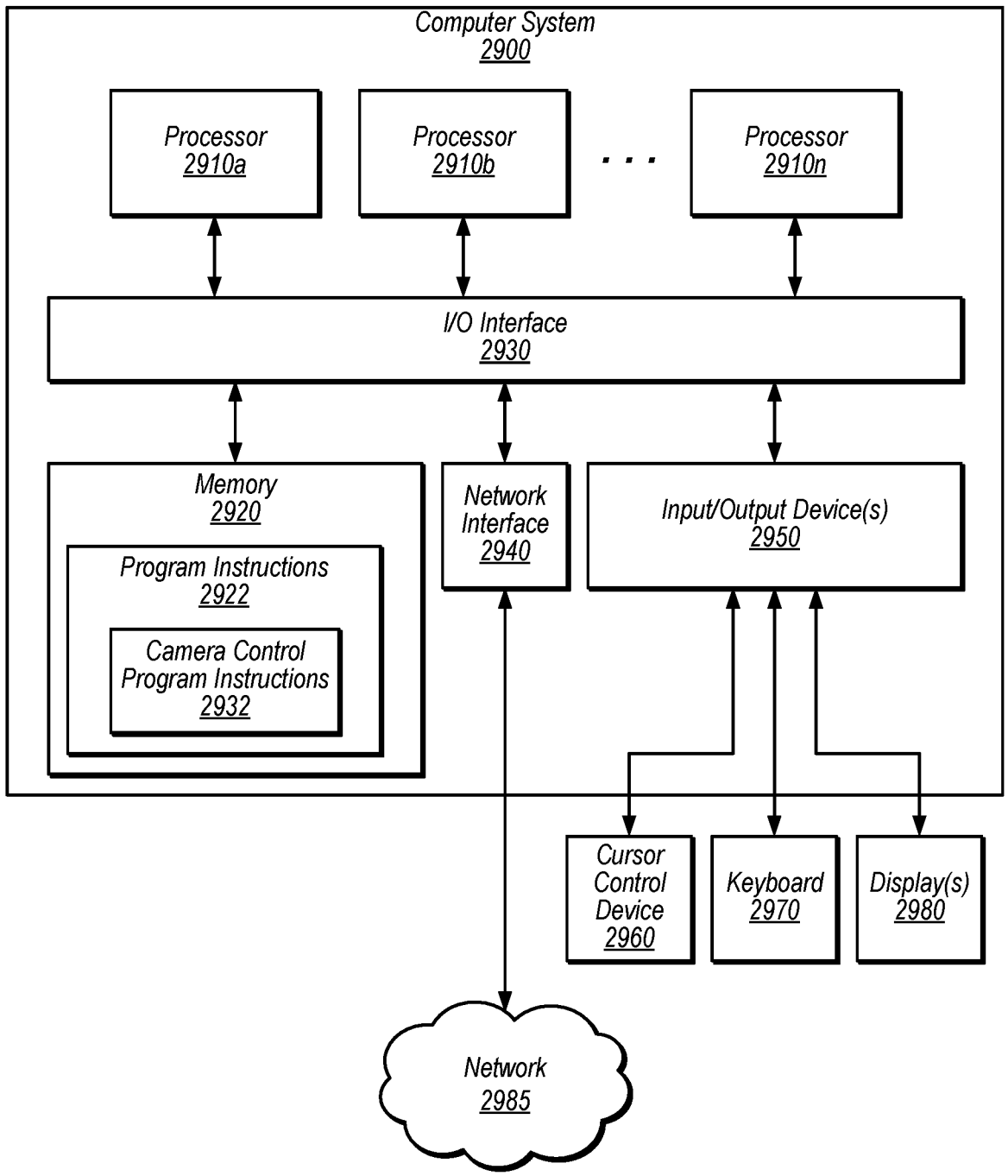
FIG. 29 illustrates an example computer system configured to implement aspects of the system and method for camera control, according to some embodiments.

As shown in FIG. 29, memory 2920 may include program instructions 2922, which may be processor-executable to implement any element or action described above. In one embodiment, the program instructions may implement the methods described above. In other embodiments, different elements and data may be included. Note that data may include any data or information described above.

Those skilled in the art will appreciate that computer system 2900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 2900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2900 may be transmitted to computer system 2900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

Further examples of specific feature combinations taught within the present disclosure are set out in the following numbered clauses:

Clause 1. An actuator module for a miniature camera, comprising:
  a focusing mechanism attachment for a lens, wherein
    the focusing mechanism attachment provides at least three controlled degrees of positioning relative to an image sensor for the lens,
    one controlled degree of positioning of the at least three controlled degrees of positioning is a linear positioning of the lens relative to the image sensor in directions along an optical axis of the lens,
    two other controlled degrees of positioning of the at least three controlled degrees of positioning are tilts of the lens relative to the image sensor,
    the tilts of the lens relative to the image sensor are tilts about two axes orthogonal to each other, and
    the tilts of the lens relative to the image sensor are tilts orthogonal to the optical axis; and
  at least four bi-directional actuators attached to respective different regions about the lens, wherein
    each actuator of the four bi-directional actuators generates forces on the lens that are parallel to the optical axis of the lens, and
    each actuator of the four bi-directional actuators is a two-terminal device driven by an electric current.

Clause 2. The actuator module of clause 1, wherein
  the actuator module has a rectangular shape with at least four corners when viewed in plan along the optical axis,
  each actuator of the four bi-directional actuators is positioned at a respective one of the four corners,
  for a given polarity current applied to a first actuator through a terminal of the first actuator, the first actuator produces a force on the lens in a first direction along the optical axis, and
  for second and third actuators at corners adjacent to the corner at which the first actuator is located, currents applied through terminals of the second and third actuators of the same polarity as the given polarity will produce forces on the lens in a second direction opposite to the first direction.

Clause 3. The actuator module of any of clauses 1-2, wherein
  the actuator module has a rectangular shape with at least four corners when viewed in plan along the optical axis,
  each actuator of the four bi-directional actuators is positioned at a respective one of the four corners, and
  adjacent coils are wound opposite one another, such that currents of opposite polarity in adjacent coils produce forces on the lens from the two actuators in the same direction along the optical axis.

Clause 4. The actuator module of any of clauses 1-3, wherein
  the actuator module has a rectangular shape with at least four corners when viewed in plan along the optical axis,
  each actuator of the four bi-directional actuators is positioned at a respective one of the four corners, and
  adjacent coils are connected opposite one another, such that currents of opposite polarity in adjacent coils produce forces on the lens from the two actuators in the same direction along the optical axis.

Clause 5. The actuator module of any of clauses 1-4, wherein
  the at least four bi-directional actuators comprise voice coils motors with coils mounted on the lens or lens support structure, and
  dual-poled magnets are mounted to a support structure of the actuator module focusing mechanism.

Clause 6. The actuator module of any of clauses 1-5, wherein the at least four bi-directional actuators comprise voice coils motors with coils mounted on the lens or lens support structure, dual-poled magnets are mounted to a support structure of the actuator module focusing mechanism, and adjacent ones of the magnets are oppositely poled, such that currents of opposite polarity in adjacent coils produce forces on the lens from the two actuators in the same direction along the optical axis.

Clause 7. The actuator module of any of clauses 1-6, further comprising linear, bi-directional programmable current sources for driving the each actuator of the four bi-directional actuators.

Clause 8. An actuator module, comprising:

a focusing mechanism attachment for a lens, wherein the focusing mechanism attachment provides at least three controlled degrees of positioning relative to an image sensor for the lens, one controlled degree of positioning of the at least three controlled degrees of positioning is a linear positioning of the lens relative to the image sensor in directions along an optical axis of the lens; and at least four bi-directional actuators attached to respective different regions about the actuator module to form points of a rectangular shape with at least four corners when viewed in plan along the optical axis, each actuator of the four bi-directional actuators is positioned at a respective one of the four corners, for a given polarity current applied to a first actuator through a terminal of the first actuator, the first actuator produces a force on the lens in a first direction along the optical axis, and for second and third actuators at corners adjacent to the corner at which the first actuator is located, currents applied through terminals of the second and third actuators of the same polarity as the given polarity will produce forces on the lens in a second direction opposite to the first direction.

Clause 9. The actuator module of clause 8, wherein each actuator of the four bi-directional actuators is attached to a respective current or voltage source driver; and the respective current or voltage source driver is for sensitivity gain and offset so as to determine a position and a tilt are developed for a given combination of applied current.

Clause 10. The actuator module of any of clauses 8-9, further comprising an actuator assembly with four terminals, wherein one terminal from each actuator is electrically connected together, and the other terminal of each actuator is driven with an electric current or voltage applied to each terminal, such that in combination the arrangement of actuators is driven with four terminals, wherein three of the said terminals are driven with linear bidirectional programmable current sources, and the fourth terminal is driven with a voltage source that applies a current such that that a total current flowing into the actuator from the four terminals sums to zero.

Clause 11. The actuator module of any of clauses 8-10, wherein two other controlled degrees of positioning of the at least three controlled degrees of positioning are tilts of the lens relative to the image sensor, and the tilts of the lens relative to the image sensor are tilts about two axes orthogonal to each other, and the tilts of the lens relative to the image sensor are tilts orthogonal to the optical axis.

Clause 12. The actuator module of any of clauses 8-11, wherein each actuator of the four bi-directional actuators generates forces on the lens that are parallel to the optical axis of the lens, and each actuator of the four bi-directional actuators is a two-terminal device driven by an electric current.

Clause 13. The actuator module of clause 8-12, wherein adjacent coils are wound opposite one another, so that currents of opposite polarity in adjacent coils produce forces on the lens from the two actuators in the same direction along the optical axis.

Clause 14. The actuator module of any of clauses 8-13, wherein the actuator module is of generally cuboid plan when viewed along the optical axis, each actuator of the four bi-directional actuators is positioned at a corners of the actuator module as viewed along the optical axis, and for a given polarity current applied to a first actuator through a terminal, the produces a force on the lens in a first direction along the optical axis, whereas for actuators at adjacent corners to the first actuator, applied currents through their respective terminals of the same polarity as for the first actuator will produce forces on the lens in a second direction opposite to the first.

Clause 15. An apparatus for controlling the motion of a camera component, the apparatus comprising:

an actuator module for a miniature camera, wherein the actuator module incorporates a focusing mechanism, and four bi-directional actuators acting on four different regions about a lens, wherein each actuator of the four bi-directional actuators is positioned at a corners of the generally cuboid actuator module when viewed along the optical axis, and for a given polarity current applied to a first actuator through a terminal, the produces a force on the lens in a first direction along the optical axis, whereas for actuators at adjacent corners to the first actuator, applied currents through their respective terminals of the same polarity as for the first actuator will produce forces on the lens in a second direction opposite to the first.

Clause 16. The apparatus of clause 15, wherein each actuator of the four bi-directional actuators is driven with an electric current or voltage applied to each terminal, such that in combination the arrangement of actuators is driven with four terminals.

Clause 17. The apparatus of any of clauses 15-16, wherein each actuator is a two-terminal device driven by an electric current.

Clause 18. The apparatus of any of clauses 15-17, wherein terminals from each actuator are electrically connected together.

Clause 19. The apparatus of any of clauses 15-18, wherein three of the said terminals are driven with linear bidirectional programmable current sources, whilst the fourth terminal is driven with a voltage source that can sink or source the current necessary so that the current flowing into the actuator from the four terminals sums to zero.

Clause 20. The apparatus of any of clauses 15-19, wherein the focusing mechanism provides at least three controlled degrees of positioning a lens relative to an image sensor, one being linear positioning of a lens relative to an image sensor in directions along the lens optical axis, and two others being tilts of the lens relative to the image sensor about two axes orthogonal to each other and both orthogonal to the optical axis.

Clause 21. An apparatus for controlling the motion of a camera component, the apparatus comprising:
- an actuator module comprising a plurality of magnets, wherein
  - each magnet of the plurality of magnets is poled with magnetic domains substantially aligned in the same direction throughout each magnet, and
  - a coil rigidly disposed around a lens, wherein,
    - each magnet of the plurality of magnets contributes to the forces to adjust focus of the lens based on Lorentz forces generated from the coil.

Clause 22. The apparatus of clause 21, wherein
- the plurality of magnets is mounted to a support structure of a focusing mechanism comprising the actuator module, and
- the plurality of magnets comprises four magnets mounted to the support structure of the focusing mechanism.

Clause 23. The apparatus of any of clauses 21-22, wherein
- the coil is driven with an electric current, and
- the coil is rigidly disposed around the Lens and mounted in the magnetic field of each magnet.

Clause 24. The apparatus of any of clauses 21-23, wherein
- the poling directions of each magnet of the plurality of magnets as mounted in the actuator module is substantially orthogonal to an optical axis of the lens, and
- the poling directions of each magnet of the plurality of magnets is angled at or about 45 degrees to at least one of a plurality of planar sides of the actuator module,
- the actuator module is substantially cuboid in envelope, Clause 25. The apparatus of any of clauses 21-24, wherein
- a focusing mechanism is suspended on an actuator module support structure by a means that substantially limits the relative motion to linear directions orthogonal to the optical axis.

Clause 26. The apparatus of any of clauses 21-25, wherein
- a fringing magnetic field of each magnet of the plurality of magnets interacts with four additional coils when driven with electric currents,
- the four additional coils are fixed to an actuator module support structure so that components of the fringing magnetic field parallel to the optical axis allow Lorentz forces to be generated in directions orthogonal to the optical axis, and
- the Lorentz forces generate controlled motion of the focusing mechanism and a lens, in directions orthogonal to an optical axis.

Clause 27. The apparatus of any of clauses 21-26, wherein
- the actuator module is an actuator module for controlling the position of a lens relative to an image sensor in a miniature camera along three orthogonal axes, one parallel to the optical axis for focus adjustment, and two orthogonal to the optical axis and to each other to compensate for user handshake.

Clause 28. An actuator module for controlling the position of a lens relative to an image sensor in a miniature camera, comprising:
- an actuator module support structure;
- a focusing mechanism suspended on the actuator module support structure by a suspension means configured to limit relative motion to linear directions orthogonal to an optical axis of the miniature camera; and
- a plurality of magnets mounted to a support structure of the focusing mechanism.

Clause 29. The actuator module of clause 28, wherein
- the actuator module support structure comprises a magnetic yoke, wherein
  - the plurality of magnets is mounted to the magnetic yoke,
  - an upper spring is mounted to the magnetic yoke,
  - the upper spring is used to suspend a lens and a focusing coil, and
  - the upper spring is electrically insulated from the yoke.

Clause 30. The actuator module of clause 29, wherein
- the upper spring comprises a first portion and a second portion,
- each of the first portion and the second portion is connected to a respective terminal of the focusing coil to form a conductive path to drive current through the focusing coil, from the yoke when different voltages applied to each of the first portion and the second portion.

Clause 31. The actuator module of any of clauses 28-30, wherein
- the actuator module is rectangular in plan, when viewed in directions orthogonal to the optical axis, with sides arranged so that there is a long side and a short side,
- each magnet of the plurality of magnets and a corresponding fixed coil are arranged to exhibit mirror symmetry about a plane at 45 degrees to at least one side of the actuator module, and
- the combined arrangement of four magnets and four fixed coils does not exhibit mirror symmetry about a plane at 45 degrees to at least one side of the actuator module and through the optical axis.

Clause 32. The actuator module of any of clauses 28-31, wherein
- the conduction path to the two portions of the upper spring is through the suspension mechanism, and
- the suspension mechanism guides the focusing mechanism to move in linear directions orthogonal to the optical axis, relative to the actuator module fixed support structure.

Clause 33. The actuator module of any of clauses 28-32, wherein each magnet of the plurality of magnets is arranged to interact with Lorentz forces generated from a single coil driven with an appropriate electric current that is rigidly disposed around the lens and mounted in the magnetic field of each magnet.

Clause 34. The actuator module of any of clauses 28-33, further comprising a lower spring, used in combination with the upper spring to suspend the lens and focusing coil on the focusing mechanism support structure, and the lower spring is mounted on the four magnets, between the magnets and the four fixed coils.

Clause 35. An apparatus for controlling the motion of a camera component in a mobile computing device, the apparatus comprising:
- an actuator module comprising a plurality of magnets mounted to a circuit board, wherein
  - each magnet of the plurality of magnets is poled with magnetic domains substantially aligned in the same direction throughout each magnet, and
  - a coil rigidly disposed around a lens, wherein,
    - each magnet of the plurality of magnets contributes to the forces to adjust focus of the lens based on Lorentz forces generated from the coil rigidly disposed around the lens.

Clause 36. The apparatus of clause 35, wherein the circuit board comprises a flexible printed circuit.

Clause 37. The apparatus of any of clauses 35-36, wherein the circuit board comprises a printed circuit board,
the plurality of coils is affixed at an orientation such that the plane of the circuit board is orthogonal to an optical axis of the actuator, and
at least two Hall sensors are mounted to the board centers of two of the fixed coils on opposite sides of the printed circuit board from the magnets.

Clause 38. The apparatus of any of clauses 35-37, wherein each magnet of the plurality of magnets is mounted to the actuator module with a poling direction substantially orthogonal to an optical axis of the actuator module.

Clause 39. The apparatus of any of clauses 35-38, wherein each magnet of the plurality of magnets is mounted to the actuator module with a poling direction orthogonal to an optical axis of the actuator module.

Clause 40. The apparatus of any of clauses 35-39, wherein each magnet of the plurality of magnets is mounted to the actuator module at an angle of 45 degrees to at least one planar side of the actuator module.

Clause 41. An apparatus for controlling the motion of a camera component, the apparatus comprising:
an actuator module for controlling the position of a lens relative to an image sensor in a miniature camera along three orthogonal axes, and
a focusing mechanism for moving a lens along an optical axis, wherein
the mechanism is suspended on a plurality of wires, each substantially parallel to an optical axis, and
at least one of the plurality of wires is composed of a shape memory allow capable of bending deformations that allow the focusing mechanism to move in linear directions orthogonal to the optical axis.

Clause 42. The apparatus of clause 41, wherein the plurality of wires further comprises four wires, one in each corner of the mechanism.

Clause 43. The apparatus of any of clauses 41-42, wherein the bending deformations comprise bending deformations substantially preventing parasitic motions in other directions.

Clause 44. The apparatus of any of clauses 41-43, wherein the plurality of wires suspends the focusing mechanism on an actuator module support structure to allow the linear motions required for the handshake correction.

Clause 45. The apparatus of any of clauses 41-44, wherein each of the plurality of wires is composed of a shape memory allow capable of bending deformations.

Clause 46. The apparatus of any of clauses 41-45, wherein,
at least three of the plurality of wires are composed of shape memory alloy, and
each of the wires that is composed of shape memory is configured with a passive bias spring providing a tensile force along the length of the wire.

Clause 47. The apparatus of any of clauses 41-46, wherein, each of the wires that is composed of shape memory is configured with a passive bias spring providing a tensile force along the length of the wire, such that when heated by passing an electric current through the wire, or cooled by removing a proportion of the current, the length of each wire changes, and in this way a tilt of the focusing mechanism and the lens relative to the image sensor is controlled.

Clause 48. A method for controlling the position of a lens, the method comprising
passing an electric current through a suspension wire to lengthen the wire by expanding a shape memory alloy in the wire; and
reducing the current through the suspension wire to shorten the wire by contracting a shape memory alloy in the wire.

Clause 49. The method of clause 48, wherein
passing an electric current through a suspension wire to lengthen the wire by expanding a shape memory alloy in the wire further comprises passing current simultaneously through a plurality of corner wires of a suspension of a focusing mechanism configured with a passive bias spring providing a tensile force along the length of the wire.

Clause 50. The method of any of clauses 48-49, wherein
passing an electric current through a suspension wire to lengthen the wire by expanding a shape memory alloy in the wire further comprises passing current through at least three corner wires of a suspension of a focusing mechanism configured with a passive bias spring providing a tensile force along the length of the wire.

Clause 51. The method of any of clauses 48-50, wherein
passing an electric current through a suspension wire to lengthen the wire by expanding a shape memory alloy in the wire further comprises passing current through at least three corner wires of a suspension of a focusing mechanism configured with a passive bias spring providing a tensile force along the length of the wire; and
withholding current from a fourth corner wire, wherein
the fourth corner wire is not fabricated from a shape memory alloy material, the fourth corner wire is passive, and
the fourth corner wire is substantially linear and elastic in its stress and strain characteristic at operational loads.

Clause 52. The method of any of clauses 48-51, wherein
passing an electric current through a suspension wire to lengthen the wire by expanding a shape memory alloy in the wire further comprises passing current through a wire comprising a shape memory allow capable of bending deformations to allow a focusing mechanism to move in linear directions orthogonal to an optical axis of the lens.

Clause 53. The method of any of clauses 48-52, further comprising
generating tilt of a lens by passing current different currents through a first corner wire and a second corner wire of a suspension of a focusing mechanism configured with a passive bias spring providing a tensile force along the length of the wire.

Clause 54. The method of any of clauses 48-53, further comprising
generating tilt of a lens by passing current different currents through a first corner wire and a second corner wire of a suspension of a focusing mechanism.

Clause 55. The method of any of clauses 48-54, further comprising
controlling a position of a lens relative to an image sensor in a miniature camera along three orthogonal linear axes, one axis parallel to an optical axis for focus adjustment, and two other axes orthogonal to the optical axis and to each other.

Clause 56. An apparatus for controlling the motion of a camera component, the apparatus comprising:
a focusing mechanism for moving a lens along an optical axis, wherein the mechanism is suspended on a plurality of wires, each substantially parallel to an optical axis, and
at least one of the plurality of wires is composed of a shape memory allow capable of bending deformations that allow the focusing mechanism to move in linear directions orthogonal to the optical axis.

Clause 57. The apparatus of clause 56, further comprising,
at least three of the corner wires fabricated from shape memory alloy (SMA), each wire configured with a passive bias spring providing a tensile force along the length of the wire, so that when heated by passing an electric current through the wire, or cooled by removing a proportion of the current, the length of each wire is controlled.

Clause 58. The apparatus of any of clauses 56-57, further comprising,
at least three passive bias springs, one for each wire, configured to react between a portion of the focusing mechanism and an actuator support structure.

Clause 59. The apparatus of any of clauses 56-58, wherein the passive bias springs route electrical current to the focusing mechanism.

Clause 60. The apparatus of any of clauses 56-59, wherein at least one of the wires is nor fabricated from shape memory alloy material, the at least one of the wires is a passive and substantially linear and elastic in its stress and strain characteristic at operational loads.

Clause 61. A method, comprising:
for a camera lens in a multifunction device, calculating a preferred position of the camera lens relative to an image sensor of the multifunction device, wherein
the preferred position of the camera lens relative to the image sensor is a position of the camera lens rests relative to the image sensor when the sum of average forces on the lens is zero;
calculating a displacement of the lens by the actuator mechanism necessary to move the lens to the preferred position; and
applying, using a motor in the actuator mechanism, force to the lens to generate the displacement.

Clause 62. The method of clause 61, wherein the preferred position is an equilibrium position at which displacement of the camera lens due to springs in a lens actuator mechanism offsets displacement of the camera lens due to gravity.

Clause 63. The method of any of clauses 61-62, wherein the preferred position is a position at which the sum of average forces on the lens is managed over discrete time periods to fall within a dynamic range.

Clause 64. The method of any of clauses 61-63, further comprising:
determining, using an accelerometer, whether a change to an orientation of the multifunction device has exceeded a threshold;
calculating a new equilibrium position of the camera lens relative to the photosensor of the multifunction device;
calculating a new displacement of the lens by the actuator mechanism necessary to move the lens to the new equilibrium position; and
applying, using a motor in the actuator mechanism, force to the lens to generate the new displacement.

Clause 65. The method of any of clauses 61-64, further comprising:
determining, using an accelerometer, whether a change to an orientation of the multifunction device has exceeded a threshold;
calculating a new displacement of the lens by the actuator mechanism necessary to move the lens to the equilibrium position; and
applying, using a motor in the actuator mechanism, force to the lens to generate the new displacement.

Clause 66. The method of any of clauses 61-65, further comprising:
determining, using a hall sensor, whether a change to the position of the camera lens relative to the photosensor of the multifunction device has exceeded a threshold;
calculating a new equilibrium position of the camera lens relative to the photosensor of the multifunction device;
calculating a new displacement of the lens by the actuator mechanism necessary to move the lens to the new equilibrium position; and
applying, using a motor in the actuator mechanism, force to the lens to generate the new displacement.

Clause 67. The method of any of clauses 61-66, wherein the calculating the equilibrium position of the camera lens relative to the photosensor of the multifunction device further comprises calculating an average position of the camera lens relative to the photosensor of the multifunction device during a lookback period.

Clause 68. The method of any of clauses 61-67, wherein the calculating the equilibrium position of the camera lens relative to the photosensor of the multifunction device further comprises
deriving from a accelerometer of the multifunction device an orientation of the multifunction device and a gravity vector; and
calculating a position at which a spring vector is equal in magnitude and opposite in position to the gravity vector.

Clause 69. The method of any of clauses 61-68, wherein the calculating the equilibrium position of the camera lens relative to the photosensor of the multifunction device further comprises
deriving from a accelerometer of the multifunction device an orientation of the multifunction device and a gravity vector, wherein the
deriving comprises filtering accelerometer data to eliminate high-frequency motion components of motion of the multifunction device; and
calculating a position at which a spring vector is equal in magnitude and opposite in position to the gravity vector.

Clause 70. A system, comprising:
at least one processor; and
a memory comprising program instructions, wherein the program instructions are executable by the at least one processor to:
for a camera lens in a multifunction device, calculate a preferred position of the camera lens relative to an image sensor of the multifunction device, wherein
the preferred position of the camera lens relative to the image sensor is a position of the camera lens rests relative to the image sensor when the sum of average forces on the lens is zero;
calculate a displacement of the lens by the actuator mechanism necessary to move the lens to the preferred position; and
apply, using a motor in the actuator mechanism, force to the lens to generate the displacement.

Clause 71. The system of clause 70, further comprising:

program instructions executable by the at least one processor to determine, using an accelerometer, whether a change to an orientation of the multifunction device has exceeded a threshold;

program instructions executable by the at least one processor to calculate a new equilibrium position of the camera lens relative to the photosensor of the multifunction device;

program instructions executable by the at least one processor to calculate a new displacement of the lens by the actuator mechanism necessary to move the lens to the new equilibrium position; and program instructions executable by the at least one processor to apply, using a motor in the actuator mechanism, force to the lens to generate the new displacement.

Clause 72. The system of any of clauses 70-71, further comprising:

program instructions executable by the at least one processor to determine, using a accelerometer, whether a change to an orientation of the multifunction device has exceeded a threshold;

program instructions executable by the at least one processor to calculate a new displacement of the lens by the actuator mechanism necessary to move the lens to the equilibrium position; and program instructions executable by the at least one processor to apply, using a motor in the actuator mechanism, force to the lens to generate the new displacement.

Clause 73. The system of any of clauses 70-72, wherein the program instructions executable by the at least one processor to calculate the equilibrium position of the camera lens relative to the photosensor of the multifunction device further comprise:

program instructions executable by the at least one processor to derive from a accelerometer of the multifunction device an orientation of the multifunction device and a gravity vector; and program instructions executable by the at least one processor to calculate a position at which a spring vector is equal in magnitude and opposite in position to the gravity vector.

Clause 74. The system of any of clauses 70-73, wherein the program instructions executable by the at least one processor to calculate the equilibrium position of the camera lens relative to the photosensor of the multifunction device further comprise:

program instructions executable by the at least one processor to derive from a accelerometer of the multifunction device an orientation of the multifunction device and a gravity vector, wherein the program instructions executable by the at least one processor to derive comprise program instructions executable by the at least one processor to filter accelerometer data to eliminate high-frequency motion components of motion of the multifunction device; and program instructions executable by the at least one processor to calculate a position at which a spring vector is equal in magnitude and opposite in position to the gravity vector.

Clause 75. A non-transitory computer-readable storage medium storing program instructions, wherein the program instructions are computer-executable to implement:

for a camera lens in a multifunction device, calculating a preferred position of the camera lens relative to an image sensor of the multifunction device, wherein the preferred position of the camera lens relative to the image sensor is a position of the camera lens rests relative to the image sensor when the sum of average forces on the lens is zero;

calculating a displacement of the lens by the actuator mechanism necessary to move the lens to the preferred position; and applying, using a motor in the actuator mechanism, force to the lens to generate the displacement.

Clause 76. The non-transitory computer-readable storage medium of clause 75, further comprising:

program instructions computer-executable to implement determining, using an accelerometer, whether a change to an orientation of the multifunction device has exceeded a threshold;

program instructions computer-executable to implement calculating a new equilibrium position of the camera lens relative to the photosensor of the multifunction device;

program instructions computer-executable to implement calculating a new displacement of the lens by the actuator mechanism necessary to move the lens to the new equilibrium position; and program instructions computer-executable to implement applying, using a motor in the actuator mechanism, force to the lens to generate the new displacement.

Clause 77. The non-transitory computer-readable storage medium of any of clauses 75-76, further comprising:

program instructions computer-executable to implement determining, using a accelerometer, whether a change to an orientation of the multifunction device has exceeded a threshold;

program instructions computer-executable to implement calculating a new displacement of the lens by the actuator mechanism necessary to move the lens to the equilibrium position; and program instructions computer-executable to implement applying, using a motor in the actuator mechanism, force to the lens to generate the new displacement.

Clause 78. The non-transitory computer-readable storage medium of any of clauses 75-77, further comprising:

program instructions computer-executable to implement determining, using a hall sensor, whether a change to the position of the camera lens relative to the photosensor of the multifunction device has exceeded a threshold;

program instructions computer-executable to implement calculating a new equilibrium position of the camera lens relative to the photosensor of the multifunction device;

program instructions computer-executable to implement calculating a new displacement of the lens by the actuator mechanism necessary to move the lens to the new equilibrium position; and program instructions computer-executable to implement applying, using a motor in the actuator mechanism, force to the lens to generate the new displacement.

Clause 79. The non-transitory computer-readable storage medium of any of clauses 75-78, wherein the program instructions computer-executable to implement calculating the equilibrium position of the camera lens relative to the photosensor of the multifunction device further comprise program instructions computer-executable to implement calculating an average position of the camera lens relative to the photosensor of the multifunction device during a lookback period.

Clause 80. The non-transitory computer-readable storage medium of any of clauses 75-79, wherein the program instructions computer-executable to implement calculating the equilibrium position of the camera lens relative to the photosensor of the multifunction device further comprise
- program instructions computer-executable to implement deriving from a accelerometer of the multifunction device an orientation of the multifunction device and a gravity vector; and
- program instructions computer-executable to implement calculating a position at which a spring vector is equal in magnitude and opposite in position to the gravity vector.

What is claimed is:

1. A device, comprising:
   a lens;
   an image sensor; and
   an actuator module, comprising:
   a plurality of actuators positioned around a periphery of the actuator module and each comprising a coil and a magnet, wherein respective actuators of the plurality of actuators are configured to be driven independently with respective coils receiving separate electrical currents different from each other and through different respective terminals to control tilt positioning of the lens relative to the image sensor, wherein the coils of the plurality of actuators are attached to a moving component of the actuator module for tilting the lens relative to the image sensor.

2. The device of claim 1, wherein the plurality of actuators comprises four actuators, wherein a first and a fourth ones of the actuators are positioned in two corners of the actuator module opposite each other with respect to a first axis orthogonal to an optical axis of the lens, and wherein a second and a third ones of the actuators are positioned in two corners of the actuator module opposite each other with respect to a second axis orthogonal to the optical axis of the lens.

3. The device of claim 2, wherein the first and the fourth actuators are configured to be driven with electrical currents of a same polarity to move the lens relative to the image sensor along the optical axis of the lens.

4. The device of claim 2, wherein the first and the fourth actuators are configured to be driven with electrical currents of different polarities to tilt the lens relative to the image sensor about the first axis orthogonal to the optical axis of the lens.

5. The device of claim 2, wherein the second and the third actuators are configured to be driven with respective currents to move the lens relative to the image sensor along the optical axis of the lens or tilt the lens relative to the image sensor about the second axis orthogonal to the optical axis of the lens.

6. The device of claim 2, wherein the coils of adjacent ones of the actuators are wound in opposite ways or are electrically connected in opposite ways.

7. The device of claim 2, wherein the magnets of the actuators are dual-pole magnets, and wherein the magnets of adjacent ones of the actuators are poled in opposite ways.

8. The device of claim 1, wherein the coil of each actuator comprises two terminals, wherein one terminal from each actuator is electrically connected with each other, and wherein another terminal from each of the actuators is driven with a current source or a voltage source.

9. The device of claim 8, wherein one of the other terminals from the actuators is driven with a voltage source, and wherein remaining ones of the other terminals from the actuators are respectively driven with a bidirectional current source.

10. The device of claim 1, wherein the coils of the actuators are mounted to the lens or a support structure of the lens to move or tilt together with the lens relative to the image sensor, and wherein the magnets of the actuators are mounted to another structure of the device to remain static when the lens moves or tilts.

11. A method, comprising:
    determining electrical currents for respective coils of a plurality of actuators of a device for controlling a lens of the device to a position relative to an image sensor of the device, wherein the actuators respectively comprise a coil and a magnet and are positioned around a periphery within a camera, wherein the respective coils of the actuators are able to be driven independently with separate electrical currents different from each other and through different respective terminals to control tilt positioning of the lens relative to the image sensor, and wherein the coils of the plurality of actuators are attached to a moving component for tilting the lens relative to the image sensor; and
    providing the determined electrical currents to drive the coils to control the lens to the position relative to the image sensor.

12. The method of claim 11, wherein the plurality of actuators comprises four actuators, wherein a first and a fourth ones of the actuators are positioned opposite each other with respect to a first axis orthogonal to an optical axis of the lens, and wherein a second and a third ones of the actuators are positioned opposite each other with respect to a second axis orthogonal to the optical axis of the lens.

13. The method of claim 12, further comprising:
    providing at least one pair of electrical currents of a same polarity to the first and fourth actuators, or to the second and third actuators, to move the lens relative to the image sensor along an optical axis of the lens.

14. The method of claim 12, further comprising:
    providing at least one pair of electrical currents of different polarities to the first and the fourth actuators to tilt the lens relative to the image sensor about the first axis orthogonal to the optical axis of the lens, or to the second and third actuators to tilt the lens relative to the image sensor about the second axis orthogonal to the optical axis of the lens.

15. The method of claim 11, wherein the coil of each actuators comprises two terminals, wherein one terminal from each actuator is electrically connected with each other, and wherein another terminal from each of the actuators is driven with a current source or a voltage source.

16. The method of claim 11, wherein the magnets of the actuators are dual-pole magnets.

17. The method of claim 11, wherein the coils of the actuators are mounted to the lens or a support structure of the lens to move or tilt together with the lens relative to the image sensor, and wherein the magnets of the actuators are mounted to another structure of the device to remain static when the lens moves or tilts.

18. A device, comprising:
    a lens;
    an image sensor configured to generate one or more signals based on light that passes through the lens;
    an actuator module, comprising:

a plurality of actuators positioned around a periphery of the actuator module and each comprising a coil and a magnet, wherein respective actuators of the plurality of actuators are configured to be driven independently with respective coils receiving separate electrical currents different from each other and through different respective terminals to control tilt positioning the lens relative to the image sensor, and wherein the coils of the plurality of actuators are attached to a moving component of the actuator module for tilting the lens relative to the image sensor; and a processor configured to process the signals generated from the image sensor to generate an image.

19. The device of claim 18, wherein the plurality of actuators comprises four actuators, wherein a first and a fourth ones of the actuators are positioned in two corners of the actuator module opposite each other with respect to a first axis orthogonal to an optical axis of the lens, and wherein a second and a third ones of the actuators are positioned in two corners of the actuator module opposite each other with respect to a second axis orthogonal to the optical axis of the lens.

20. The device of claim 19, wherein the first and the fourth actuators are configured to be driven with electrical currents of a same polarity to move the lens relative to the image sensor along the optical axis of the lens, or driven with electrical currents of different polarities to tilt the lens relative to the image sensor about the first axis orthogonal to the optical axis of the lens, and wherein the second and the third actuators are configured to be driven with electrical currents of a same polarity to move the lens relative to the image sensor along the optical axis of the lens, or driven with electrical currents of different polarities to tilt the lens relative to the image sensor about the second axis orthogonal to the optical axis of the lens.

* * * * *